US012713167B2

(12) United States Patent
Lu et al.

(10) Patent No.: US 12,713,167 B2
(45) **Date of Patent: *Aug. 18, 2026**

(54) MICROPHONE

(71) Applicant: GUANGDONG DINGCHUANG SMART MANUFACTURING CO.,LTD., Dongguan (CN)

(72) Inventors: Jun Lu, Dongguan (CN); Shangjing Li, Dongguan (CN); Weirong Li, Dongguan (CN); Hong Zhou, Dongguan (CN)

(73) Assignee: GUANGDONG DINGCHUANG SMART MANUFACTURING CO., LTD., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/358,746

(22) Filed: Oct. 15, 2025

(65) Prior Publication Data

US 2026/0039986 A1 Feb. 5, 2026

Related U.S. Application Data

(63) Continuation-in-part of application No. 19/194,953, filed on Apr. 30, 2025, now Pat. No. 12,477,259, (Continued)

(30) Foreign Application Priority Data

Nov. 20, 2023 (CN) ......................... 202323133044.5
Oct. 10, 2025 (CN) ......................... 202522151440.3

(51) Int. Cl.
*H04R 1/04* (2006.01)
*F21S 4/20* (2016.01)
(Continued)

(52) U.S. Cl.
CPC ................ *H04R 1/028* (2013.01); *F21S 4/20* (2016.01); *F21V 3/02* (2013.01); *H04R 1/04* (2013.01);
(Continued)

(58) Field of Classification Search
CPC .......... H04R 1/028; H04R 1/04; H04R 1/086; H04R 2420/07
See application file for complete search history.

(56) References Cited

U.S. PATENT DOCUMENTS 12,309,540 B1 * 5/2025 Lu ............................ H04R 1/04
12,477,259 B2 * 11/2025 Lu .......................... H04R 1/086
2007/0109763 A1 * 5/2007 Wolf ................... F21V 23/0442
362/276

* cited by examiner

*Primary Examiner* — Suhan Ni
(74) *Attorney, Agent, or Firm* — HOWARD M COHN and Associates, LLC

(57) ABSTRACT

A microphone includes a shell assembly, a sound pickup assembly, a control assembly and a light emitting assembly. The shell assembly includes a shell body with a first accommodating chamber. The sound pickup assembly includes a microphone head for sound pickup, wherein the microphone head is arranged on the shell assembly. The control assembly includes a circuit board. The circuit board is arranged in the first accommodating chamber, and is electrically connected to the microphone head. The light emitting assembly includes a light emitting unit. The light emitting unit is arranged in the first accommodating chamber and is electrically connected to the circuit board. The light emitting unit is configured to allow emitted light to pass through a portion of the shell body.

20 Claims, 45 Drawing Sheets

Related U.S. Application Data which is a continuation-in-part of application No. 18/825,047, filed on Sep. 5, 2024, now Pat. No. 12,309,540.

(51) Int. Cl.

*F21V 3/02* (2006.01)
*H04R 1/02* (2006.01)
*H04R 1/08* (2006.01)
*F21Y 103/10* (2016.01)
*F21Y 115/10* (2016.01)

(52) U.S. Cl.

CPC .......... *H04R 1/086* (2013.01); *F21V 2200/20* (2015.01); *F21Y 2103/10* (2016.08); *F21Y 2115/10* (2016.08); *H04R 2420/07* (2013.01)

MICROPHONE

CROSS-REFERENCE TO RELATED APPLICATIONS

This application is a Continuation-in-Part of the U.S. application Ser. No. 19/194,953 filed on Apr. 30, 2024, and entitled “MICROPHONE” now pending, and the application claims priorities of Chinese Patent Application No. 2025221514403, filed on Oct. 10, 2025, the entire contents of which are incorporated herein by reference.

TECHNICAL FIELD

The present disclosure relates to the technical field of audio equipment technology, and in particular, to a luminous microphone.

BACKGROUND

The application for microphones can be traced back to the late 19th century. Scientists were dedicated to finding better ways to pick up sounds to improve applications such as telephones. With the emergence of ribbon microphones in the 1920s, there are more and more styles of microphones over time, and their functions have become more diverse. Improving the user experience of microphones and creating an optimal sound pickup environment remain a significant technical challenge in the industry.

SUMMARY

The present embodiment provides a microphone that can solve the problem of a single microphone function, which leads to the inability to create a good sound pickup atmosphere.

A microphone includes a shell assembly, a sound pickup assembly, a control assembly and a light emitting assembly. The shell assembly includes a shell body with a first accommodating chamber. The sound pickup assembly includes a microphone head for sound pickup, wherein the microphone head is arranged on the shell assembly. The control assembly includes a circuit board. The circuit board is arranged in the first accommodating chamber, and is electrically connected to the microphone head. The light emitting assembly includes a light emitting unit. The light emitting unit is arranged in the first accommodating chamber and is electrically connected to the circuit board. The light emitting unit is configured to allow emitted light to pass through a portion of the shell body.

Based on the embodiment of the present invention, the microphone is equipped with a light emitting assembly located in the first accommodating chamber of the shell body, the light emitted by the light emitting assembly can be transmitted through the shell body, allowing the microphone to have sound pickup and transmission functions, while also allowing users or others to observe the lighting effect created by the light emitting assembly, this creates a cool lighting atmosphere, enhances the atmosphere and attracts attention, and improves the user’s experience.

BRIEF DESCRIPTION OF THE DRAWINGS

In order to explain the technical solutions of the embodiments of the present disclosure more clearly, the following will briefly introduce the accompanying drawings used in the embodiments. Apparently, the drawings in the following description are only some embodiments of the present disclosure. Those of ordinary skill in the art can obtain other drawings based on these drawings without creative work.

DETAILED DESCRIPTION OF THE EMBODIMENTS

Figure 1:
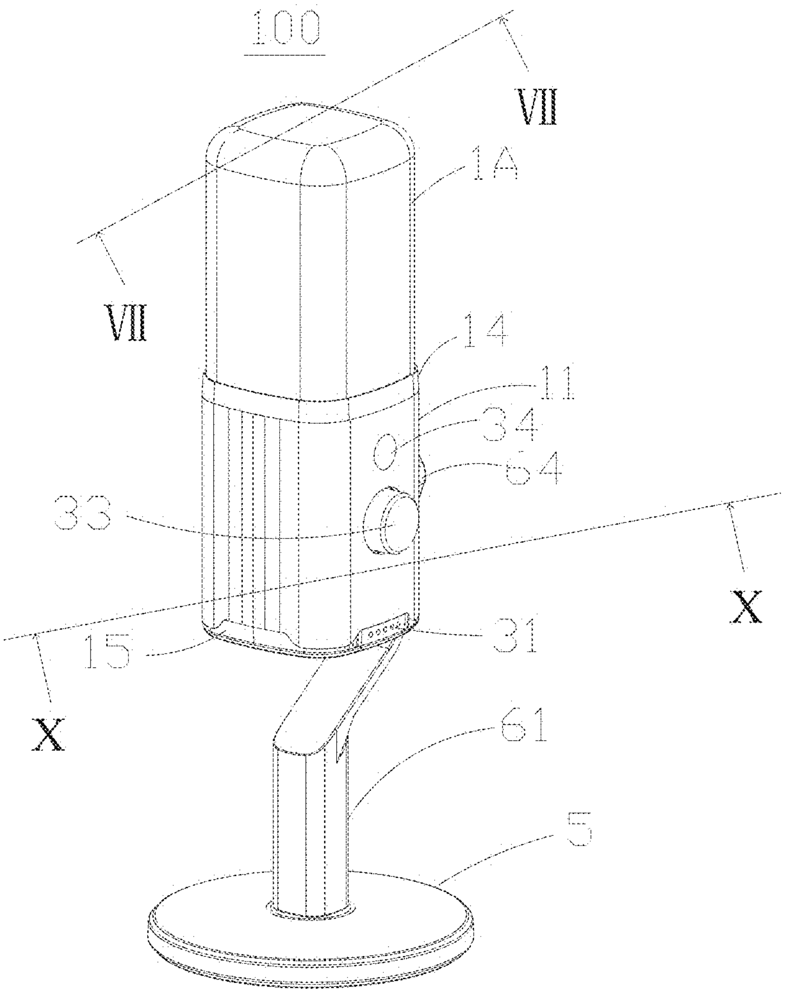
FIG. 1 is a three-dimensional diagram of a microphone according to a first embodiment of this application.

In order to facilitate understanding the present disclosure, the present disclosure will be described more comprehensively below with reference to related accompanying drawings. Preferred implementations of the present disclosure are provided in the drawings. However, the present disclosure can be implemented in many different forms, and are not limited to the implementations described herein. On the contrary, these implementations are provided to make the content disclosed in the present disclosure understood more thoroughly and comprehensively.

It should be noted that when an element is referred to as being "fixed to" another element, the element can be directly on another component or there can be a centered element. When an element is considered to be "connected" to another element, the element can be directly connected to another element or there may be a centered element. The terms "inner", "outer", "left", "right", and similar expressions used herein are for illustrative purposes only and do not necessarily represent the only implementation.

Unless otherwise defined, all technical and scientific terms used herein have the same meaning as those commonly understood by a person skilled in the art to which the present disclosure belongs. Terms used in the specification of the present disclosure herein are merely intended to describe objectives of the specific embodiments, but are not intended to limit the present disclosure. The term "and/or" used herein includes any and all combinations of one or more related listed items.

First Embodiment

Figure 2:
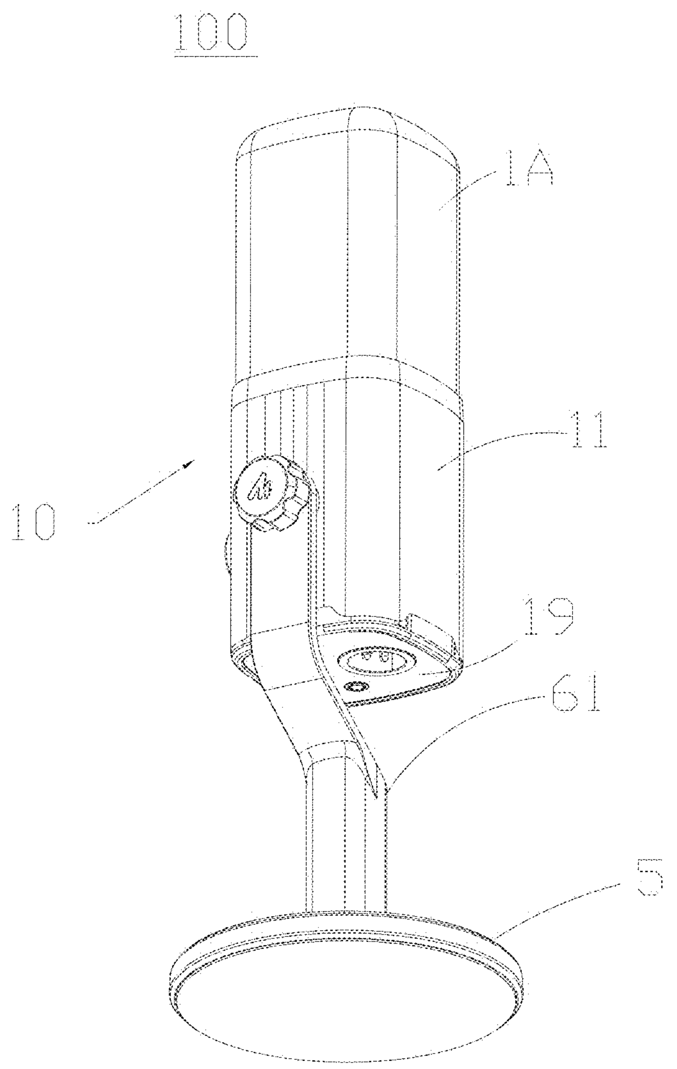
FIG. 2 is a three-dimensional diagram of a microphone in another angle according to a first embodiment of this application.
Figure 3:
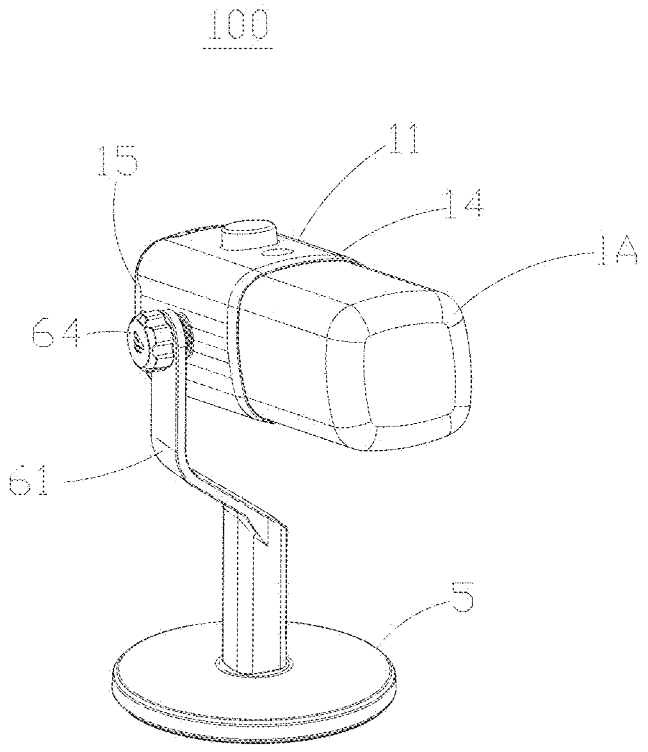
FIG. 3 is a three-dimensional diagram of a microphone in a usage state according to a first embodiment of this application.

Referring to FIG. 1, FIG. 2, and FIG. 3, FIG. 1 and FIG. 2 are three-dimensional diagrams of a microphone 100 according to an embodiment of the present disclosure in two different angles. When not in use, the microphone 100 can be rotated to a state shown in FIG. 1 or FIG. 2 for convenient storage and carrying. FIG. 3 is a three-dimensional diagram of a usage state of a microphone 100 according to an embodiment of the present disclosure. When using the microphone 100, a user will rotate and adjust the microphone 100 to a proper angle for better sound pickup, such as a usage state shown in FIG. 3, which is only a schematic diagram of a rotation angle. The microphone 100 disclosed in the present disclosure can be rotated according to a need of the user and maintained in different angles. The present disclosure will not show and elaborate them one by one again.

Figure 4:
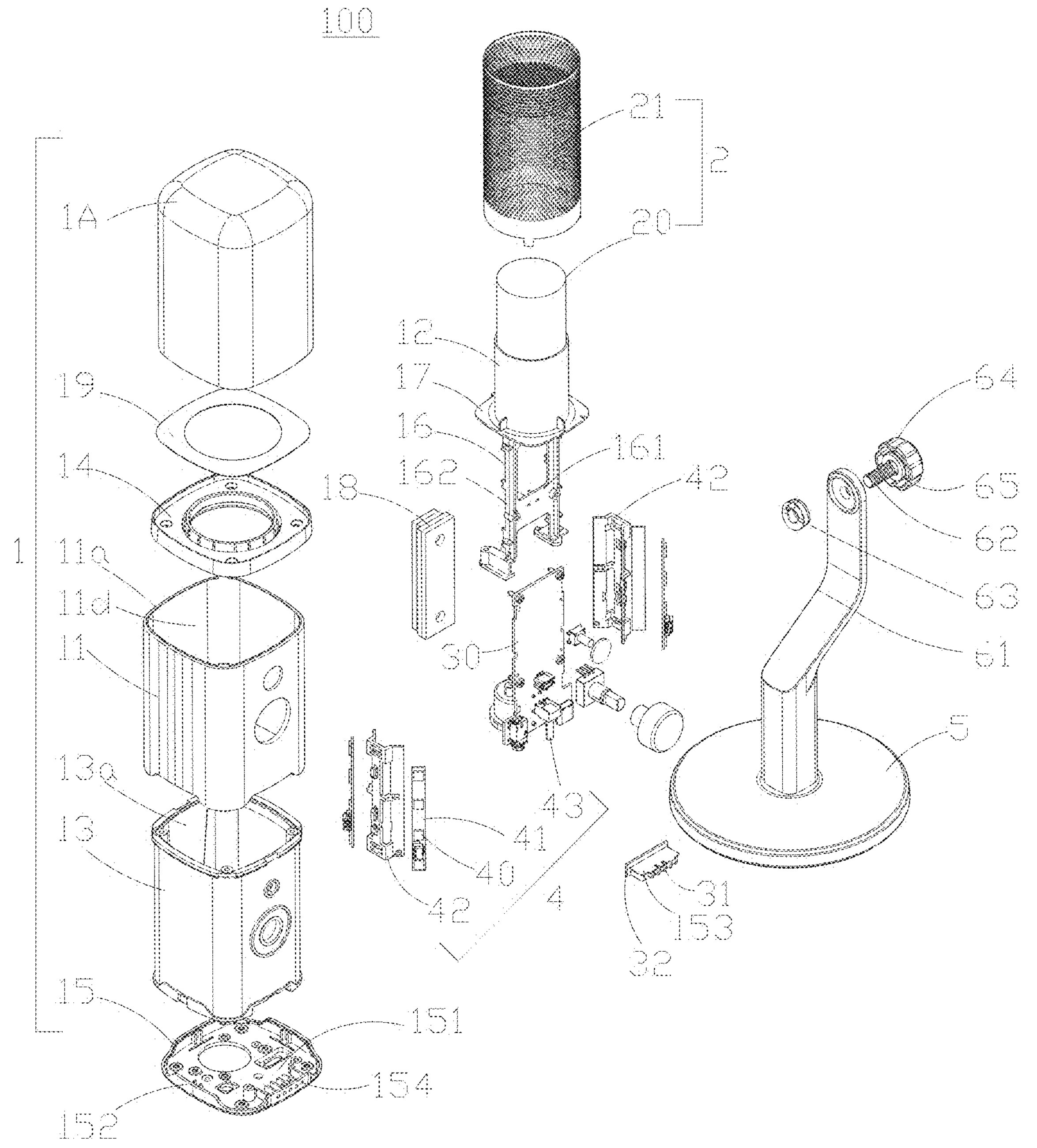
FIG. 4 is an exploded diagram of a microphone according to a first embodiment of this application.
Figure 5:
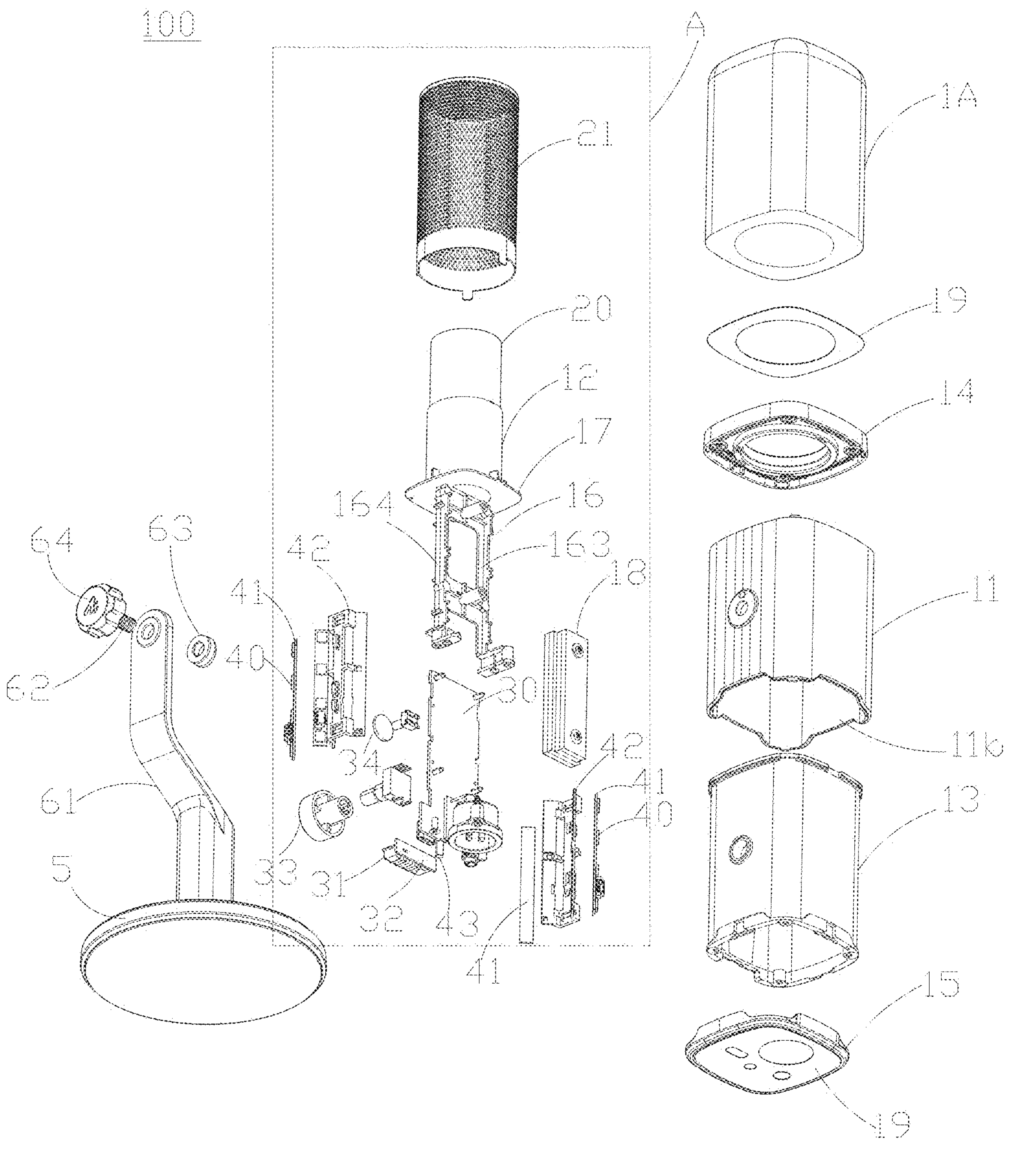
FIG. 5 is an exploded diagram of a microphone in another angle according to a first embodiment of this application.

Referring to FIG. 4 and FIG. 5, the microphone 100 according to an embodiment of the present disclosure includes a shell assembly 1, a sound pickup assembly 2, a control assembly 3, and a light emitting assembly 4. The shell assembly 1 includes a shell body 10 with a first accommodating chamber 11*d* and a mounting seat 12. The mounting seat 12 is connected to the shell body 10, and at least a portion of the shell body 10 has light transmittance. The sound pickup assembly 2 includes a microphone head 20 for sound pickup. The microphone head 20 is mounted at the mounting seat 12. The control assembly 3 includes a first circuit board 30. The first circuit board 30 is arranged in the first accommodating chamber 11*d* and is electrically connected to the microphone head 20. The light emitting assembly 4 includes a light emitting unit 40. The light emitting unit 40 is arranged in the first accommodating chamber 11*d* and is electrically connected to the first circuit board 30. The light emitting unit 40 is configured to allow emitted light to pass through at lease a portion of the shell body 10. In this embodiment, the shell body 10 includes an outer shell 11 having a circumferentially arranged sidewall structure and a base plate 15 connected to one end of the sidewall structure.

In the microphone product, a shell occupies a large area of the product. According to the microphone 100 provided in the present disclosure, the light-transmitting outer shell 11 is used, and the light emitting unit 40 is arranged in the first accommodating chamber 11*d*, so that light emitted by the light emitting unit 40 can be transmitted through the outer shell 11. Therefore, during pickup transmission of the microphone 100, a user or another person can observe a large-area lighting effect achieved by the microphone 100, thereby creating a more intense and cooler lighting atmosphere, achieving an effect of foiling the atmosphere and attracting the attention of people, and enhancing the user experience.

The light-transmittance intensity of the outer shell 11 provided in the embodiments of the present disclosure is flexible. The outer shell may have full light transmittance, or may have high-intensity light transmittance or low-intensity light transmittance. The outer shell 11 can be made of different materials according to an intensity requirement for the light transmittance, so that the shell assembly 1 presents preset light transmittance. The shell assembly 1 may preset the preset light transmittance by coating an outer side wall or an inner side wall of the outer shell 11 or performing surface sanding on the outer shell 11.

The shell assembly 1 may alternatively present the preset light transmittance by embedding a semi-light-transmitting photomask into the outer shell 11. For example, in this embodiment, the shell assembly 1 further includes an inner shell 13 arranged in the first accommodating chamber 11*d*. The inner shell 13 has light transmittance. Light emitted by the light emitting unit 40 passes through the inner shell 13 and the outer shell 11 in sequence. Specifically, the outer shell 11 is a light-transmitting shell, and the inner shell 13 is a semi-light-transmitting shell. In this embodiment, to improve the lighting effect displayed by the outer shell 11, the inner shell 13 also has a light filtering property, which can filter out a portion of the light and selectively transmit the emitted light to the outside. Transmitting light waves that a user can accept or like achieves a better result. The semi-light-transmitting shell means that the inner shell 13 allows an amount of light to pass through, but this light is not enough to clearly display objects or details behind.

By the arrangement of the light-transmitting outer shell 11, the light emitted by the light emitting unit 40 in the microphone 100 can well pass through the light-transmitting outer shell 11 without excessive loss, thereby achieving a better lighting effect. Meanwhile, the semi-light-transmitting inner shell 13 is arranged inside the light-transmitting outer shell 11, so that the light emitted by the light emitting unit 40 passes through the semi-light-transmitting inner shell 13 and then is transmitted through the light-transmitting outer shell 11, making the light emitted to the outside of the microphone 100 softer. The design of the semi-light-transmitting inner shell 13 can further cover internal components of the microphone 100, such as a circuit boards and wires, playing an aesthetic role. In addition, as the light emitting unit 40 is arranged in the first accommodating chamber, the brightness of the light near the light emitting unit 40 is stronger, which makes it easy to see components such as the circuit board and the wires around the light emitting unit 40. During viewing through the outer shell 11, shadows of the internal components such as the circuit board and the wires will be displayed on the outer shell 11. The arrangement of the semi-light-transmitting inner shell 13 can avoid this situation, so that the overall appearance of the product is more beautiful. Furthermore, the lighting effect of the product is cooler when the light emitting unit 40 emits light. Furthermore, the light emitting unit 40 is configured to emit light and/or flash when the microphone head 20 is picking up sound, such as by emitting and/or flashing according to volume or timbre of the collected sound signal, thereby enhancing the atmosphere during the use of the microphone. In some embodiments, the first circuit board 30 may receive the sound signal collected by the microphone head 20 and control the light emission of the light emitting unit 40 based on the sound signal collected by the microphone head 20.

Figure 9:
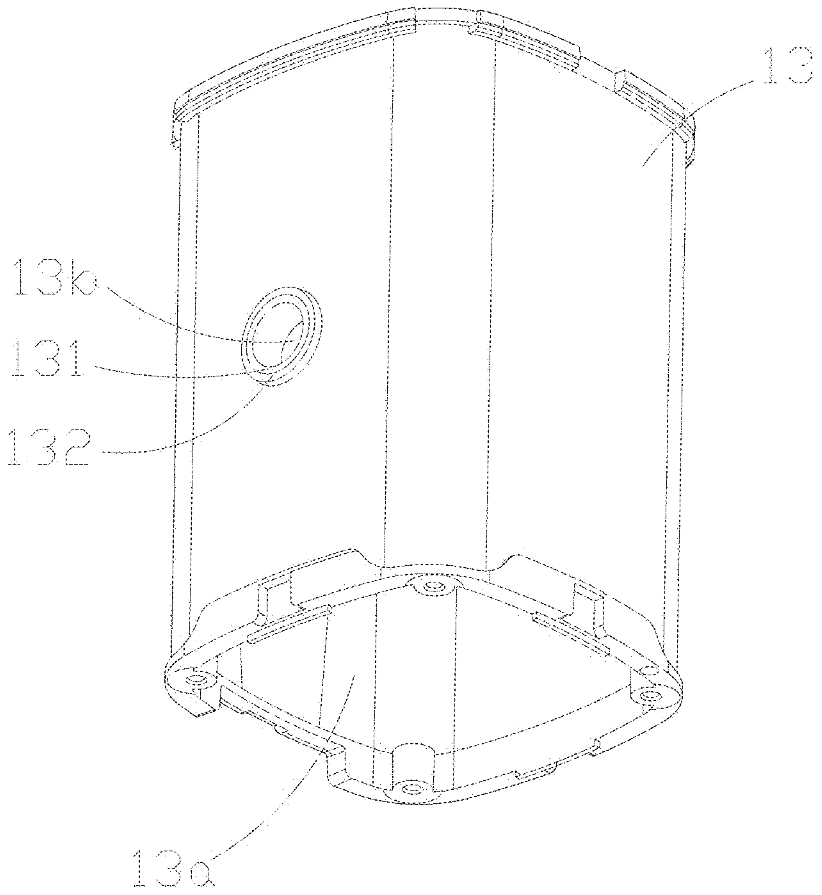
FIG. 9 is a three-dimensional diagram of an inner shell of the microphone shown in FIG. 1.

Referring to FIG. 4 and FIG. 9, in this embodiment, the inner shell 13 is provided with a second accommodating chamber 13*a*, and the light emitting unit 40 is arranged in the second accommodating chamber 13*a*. The outer shell 11 is made of a light-transmitting material, such as glass, an organic polymer light-transmittance material (an acrylic lamp), a light-transmittance composite material, and light-transmittance plastic as long as the outer shell 11 is light-transmitting. The inner shell 13 is made of a semi-light-transmitting material, such as a thermoplastic polymer, polymethyl methacrylate, polyethylene, polypropylene, polyester, polyvinyl chloride, polyamide, cellulose acetate, polyvinyl chloride, polystyrene, and polytetrafluoroethylene as long as the inner shell 13 is light-transmitting.

Figure 8:
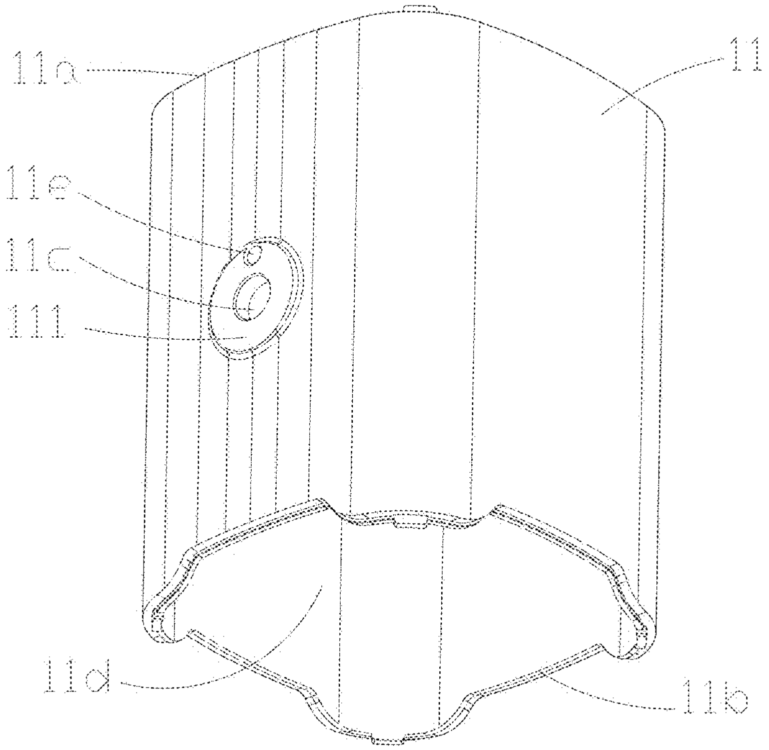
FIG. 8 is a three-dimensional diagram of an outer shell of the microphone shown in FIG. 1.

Referring to FIG. 4, FIG. 5, and FIG. 8, the outer shell 11 includes a first opening 11*a* and a second opening 11*b* which are communicated to the first accommodating chamber 11*d* and are opposite to each other. The second opening 11*b* is located at one end of the outer shell 11 away from the mounting seat 12. The shell assembly 1 further includes a cover plate 14 covering the first opening 11*a* and a base plate 15 covering the second opening 11*b*. The cover plate 14 connects the outer shell 11 to the mounting seat 12, and the outer shell 11 and the mounting seat 12 are arranged on opposite sides of the cover plate 14. The cover plate 14 does not have light transmittance. The base plate 15 does not have light transmittance. In this embodiment, the cover plate 14 and the base plate 15 are respectively arranged at two ends of the outer shell 11. The cover plate 14, the base plate 15, and the outer shell 11 are enclosed to form the first accommodating chamber 11*d*. The cover plate 14, the base plate 15, and the inner shell 13 are enclosed to form the second accommodating chamber 13*a*. The second accommodating chamber 13*a* is located in the first accommodating chamber 11*d*. An outer diameter of the inner shell 13 is less than an inner diameter of the outer shell 11, and the shape and structure of the inner shell 13 are similar to those of the outer shell 11, and they are barrel-shaped structures with openings in two ends. A spatial distance can be provided between the inner shell 13 and the outer shell 11, or the inner shell and the outer shell resist against each other or in other connection ways. For example, portions of the shells resist against each other, and a partial space is provided. In the embodiments of the present disclosure, a certain spatial distance is provided between the inner shell 13 and the outer shell 11. Specifically, the shells of the inner shell 13 and the outer shell 11 are arranged in parallel, and a side wall of the first accommodating chamber 11*d* and a side wall of the second accommodating chamber 13*a* are arranged in parallel, with a distance.

Figure 10:
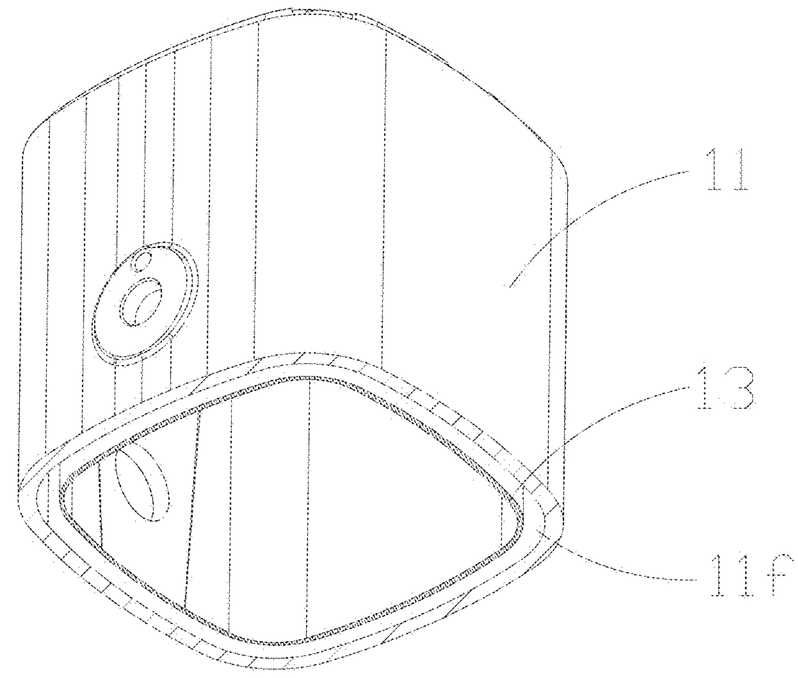
FIG. 10 is a cross-sectional diagram of some structures of the microphone shown in FIG. 1 along line X-X.

Referring to FIG. 10, in this embodiment, there is an interval space 11*f* between the outer shell 11 and the inner shell 13. The interval space 11*f* and the second accommodating chamber 13*a* are both arranged in the first accommodating chamber 11*d*. By the arrangement of the interval space 11*f*, a buffer space can be provided between the two layers of shells, avoiding direct damage to the inner shell 13 after the outer shell 11 is pressed, thereby further protecting the internal components. Meanwhile, the interval space 11*f* can further provide a buffer space for the light emitted by the light emitting unit 40 after the light passes through the inner shell 13, and then the light is transmitted out through the outer shell 11, so that the light is displayed more uniformly.

Figure 6:
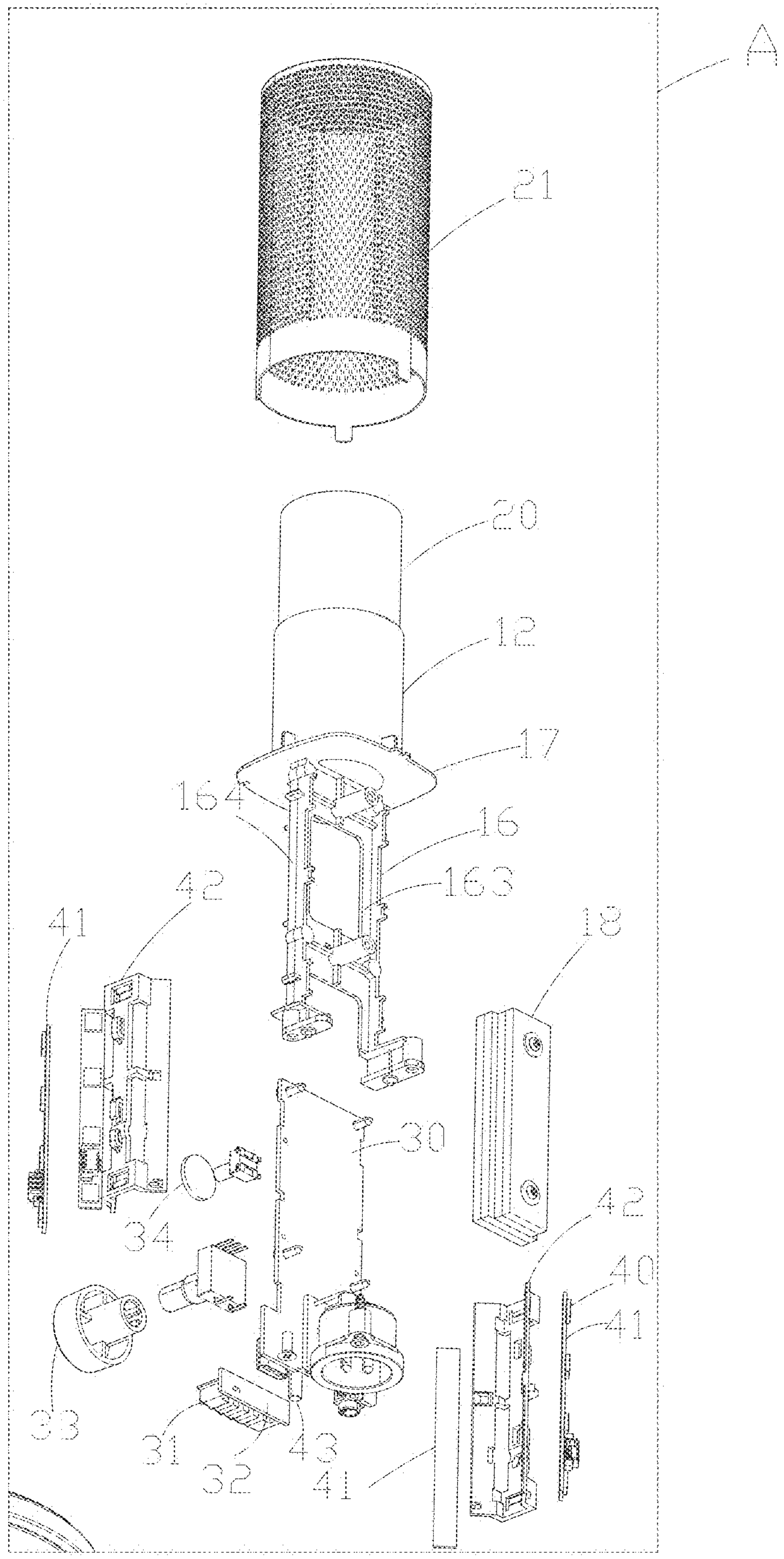
FIG. 6 is an enlarged view of part A of the microphone shown in FIG. 5.
Figure 7:
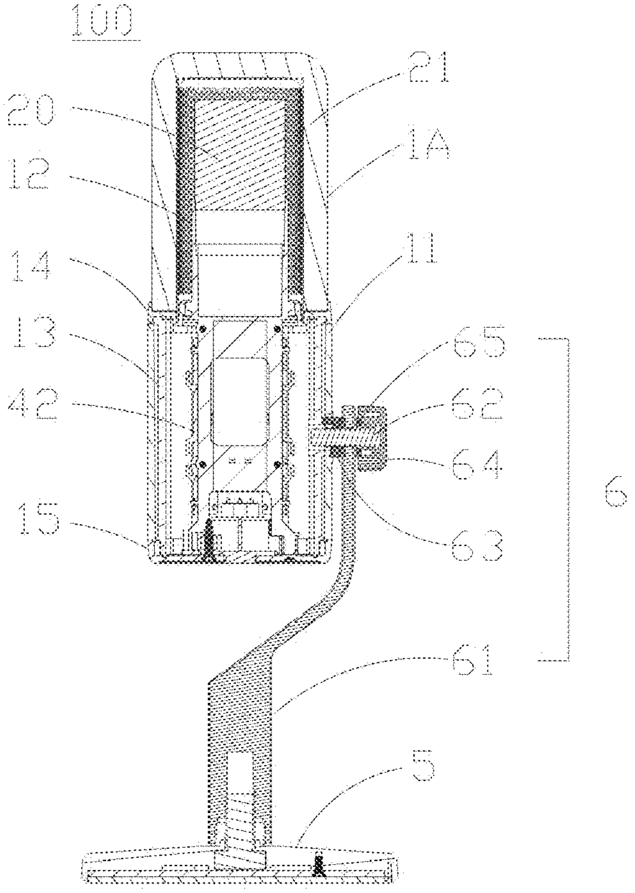
FIG. 7 is a cross-sectional diagram of the microphone shown in FIG. 1 along line VII-VII.

Referring to FIG. 6 and FIG. 7, the shell assembly 1 further includes a mounting frame 16. The mounting frame 16 is arranged in the first accommodating chamber 11*d*. Specifically, the mounting frame 16 is arranged in the second accommodating chamber 13*a*. One end resists against the base plate 15 and the other end is connected to the mounting seat 12. The first circuit board 30 is arranged in the mounting frame 16. Specifically, in this embodiment, the first circuit board 30 is connected to the mounting frame 16 by screw fixation. In other embodiments, other connection ways can be further used to achieve the connection between the first circuit board 30 and the mounting frame 16. The cover plate 14 covering the first opening 11*a*, the base plate 15 covering the second opening 11*b*, and the outer shell 11 are enclosed to form the first accommodating chamber 11*d*, which can protect the component structures located inside the first accommodating chamber 11*d* and prolong the service life of the product. Meanwhile, the opaque design of the cover plate 14 and the base plate 15 ensures that when the light emitting unit 40 in the microphone 100 emits light, the light can only be transmitted through the outer shell 11. Both the cover plate 14 and the base plate 15 are opaque, so that the lighting effect of the product is reflected on the outer shell 11, thereby avoiding the light from irradiating a user or an audience and avoiding interference with the use of the microphone 100. The use experience of the product is better.

Referring to FIG. 4, FIG. 5, and FIG. 6, in this embodiment, the shell assembly 1 further includes a partition plate 17. The partition plate 17 connects the mounting seat 12 with the mounting frame 16, and the mounting seat 12 and the mounting frame 16 are arranged on two opposite sides of the partition plate 17. The partition plate 17 is provided with a hole for a wire to pass through. The wire is configured to electrically connect the microphone head 20 to the first circuit board 30. By the arrangement of the partition plate 17, the positions of the mounting seat 12 and the mounting frame 16 are more obvious and easier to distinguish, so that efficient assembling can be achieved during assembling, and the production efficiency can be improved, thereby reducing the production cost of the product.

The shell assembly 1 further includes a weight-balancing block 18; the weight-balancing block 18 is arranged at the mounting frame 16; and the weight-balancing block 18 and the first circuit board 30 are arranged on the two opposite sides of the mounting frame 16. Specifically, in this embodiment, the weight-balancing block 18 is fixedly connected to the mounting frame 16 through a screw. In other embodiments, the weight-balancing block 18 can be connected to the mounting frame 16 through an adhesive, a snap fastener, and the like. The present disclosure does not limit this. The first circuit board 30 is provided with an element and is connected to other parts, so the first circuit board 30 has a weight. When the first circuit board 30 is arranged on a side surface of one side of the mounting frame 16, the center of gravity of the shell assembly is biased towards one side where the first circuit board 30 is located. Therefore, the weight-balancing block 18 is designed to balance the weight of the first circuit board 30 and other components, thereby ensuring that the center of gravity of the shell assembly 1 is at a preset position and ensuring the self balancing of the product. During use, it is easier for adjustment, thereby enhancing the user experience.

Continuing to refer to FIG. 4, FIG. 5, and FIG. 6, in this embodiment, the shell assembly 1 further includes two decorative sheets 19. The two decorative sheets 19 are respectively arranged on one sides of both the cover plate 14 and the base plate 15 away from the outer shell 11. By the arrangement of the decorative sheets 19, exposed portions of the cover plate 14 and the base plate 15 can be covered, such as an exposed screw hole or a water mark caused by injection molding, so that the appearance of the product is neater and more beautiful.

In this embodiment, the base plate 15 includes a main body 151 and a connecting portion 152. The connecting portion 152 is arranged along a circumferential edge of the main body 151 and is arranged on one side of the main body 151 facing the cover plate 14. The connecting portion 152 is connected to the outer shell 11. An outer surface of the connecting portion 152 and an outer surface of the outer shell 11 resist to form a continuous curved surface or plane, so that surfaces of the shells of the microphone 100 are overall integrated.

Referring to FIG. 5 and FIG. 6, the control assembly 3 further includes an indicator light 31. The indicator light 31 is arranged in the shell assembly 1 in a penetrating manner. Specifically, the indicator light 31 is threaded through the outer shell 11 and is electrically connected to the first circuit board 30. The control assembly 3 further includes a second circuit board 32. The second circuit board 32 is arranged in the first accommodating chamber and is electrically connected to and controls the indicator light 31. The second circuit board 32 is electrically connected to the first circuit board 30. By the arrangement of the indicator light 31 can provide an indication function when the control assembly 3 controls the microphone 100, making it easier for a user to observe the adjustment effect more intuitively when adjusting and controlling the microphone 100, and enhancing the user experience. By the arrangement of the second circuit board 32 to control the indicator light 31, the indicator light 31 can better achieve various indication effects.

Specifically, the connecting portion 152 is provided with a via hole that penetrates through the connecting portion 152, and the indicator light 31 is arranged in the via hole. It can be understood that the indicator light 31 is arranged in the via hole in a penetrating manner, and a light-emitting side of the indicator light 31 faces the outside of the microphone 100 for being observed. There are two or more indicator lights 31. The number of the via holes is consistent with the indicator lights 31.

The indicator light 31 provided in the embodiments of the present disclosure has flexible and diverse indication modes, which can provide feedback through combinations of different colors or different lighting intensities. The present disclosure does not impose a specific limitation on the indication mode of the indicator light 31. In this embodiment, two or more indicator lights 31 are arranged in a linear direction, and the control assembly 3 controls the microphone. For example, during microphone gain adjustment, the corresponding number of indicator lights 31 work to emit light, the remaining indicator lights 31 go out. A user can obtain a control procedure prompt of the control assembly 3 for a microphone gain through the number of the indicator lights 31 that emit light.

Due to the fact that both the indicator light 31 and the light emitting unit 40 are arranged at the first accommodating chamber 11*d*, to avoid interference caused by overlapping between the light emitted by the indicator light 31 and the light emitted by the light emitting unit 40, in this embodiment, the shell assembly 1 further includes a light shielding structure. The light shielding structure is annularly arranged on the indicator light 31 to output the light emitted by the indicator light 31 to an outer side of the shell assembly 1. The light shielding structure can limit the light of the indicator light 31 within a range, so that the light can only be transmitted towards the outer side of the shell assembly 1, thereby avoiding the mutual interference and impact between the inside of the shell assembly 1 and the light emitted by the light emitting assembly 4.

Specifically, the light shielding structure includes a baffle plate 153 and a partition plate 154. The partition plate 154 is arranged on the main body 151. There are at least two partition plates 154 which are arranged oppositely. The baffle plate 153 is connected to the partition plates 154 and resists against the connecting portion 152. The baffle plate 153, the partition plates 154, and the main body 151 are enclosed to form a mounting chamber. The indicator light 31 is arranged in the mounting chamber. In detail, in this embodiment, the second circuit board 32 is arranged opposite to the connecting portion 152. The two partition plates 154 are arranged opposite to each other, and the baffle plate 153 is arranged opposite to the main body 151, thereby forming a sealed mounting chamber. The indicator light 31 is arranged in the mounting chamber, so that the light emitted by the indicator light 31 can be limited in a predetermined direction, thereby controlling an exit direction of the light emitted by the indicator light 31 and avoiding the interference between the inside of the shell assembly 1 and the light emitted by the light emitting assembly 4.

Due to the fact that there are five indicator lights 31 in the embodiments of the present disclosure, to avoid mutual interference of the light emitted by the various indicator lights 31, there are six partition plates 154, thereby forming five mounting chambers with the baffle plate 153, the connecting portion 152, and the main body 151 respectively to respectively mount the indicator lights 31, to avoid mutual the interference of the light emitted by the five indicator lights 31. Thus, the indicator lights 31 emit light according to a preset program to achieve an indicator light effect.

In other embodiments, the via hole may not be provided on the connecting portion 152, and only a light transmittance region needs to be arranged at positions of the connecting portion 152 corresponding to the indicator lights 31. Or, the connecting portion 152 is made of a light transmittance material, and then a non light transmittance region is arranged on the connecting portion 152, leaving only the regions corresponding to the indicator lights 31 for light transmittance, as long as the light emitted by the indicator lights 31 can be transmitted out of the connecting portion 152.

The control assembly 3 further includes a function knob 33 and a button 34 configured to control the microphone 100 to be muted. The function knob 33 is arranged in the outer shell 11 in a penetrating manner and is electrically connected to the first circuit board 30. The function knob 33 is configured to adjust the gain effect and/or the volume of the microphone 100. The button 34 is electrically connected to the first circuit board 30. The button 34 is arranged in the outer shell 11 in a penetrating manner and is arranged in parallel with the function knob 33. Specifically, holes for allowing the function knob 33 and the button 34 to be threaded are provided on both the outer shell 11 and the inner shell 13, to facilitate operations of a user. In this embodiment, the button 34 can be pressed to mute the microphone 100 during use, and can be pressed again to relieve the mute effect. The operation is convenient. The function knob 33 has at least two functions. In this embodiment, two functions are taken as an example for introduction. During use, the first function is to adjust the gain effect of the microphone 100 by rotation, and the second function is to adjust the volume of earphones by rotation. The two functions can be switched by pressing the function knob 33. In other embodiments, the function knob 33 may alternatively have a third function or more functions. The functions can be switched by pressing. The function knob integrates multiple function adjustments, so that the overall operation buttons of the product are reduced, and the appearance is neater and more beautiful.

Figure 13:
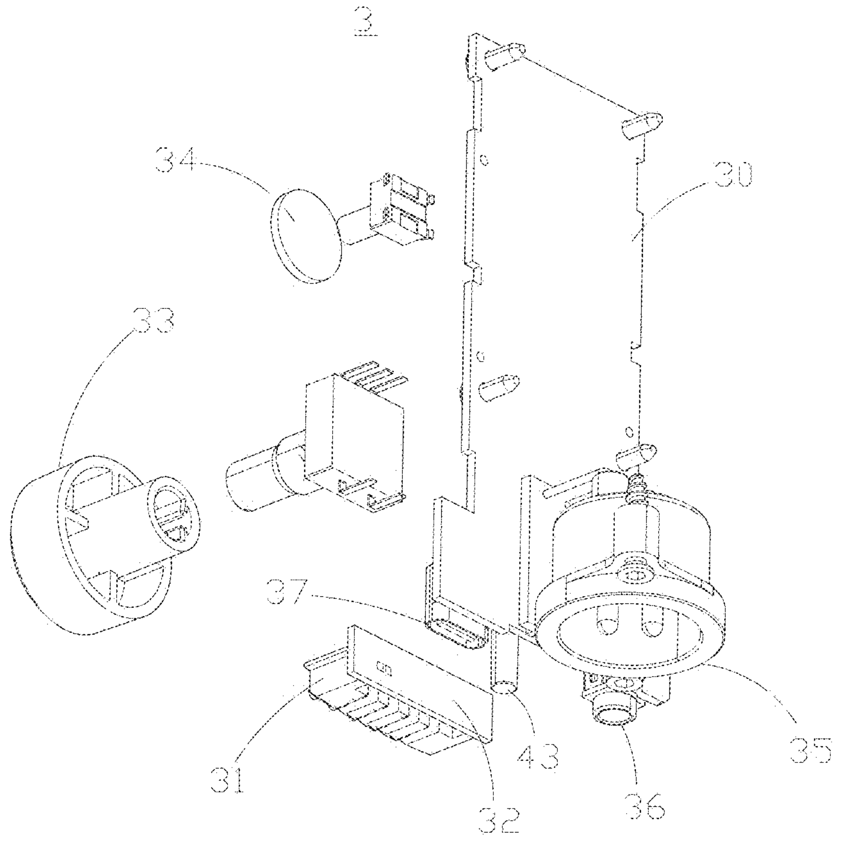
FIG. 13 is a schematic diagram of a control assembly of the microphone shown in FIG. 1.
Figure 14:
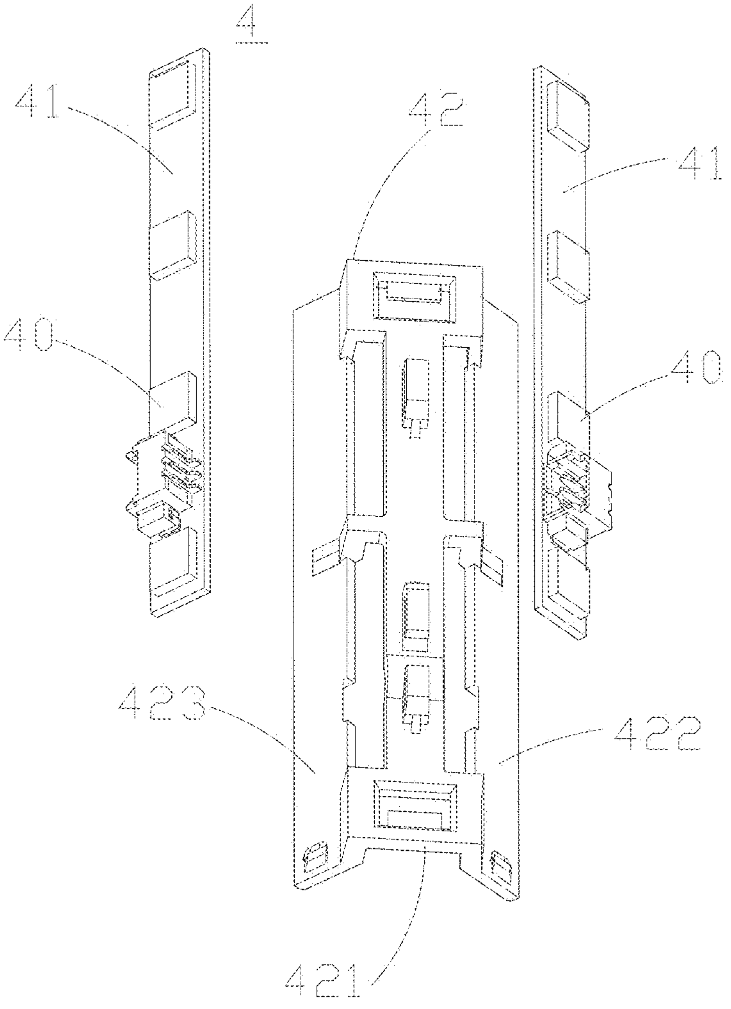
FIG. 14 is a schematic diagram of a light emitting assembly of the microphone shown in FIG. 1.

Referring to FIG. 13, the control assembly 3 further includes a first audio jack 35 arranged in the shell assembly 1 in a penetrating manner and connected to an external audio device, an earphone jack 36 for being connected to external earphones, and a second audio interface 37 for being connected to an external device to transmit data. The first audio jack 35, the earphone jack 36, and the second audio interface 37 are all electrically connected to the first circuit board 30. Specifically, the first audio jack 35, the earphone jack 36, and the second audio interface 37 are all arranged in the base plate 15 in a penetrating manner. The base plate 15 is provided with corresponding holes. The first audio jack 35 is configured to be connected to another external device such as a sound card or an audio device, to achieve seamless compatibility. The second audio interface 37 is configured to be connected to another device, such as a computer and a tablet, to achieve data transmission such as audio data transmission. The two audio jacks enhance the functionality of the microphone 100, which is convenient for a user to use multiple interfaces. The main function of the earphone jack 36 is to be connected to the earphones for transmission of audio signals, thus allowing a user to listen to sound through the earphones. Specifically, the second audio interface 37 can be a USB interface or a type-c interface.

Referring to FIG. 4 to FIG. 6 and FIG. 14, in this embodiment, the light emitting assembly 4 further includes a third circuit board 41 arranged in the first accommodating chamber 11*d*. Specifically, the third circuit board 41 is arranged in the second accommodating chamber 13*a*. The third circuit board 41 is electrically connected to and controls the light emitting unit 40 to emit light. The third circuit board 41 is electrically connected to the first circuit board 30. There are two or more third circuit boards 41, and there are two or more light emitting units 40. The light emitting units 40 are arranged on the third circuit boards 41, and the third circuit boards 41 are annularly arranged on an outer side of the first circuit board 30. The third circuit boards 41 can be flexible circuit boards or rigid circuit boards. The present disclosure does not limit this. The light emitting units 40 are LEDs. The LEDs can emit light with various colors and can be selected according to a need. The third circuit boards 41 are electrically connected to the light emitting units 40, which can better control the light emission of the light emitting units 40 to achieve various lighting effects, so that the user experience is better. By the arrangement of the plurality of third circuit boards 41 and light emitting units 40, the light can be displayed more uniformly on the outer shell 11, thereby enhancing the lighting effect of the microphone 100, enhancing the user experience, and improving the competitiveness of the product.

Further, the light emitting assembly 4 further includes a connector 42; the connector 42 is arranged on one side of the first circuit board 30; and the light emitting unit 40 is arranged on the connector 42. Specifically, in this embodiment, the third circuit board 41 is arranged on the connector 42. The connector 42 is connected to the mounting frame 16 and resists against the first circuit board 30. A connection relationship between the connector 42 and the mounting frame 16 is buckle connection. One of the connector 42 and the mounting frame 16 is provided with a buckle, and the other one is provided with a buckle slot, to achieve snap fit. In other embodiments, the connection relationship between the connector 42 and the mounting frame 16 may alternatively be fixed connection. Namely, the connection is achieved through a screw or an adhesive. The present disclosure does not impose a specific limitation on this.

Specifically, in the embodiments of the present disclosure, the connector 42 includes a connecting plate 421, a first extension plate 422 arranged on one side of the connecting plate 421, and a second extension plate 423 arranged on the other side of the connecting plate 421. The first extension plate 422 and the second extension plate 423 are respectively connected to two opposite sides of the connecting plate 421 and have an angle with the connecting plate 421. The first extension plate, the second extension plate, and the connecting plate are enclosed to form a semi-enclosed groove-like structure. The connecting plate 421 is in buckle connection with the mounting frame 16. One of the connecting plate and the mounting frame is provided with a buckle, and the other one is provided with a buckle slot, to achieve snap fit. The third circuit board 41 is arranged on the first extension plate 422 or the second extension plate 423. When there are a plurality of third circuit boards 41, the third circuit boards 41 are arranged on both the first extension plate 422 and the second extension plate 423. Specifically, in the embodiments of the present disclosure, the third circuit boards 41 are arranged on both the first extension plate 422 and the second extension plate 423.

In this embodiment, there are two connectors 42 which are arranged on two opposite sides of the first circuit board 30, and the connectors 42 wrap around at least a portion of the first circuit board 30. The two connectors 42 are respectively connected to two opposite sides of the mounting frame 16. The first circuit board 30 and the weight-balancing block 18 are respectively arranged on two other opposite sides of the mounting frame 16. The two connectors 42, the first circuit board 30, and the weight-balancing block 18 are annularly arranged at a periphery of the mounting frame 16. The two connectors 42 wrap around at least a portion of the first circuit board 30 and at least a portion of the weight-balancing block 18, and respectively resist against the first circuit board 30 and the weight-balancing block 18. Namely, the mounting frame 16, the first circuit board 30, and the weight-balancing block 18 are partially or entirely arranged between the two connectors 42, and the semi-enclosed groove-like structures of the two connectors 42 accommodate the mounting frame, the first circuit board, and the weight-balancing block. Specifically, the connecting plate 421 is connected to the mounting frame 16 and resists against the first circuit board 30 and the weight-balancing block 18. The first circuit board 30 and the weight-balancing block 18 are sandwiched between the first extension plate 422 and the second extension plate 423.

Specifically, the entire mounting frame 16 is generally a rectangular structure with a thickness, which has four side surfaces distributed in four vertical directions, namely a first side surface 161, a second side surface 162, a third side surface 163, and a fourth side surface 164. The first side surface 161 and the third side surface 163 are two side surfaces with large widths, and the second side surface 162 and the fourth side surface 164 are two side surfaces with small widths. The first side surface 161 and the third side surface 163 are arranged opposite to each other, and the second side surface 162 and the fourth side surface 164 are arranged opposite to each other. The first circuit board 30 and the weight-balancing block 18 are respectively arranged on the first side surface 161 and the third side surface 163. The two connectors 42 are respectively arranged on the second side surface 162 and the fourth side surface 164. By the arrangement of the connectors 42, the light emitting units 40 can be better fixed, and detachment of the light emitting units 40 can be avoided. Meanwhile, the two opposite connectors 42 wrap around the first circuit board 30, which can better protect the first circuit board 30 and make a better use of an internal space of the product, thereby reducing the cost of the product. The light emitting units 40 are arranged on the two opposite sides of the first circuit board 30. This design can make the distribution of light sources more uniform.

Specifically, the light emitting assembly 4 further includes an on/off button 43 arranged in the shell assembly 1 in a penetrating manner. The on/off button 43 is electrically connected to the third circuit board 41 to control the light emitting unit 40. The on/off button 43 is configured to control the light emitting unit 40 to be turned on and turned off, and to adjust the color and flashing mode of the light source, so that the product has high functionality.

Figure 15:
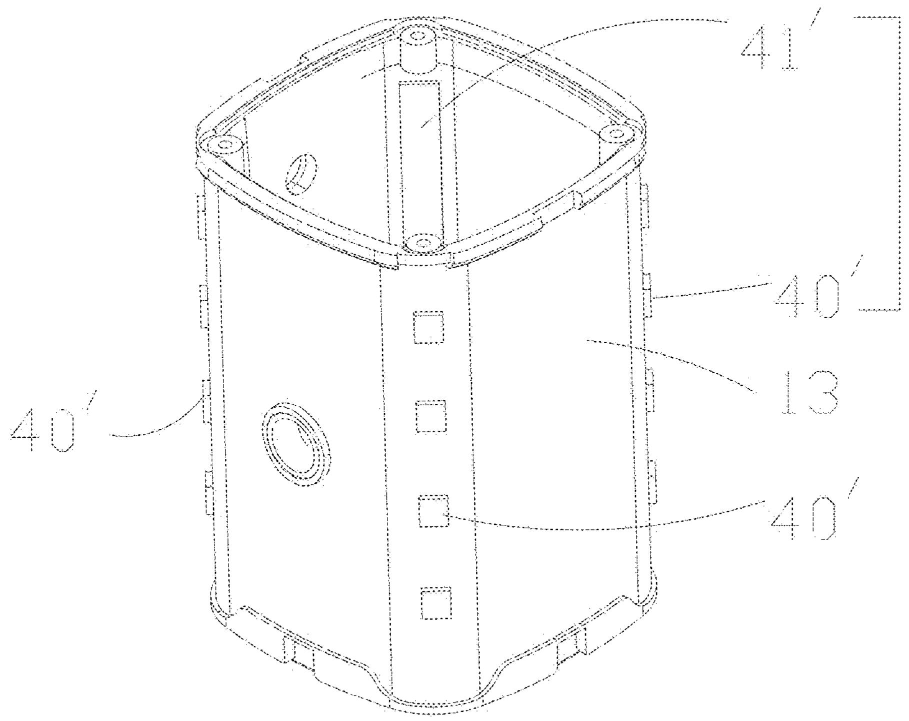
FIG. 15 is another schematic structural diagram of a light emitting assembly of a microphone according to a first embodiment of this application.

Referring to FIG. 15, FIG. 15 is another schematic structural diagram of a light emitting assembly of a microphone according to an embodiment of this application. In this embodiment, only a portion of the structure and positional relationship when the light emitting assembly 4' is compared with the light emitting assembly 4 in the previous embodiment. In this embodiment, the light emitting assembly 4' includes a light emitting unit 40' and a third circuit board 41'. The light emitting unit 40' is arranged on the third circuit board 41', and the third circuit board 41' is arranged at the inner shell 13. Specifically, the third circuit board 41' is arranged on an inner wall of the inner shell 13. The inner shell 13 is provided with a penetrating hole. The light emitting unit 40' is arranged in the hole in a penetrating manner. A light-emitting surface of the light emitting unit 40' faces the outer shell 11. When the light emitting unit 40' is turned on, emitted light can be transmitted through the outer shell 11. In this embodiment, the third circuit board 41' is arranged in an axial direction of the inner shell 13. In other embodiments, the third circuit board 41' may alternatively be arranged in a circumferential direction of the inner shell 13.

Figure 16:
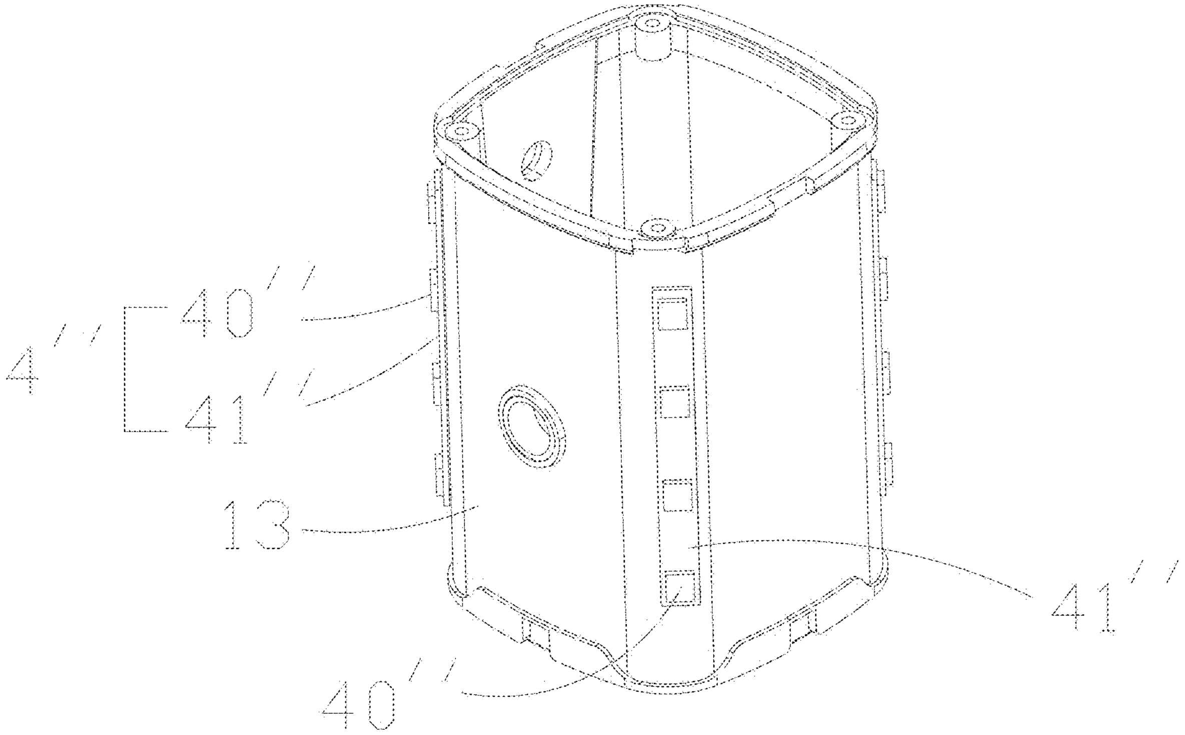
FIG. 16 is still another schematic structural diagram of a light emitting assembly of a microphone according to a first embodiment of this application.

Referring to FIG. 16, FIG. 16 provides still another schematic structural diagram of a light emitting assembly of a microphone. In this embodiment, when the light emitting assembly 4" is compared with the light emitting assembly 4 in the previous embodiment, only the positional relationship changes. Specifically, the light emitting assembly 4" includes a light emitting unit 40" and a third circuit board 41". The light emitting unit 40" is arranged on the third circuit board 41", and the third circuit board 41" and the light emitting unit 40" are arranged in the interval space **11*f*. Specifically, the third circuit board 41' is arranged on an outer side wall of the inner shell 13. A light-emitting surface of the light emitting unit 40" faces the outer shell 11. When the light emitting unit 40" is turned on, emitted light can be transmitted through the outer shell 11. In this embodiment, the third circuit board 41" is arranged in an axial direction of the inner shell 13. In other embodiments, the third circuit board 41" may alternatively be arranged in a circumferential direction of the inner shell 13**.

Continuing to refer to FIG. 1 to FIG. 7, the microphone 100 further includes a base 5 and a supporting assembly 6. The supporting assembly 6 is connected to the base 5, and the supporting assembly 6 is configured to be rotatably connected to the shell assembly 1. The supporting assembly 6 includes a support 61 and a rotating shaft 62. One end of the support 61 is connected to the base 5, and the rotating shaft 62 is arranged at one end of the support 61 away from the base 5. The rotating shaft 62 is arranged in the outer shell 11 in a penetrating manner, and the outer shell 11 is configured to rotate around the rotating shaft 62. Furthermore, one end of the support 61 away from the base 5 is rotatably connected to a side surface of the shell assembly 1. Specifically, one end of the support 61 away from the base 5 is rotatably connected to one end of the sidewall structure of the outer shell 11 away from the base plate 15.

In this embodiment, the support 61 is a unilateral support, and shell assembly 1 is supported and rotated only through the unilateral support. Specifically, the support 61 is only connected to one side surface of the outer shell 11. In this way, most of the area of the outer shell 11 can be redesigned for layout, so that the appearance of the product is neater and more beautiful. When the light emitting unit 40 emits light, the outer shell 11 can show a larger area of light and a cooler lighting effect.

Referring to FIG. 7, in this embodiment, the support 61 is connected to the base 5 by screwing. Specifically, an internal threaded hole is provided at one end of the support 61 connected to the base 5, and a bolt is in threaded connection with the internal threaded hole of the support 61 through the base 5. In this embodiment, the base 5 can be removed from the support 61 through the bolt, so that the microphone 100 can be connected to an external cantilever support through the internal threaded hole on the support 61, thereby expanding the usage scenario of the microphone 100. The microphone 100 can not only be used on a surface of an object, such as a desktop, but also suspended and used through the external cantilever support. By the arrangement of the base 5, the microphone 100 can be placed steadily on the surface of the object. The shell assembly 1 can rotate relative to the rotating shaft 62. As the shell assembly 1 can rotate, it is convenient for a user to adjust an inclination angle of the microphone 100, and it is more convenient for use and for the microphone head 20 to pick up sounds. The user experience is enhanced.

Figure 17:
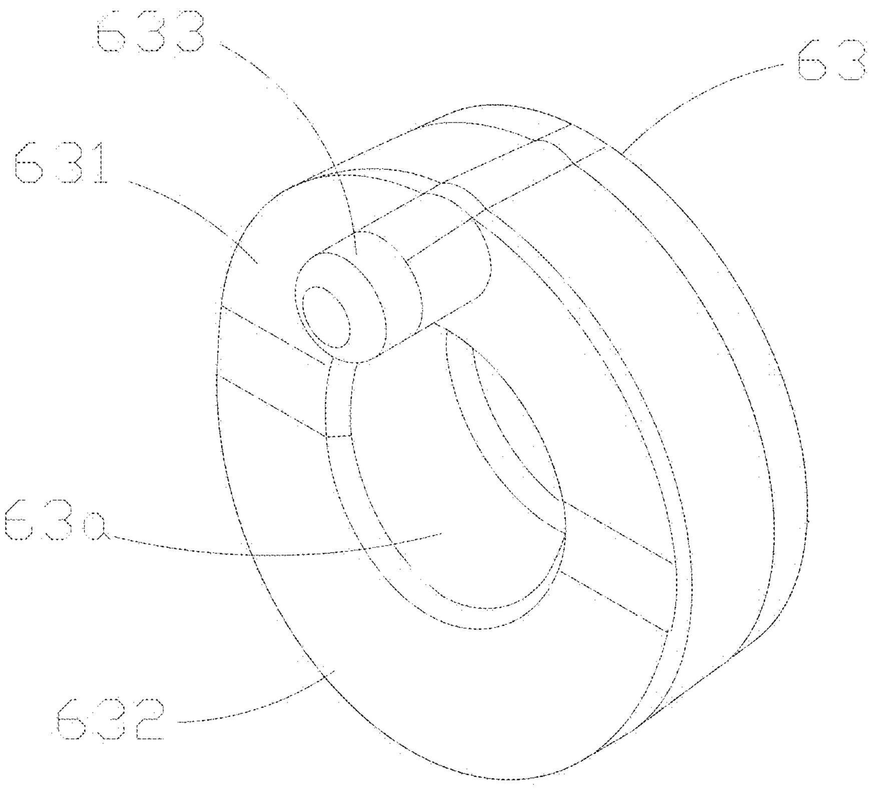
FIG. 17 is a three-dimensional diagram of a first gasket of the microphone shown in FIG. 1.

Referring to FIG. 4 and FIG. 5, the supporting assembly 6 further includes a first gasket 63 with a through hole 63*a*. The first gasket 63 is arranged between the outer shell 11 and the support 61. The rotating shaft 62 is arranged in the through hole 63*a* in a penetrating manner. Referring to FIG. 17 for details, the first gasket 63 includes a first portion 631 and a second portion 632. The first portion 631 and the second portion 632 are located on two opposite sides of an axis of the through hole 63*a*, and a thickness of the second portion 632 is greater than a thickness of the first portion 631. The second portion 632 is located at one end of the first gasket 63 close to the base 5. In this embodiment, the first gasket 63 is made of a soft material such as silica gel and rubber. The first gasket 63 can enlarge a contact area between the outer shell 11 and the support 61, so that the shell assembly 1 can be maintained in a desired angle after rotating relative to the support 61 to adjust the inclination angle. The first gasket 63 is set to have a thin top and a thick bottom, so that the shell assembly 1 can play a role of supporting and compensation under the action of its gravity and a supporting force of the rotating shaft 62. The second portion is thick, which can better support the shell assembly 1.

Referring to FIG. 8, the outer shell 11 is provided with a first mounting hole 11*c* and a first protrusion 111 configured to enhance the strength of the outer shell 11. The first protrusion 111 is annularly arranged at the first mounting hole 11*c*. The rotating shaft 62 is arranged in the first mounting hole 11*c* in a penetrating manner, and at least a portion of the first gasket 63 is arranged in the first mounting hole 11*c* in a penetrating manner.

Referring to FIG. 9, in this embodiment, a second mounting hole 13*b* for threading the rotating shaft 62 is also correspondingly provided at a position, corresponding to the first mounting hole 11*c* of the outer shell 11, on the inner shell 13. An inner diameter of the second mounting hole 13*b* is approximately equal to an inner diameter of the first mounting hole 11*c*. A second protrusion 131 is arranged at a periphery of the second mounting hole 13*b* to enhance the strength of the inner shell 13. The outer shell 11 has light transmittance, achieving light transmittance. Meanwhile, if the first mounting hole 11*c* is provided on the outer shell 11, the strength of the outer shell 11 will be inevitably affected. As the first protrusion 111 is arranged at the periphery of the first mounting hole 11*c*, it plays a reinforcing bar role, so that the strength of the outer shell 11 can be enhanced, avoiding damage to the outer shell 11 and ensuring that the product has good quality. Furthermore, the first protrusion 111 protrudes out of the outer shell 11, so that a gap is reserved between the support 61 and the outer shell 11. This allows the microphone 100 to have an avoidance space when it is rotated or deflects due to an external force, thereby avoiding friction and collision between the outer shell 11 and the support 61, avoiding the damage to the outer shell 11, and ensuring the beautiful appearance of the microphone 100.

Specifically, a third protrusion 132 is further arranged on the inner shell 13. The third protrusion 132 is annularly arranged at a periphery of the second protrusion 131 and is connected to the inner shell 13. A height of the third protrusion 132 is greater than that of the second protrusion 131. In this embodiment, the third protrusion 132 is integrally connected to the second protrusion 131. By the additional arrangement of the third protrusion 132, the shell strength close to the second mounting hole 13*b* of the inner shell 13 is further enhanced, ensuring that the shell strength of the inner shell 13 can be enough to bear and support the microphone 100. During rotation relative to the rotating shaft 62, it can still ensure that the shell strength will not be lowered, thereby prolonging the service life of the product.

Figure 11:
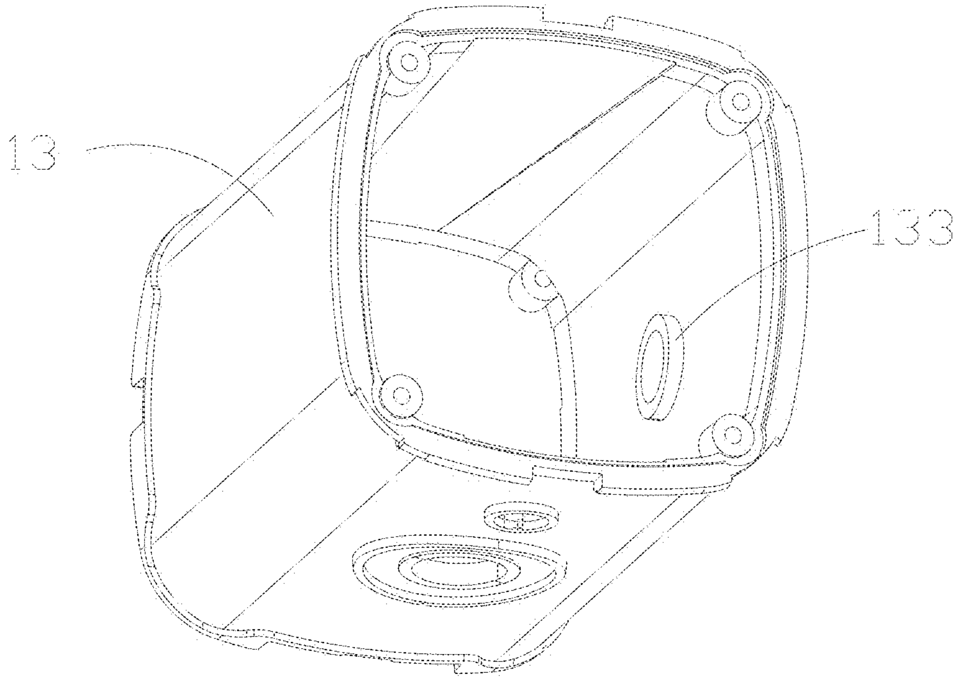
FIG. 11 is a three-dimensional diagram of then inner shell of the microphone in another shown in FIG. 1.
Figure 12:
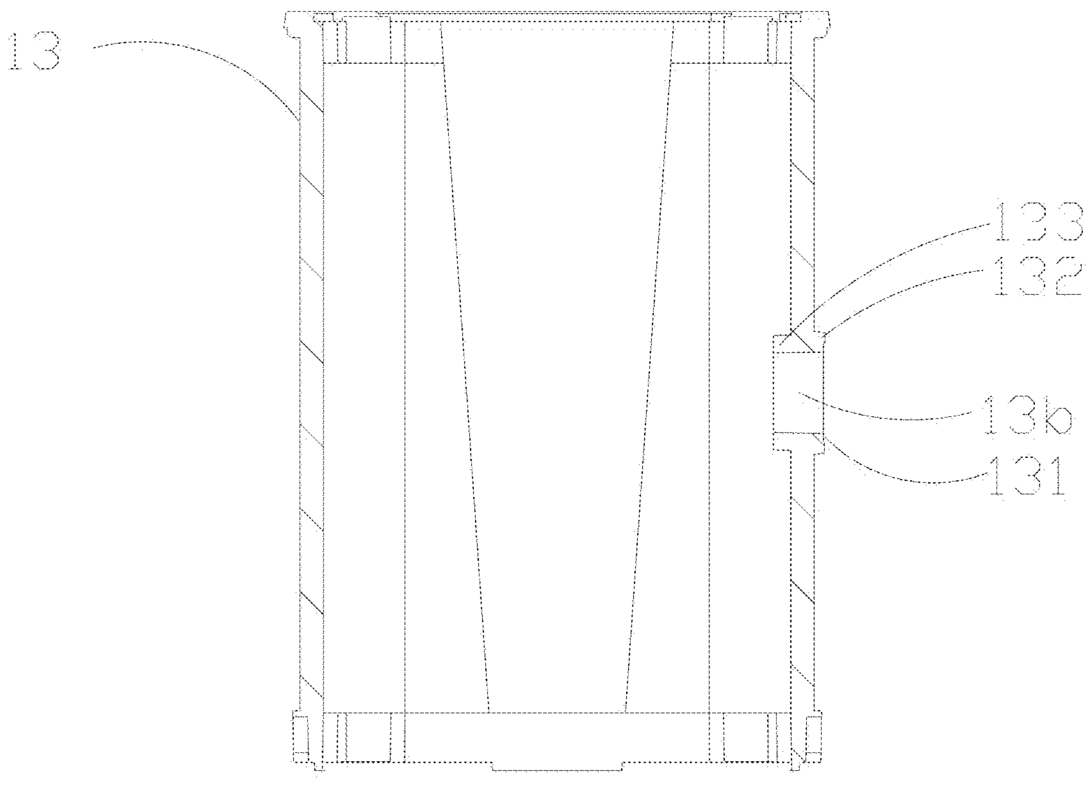
FIG. 12 is a cross-sectional diagram of an inner shell of the microphone shown in FIG. 7 along line VII-VII.

Referring to FIG. 11 and FIG. 12, the inner shell 13 is further provided with a fourth protrusion 133. The fourth protrusion 133 is annularly arranged at the second mounting hole 13*b*. The fourth protrusion 133 is arranged on one side of the inner shell 13 away from the outer shell 11. In this embodiment, the fourth protrusion 133 and the second protrusion 131, as well as the third protrusion 132, are respectively arranged on two sides of the inner shell 13, and are annularly arranged at the second mounting hole 13*b*. By the arrangement of the fourth protrusion 133, the shell strength of the inner shell 13 close to the second mounting hole 13*b* is further enhanced, thereby reducing the impact of the second mounting hole 13*b* on the shell strength of the inner shell 13.

Specifically, continuing to refer to FIG. 17, the first gasket 63 is provided with a positioning column 633. The positioning column 633 is located on the first portion 631 and faces one side of the outer shell 11. A positioning hole 11*e* is provided at a corresponding position on the outer shell 11. The positioning column 633 is arranged in the positioning hole 11*e* in a penetrating manner. In this embodiment, the positioning column 633 is made of a soft material and resists against the inner shell 13, specifically, the second protrusion 131. In other embodiments, the positioning column 633 is arranged in the positioning hole 11*e* in the penetrating manner and may not resist against the inner shell 13 or the second protrusion 131. By the arrangement of the positioning column 633 on the first gasket 63 and cooperation with the positioning hole 11*e* on the outer shell 11, it can ensure that the relative positions of the first gasket 63 and the outer shell 11 are fixed, so that when the outer shell 11 rotates relative to the rotating shaft 62, the first gasket 63 rotates with the outer shell 11, thereby increasing the friction force during the rotation, ensuring that the shell assembly 1 can be maintained in an angle desired by a user without rotation, and improving the stability of the microphone 100. Referring to FIG. 4 and FIG. 5, the supporting assembly 6 further includes a fastener 64. The fastener 64 is connected to one end of the rotating shaft 62 away from the outer shell 11 and is located on one side of the support 61 away from the outer shell 11. In this embodiment, the rotating shaft 62 is connected to the fastener 64 in a non-rotatable manner. The end of the rotating shaft 62 connected to the fastener 64 is designed as a polygon along an axial view. A matching slot is provided in the fastener 64, so that the non-rotatable connection between the rotating shaft 62 and the fastener 64 is achieved. In other embodiments, the rotating shaft 62 can be fixedly connected to or integrally formed with the corresponding fastener 64. The supporting assembly 6 further includes a second gasket 65. The second gasket 65 is arranged between the support 61 and the fastener 64. By the arrangement of the fastener 64, the rotating shaft 62 passes through the support 61 to ensure the length of the rotating shaft 62 and to further play a balancing role. The support 61 acts as a fulcrum, so that the shell assembly 1 and the fastener 64 are located at two ends of the rotating shaft 62, thereby balancing the weight of the shell assembly 1. In addition, the fastener 64 can further ensure that the rotating shaft 62 will not fall off from the support 61. The second gasket 65 can enlarge a contact area between the support 61 and the fastener 64, thereby achieving antislip and stabilizing effects.

The sound pickup assembly 2 further includes a mesh enclosure 21, and the mesh enclosure 21 covers the microphone head 20. In this embodiment, the mesh enclosure 21 further covers the mounting seat 12 and resists against the cover plate 14. The shell assembly 1 further includes a sponge cover 1A. The sponge cover 1A is covered at the mesh enclosure 21 and resists against the outer shell 11. On the one hand, the sponge cover 1A can effectively prevent popping noise, protect the microphone head 20 of the microphone 100, and prevent saliva splashing On the other hand, an air flow of plosive directly blown to the microphone head 20 can be reduced, thereby prolonging the service life of the microphone 100 and enhancing the user experience.

Second Embodiment

Figure 18:
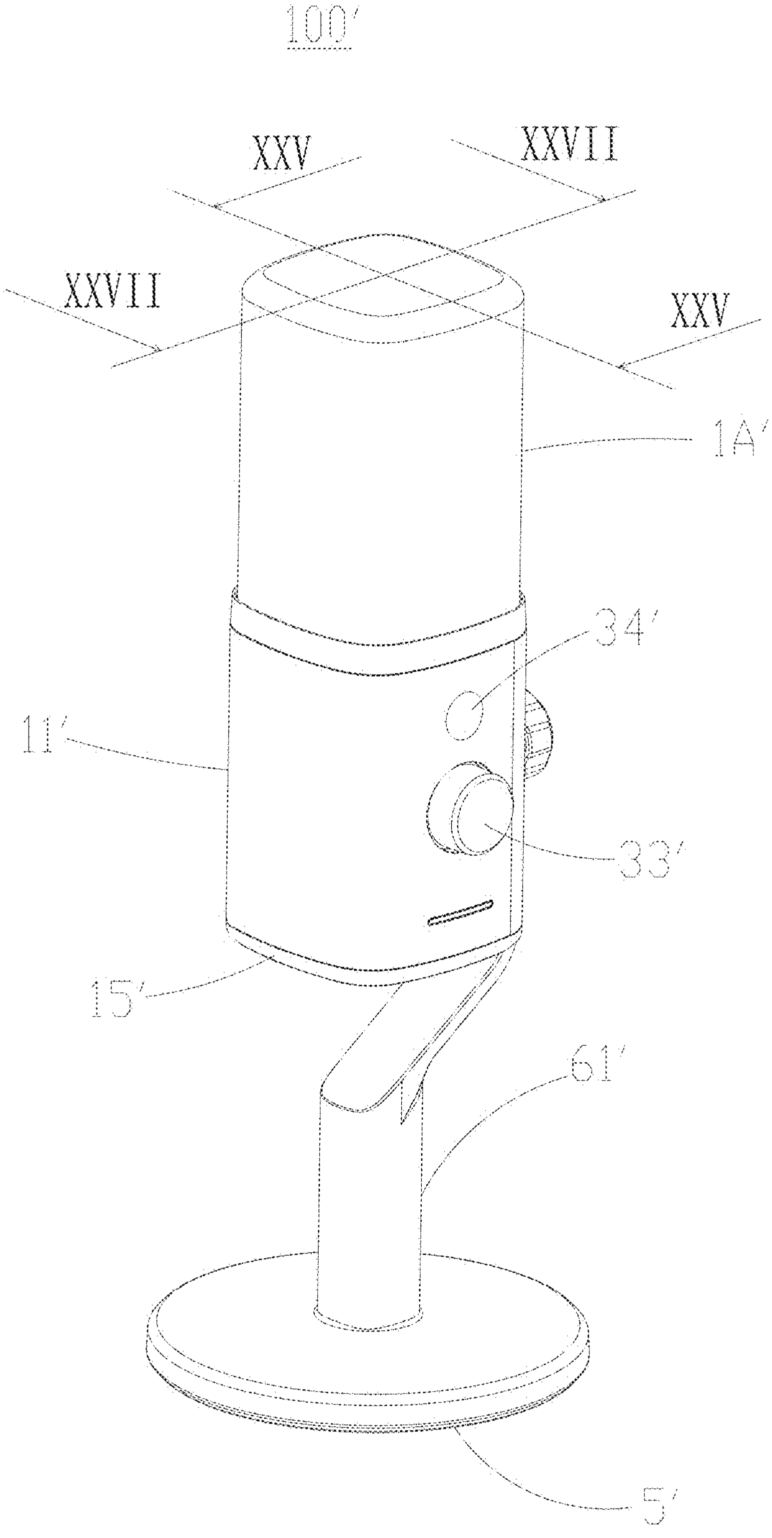
FIG. 18 is a three-dimensional diagram of a microphone according to a second embodiment of this application.
Figure 19:
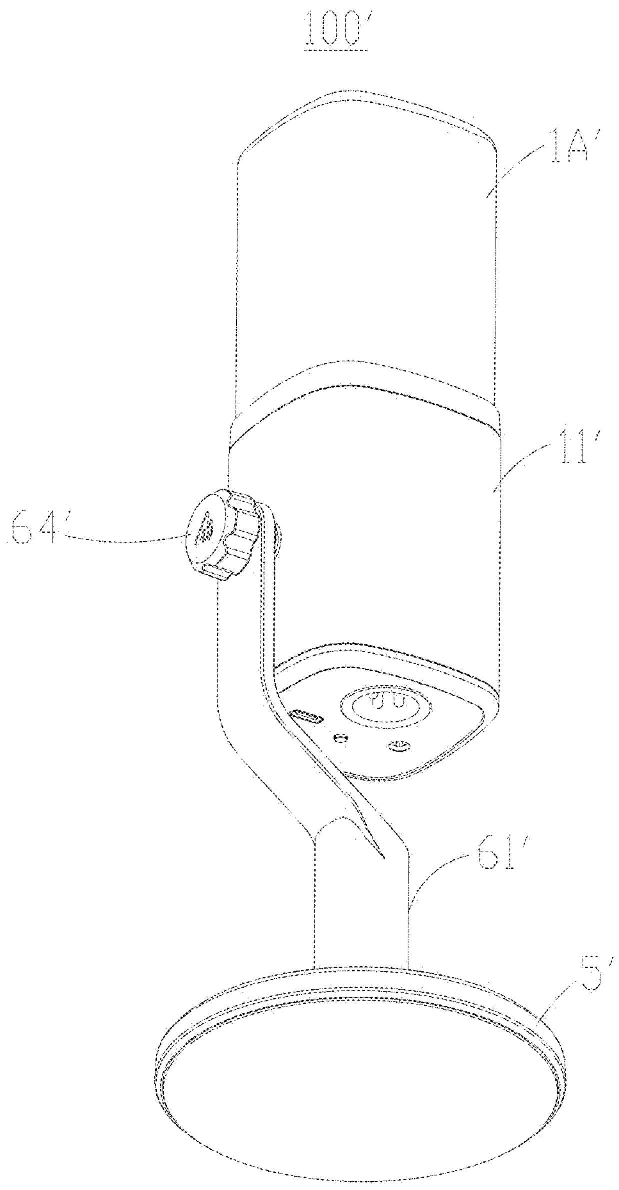
FIG. 19 is a three-dimensional diagram of the microphone in another angle according to the second embodiment of this application.
Figure 20:
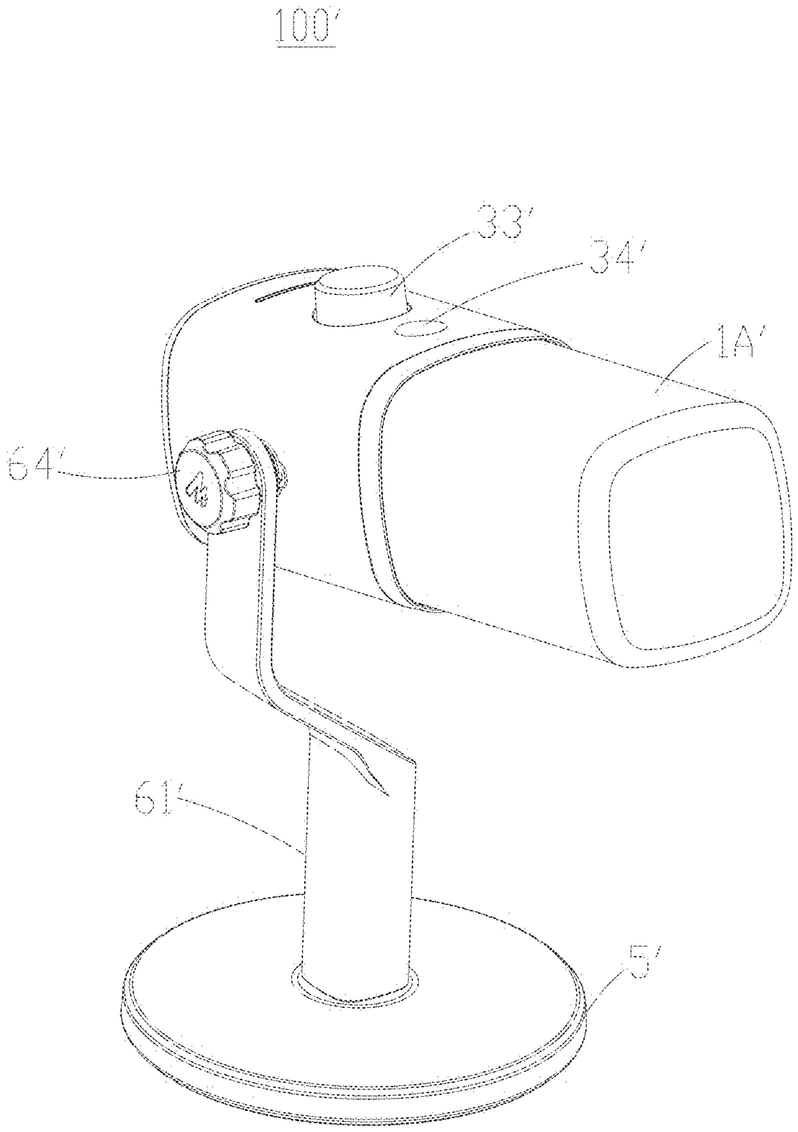
FIG. 20 is a three-dimensional diagram of the microphone in a usage state according to the second embodiment of this application.

Please refer to FIG. 18, FIG. 19 and FIG. 20. FIG. 18 and FIG. 19 are three-dimensional diagrams of the microphone 100' according to the second embodiment of the present disclosure in two different angles. When not in use, the microphone 100' can be rotated to a state shown in FIG. 18 or FIG. 19 for convenient storage and carrying. FIG. 20 is a three-dimensional diagram of the microphone 100' in a usage state according to an embodiment of the present disclosure. When using the microphone 100', a user will rotate and adjust the microphone 100' to a proper angle for better sound pickup, such as a usage state shown in FIG. 20, which is only a schematic diagram of a rotation angle. The microphone 100' disclosed in the present disclosure can be rotated according to a need of the user and maintained in different angles. The present disclosure will not show and elaborate them one by one again.

Figure 21:
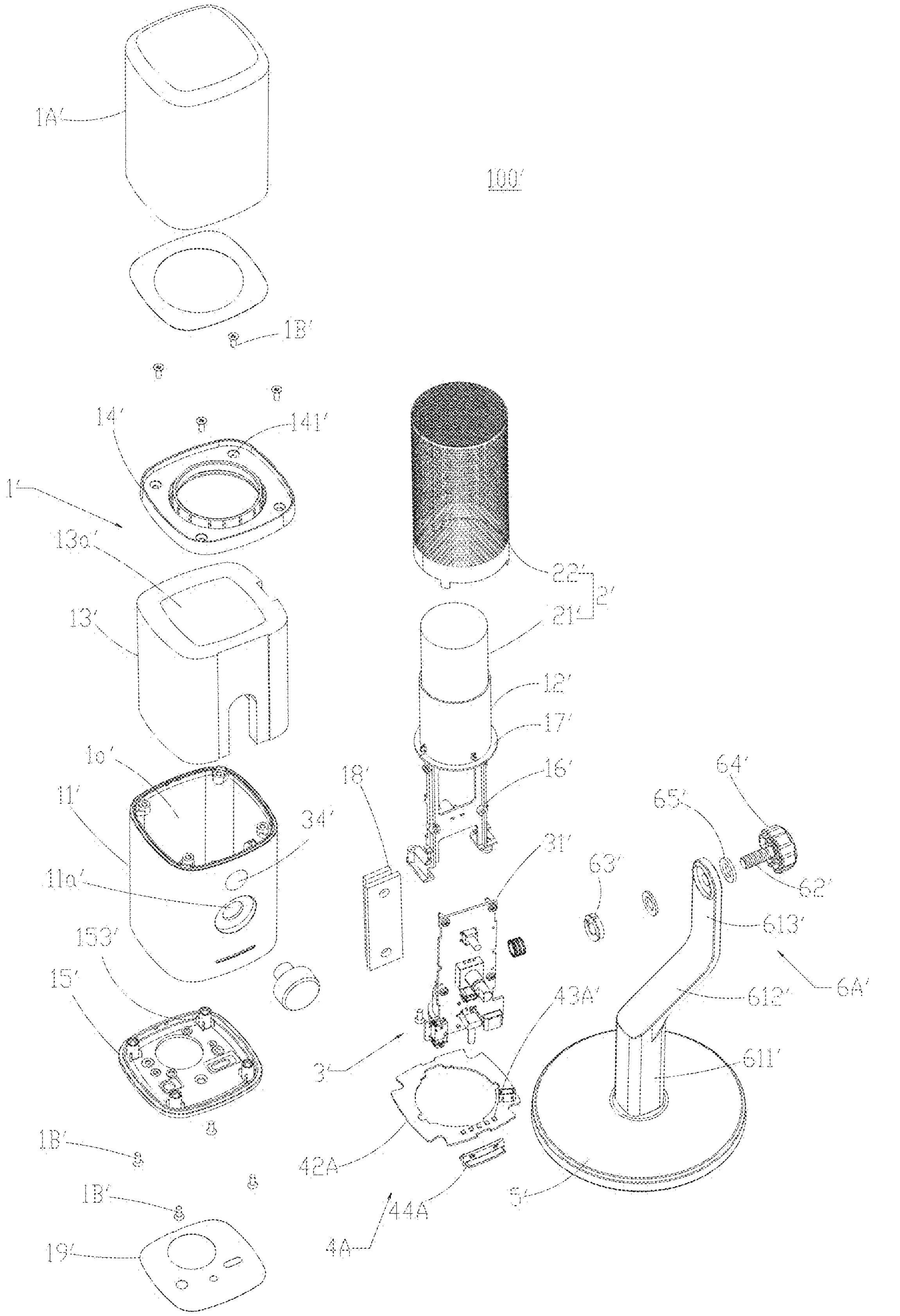
FIG. 21 is an exploded diagram of the microphone according to the second embodiment of this application.
Figure 22:
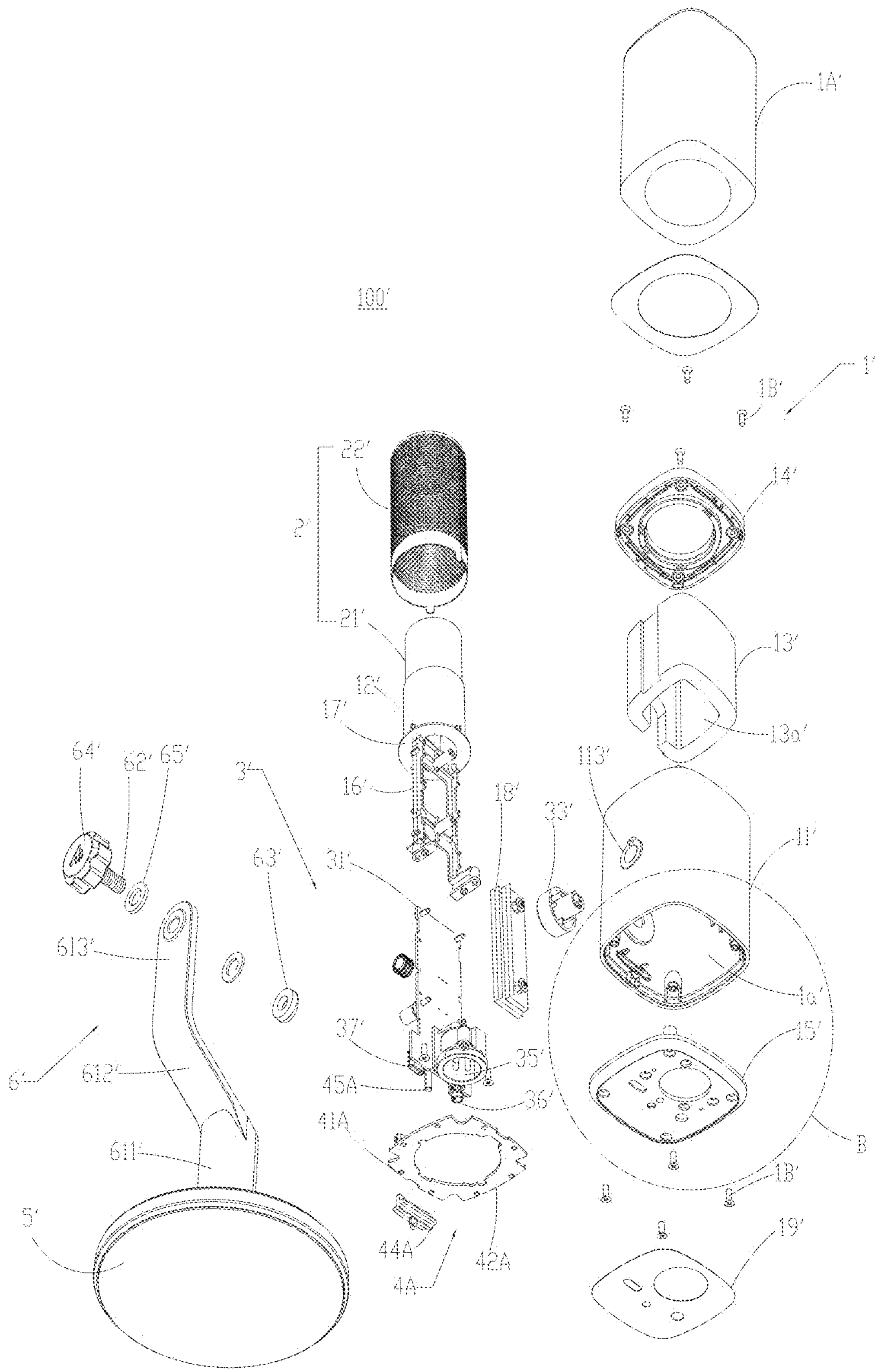
FIG. 22 is an exploded diagram of the microphone in another angle according to the second embodiment of this application.

Referring to FIG. 21 and FIG. 22, the microphone 100' according to an embodiment of the present disclosure includes a shell assembly 1', a sound pickup assembly 2', a control assembly 3', a light emitting assembly 4A and a connecting frame 6'. The shell assembly 1' includes an outer shell 11', a cover plate 14' and a base plate 15'. The cover plate 14' and the base plate 15' are arranged to cover the opposite ends of the outer shell 11'. The outer shell 11', the cover plate 14' and the base plate 15' enclose to form a first accommodating chamber 1*a*'. The sound pickup assembly 2' includes a microphone head 21' for sound pickup, and the microphone head 21' is arranged at one end of the shell assembly 1' adjacent to the cover plate 14'. The control assembly 3' includes a first circuit board 31', the first circuit board 31' is arranged in the first accommodating chamber 1*a*', and is electrically connected to the microphone head 21'. The light emitting assembly 4A includes a light emitting unit 41A, the light emitting unit 41A is arranged in the first accommodating chamber 1*a*' and is electrically connected to the first circuit board 31', and the light emitting unit 41A is configured to allow emitted light to pass through the base plate 15'. The connecting frame 6' is configured to be rotatably connected to the shell assembly 1', and is further configured to support the microphone 100' on an external object. Further, the outer shell 11' and the base plate 15' correspond to the shell body 10 in the above embodiment.

Compared with the prior art, the microphone 100' provided in the present disclosure employs the light emitting unit 41A to transmit the emitted light through the base plate 15' to the outside of the shell assembly 1', thereby enabling the microphone 100' to produce colorful lighting effects during use. This configuration not only enhances the functionality of the microphone 100' but also allows users to enjoy both auditory and visual effects simultaneously, which significantly improves the product's entertainment value. Additionally, the provision of the connecting bracket 6' facilitates the rotation of the shell assembly 1', enabling users to adjust the angle and enabling multi-scenario use.

In this embodiment, when the microphone 100' is placed vertically on an object surface (e.g., a desktop) as shown in FIG. 18, the cover plate 14', the outer shell 11', and the base plate 15' are sequentially arranged from top to bottom, with the base plate 15' positioned at the bottom of the microphone 100'. By this configuration, when the light emitted from the light emitting unit 41A passes through the base plate 15' to generate lighting effects, such lighting effects do not interfere with the user's operation during use of the microphone 100', while still allowing both the user and audience to clearly observe the lighting effect, thereby providing dazzling visual displays for all observers.

Specifically, in this embodiment, the light emitting unit 41A includes a plurality of LED lamp beads. The LED lamp beads can emit light in multiple colors, thereby producing the lighting effects more dazzling and aesthetically pleasing.

To prevent light emitted by the light emitting unit 41A from transmitting through other portions of the shell assembly 1' (which could interfere with user operation or cause light pollution), both the outer shell 11' and the cover plate 14' are configured with light shielding properties. This configuration restricts light transmission exclusively through the base plate 15', creating circumferential lighting effect around the bottom of the microphone 100'. To enhance the lighting effect presented by the base plate 15', the base plate 15' has light transmittance, allowing the light emitted by the light emitting unit 41A to pass through. The present application provides flexible light-transmittance characteristics for the base plate 15', including but not limited to: full light transmission, high-transmissivity, or low-transmissivity configurations. The base plate 15' may incorporate different material compositions according to predetermined light-transmission requirements to achieve selective light transmission. This enables the selective transmission of user-preferred light spectra, thereby enhancing visual performance.

Figure 23:
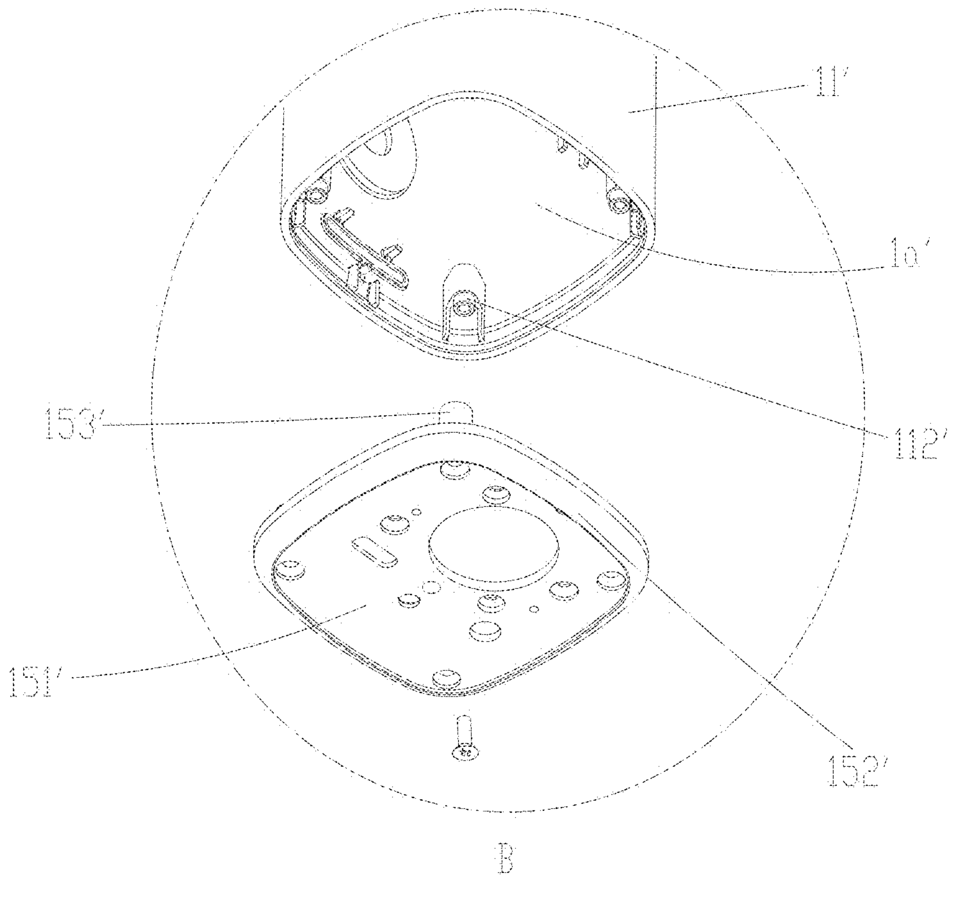
FIG. 23 is an enlarged view of part B of the microphone shown in FIG. 22.

Specifically, with reference to FIGS. 21 to 23, the base plate 15' includes a main body 151' and a connecting portion 152'. The connecting portion 152' is arranged along the periphery of the main body 151' and abuts against the outer shell 11'. The outer surface of the outer shell 11' and the outer surface of the connecting portion 152' collectively form a smooth curved surface. The light emitting unit 41A is configured to allow emitted light to pass through the connecting portion 152'. In this embodiment, the outer surface of the connecting portion 152' and the outer surface of the outer shell 11' abut against each other to form either a continuous curved surface or a planar surface, thereby presenting the microphone 100' shell body as an integrated structure. The light emitted by the light emitting unit 41A can transmit through the connecting portion 152', enabling the microphone 100' to provide bottom lighting effect that enhance visual perception for both users and audiences, consequently improving the product's entertainment value. The base plate 15' is fabricated from light-transmitting materials including, but not limited to: glass, organic polymer light-transmissive materials (e.g., acrylic panels), light-transmissive composite materials, and light-transmitting plastics, provided such materials achieve the required light transmission. In some other embodiments, the base plate 15' may include translucent materials such as: thermoplastic polymers, polymethyl methacrylate (PMMA), polyethylene (PE), polypropylene (PP), polyester (PET), polyvinyl chloride (PVC), polyamide (PA), cellulose acetate, polystyrene (PS), or polytetrafluoroethylene (PTFE), provided these materials achieve the desired translucency.

In this embodiment, the shell assembly 1' further includes a light shielding member 19'; the light shielding member 19' is arranged on the main body 151', and the light shielding member 19' is configured to shield the light emitted by the light emitting unit41A from being transmitted to the outside through the main body 151'. Specifically, the light shielding member 19' is arranged on the surface of the base plate 15' away from the cover plate 14', thereby shielding the light passing through the main body 151'. Using the light shielding member 19' to shield the main body 151' prevents the light from the light emitting unit 41A from being transmitted through the main body 151'. This configuration facilitates assembly and production and improves production efficiency. In this embodiment, the light shielding member 19' additionally serve as a decorative element that conceals fastening components including screws and bolts, thereby enhancing product aesthetics. In other embodiments, the light shielding member 19' may also be arranged on the side of the cover plate 14' facing the first accommodating chamber 1*a'*. The light shielding member 19' may include either a light-blocking panel or a light-blocking coating.

In another embodiment, the main body 151' has light shielding properties, while the connecting portion 152' has light transmittance. The main body 151' and the connecting portion 152' are made of materials with different light-transmissive characteristics.

The light shielding design of the main body 151' prevents the lighting effect from being displayed through the main body 151', allowing the lighting effect to be presented circumferentially around the connecting portion 152'. This results in a better visual effect in a nighttime environment.

Furthermore, the light emitting assembly 4A includes a second circuit board 42A, the light emitting unit 41A is electrically connected to the second circuit board 42A, and the second circuit board 42A is electrically connected to the first circuit board 31'; the second circuit board 42A is arranged in the first accommodating chamber 1*a'* adjacent to the base plate 15'. Specifically, the second circuit board 42A is arranged in parallel with the base plate 15'; the light emitting unit 41A is arranged on a surface of the second circuit board 42A facing the base plate 15'. The second circuit board 42A has two oppositely arranged surfaces, which face the base plate 15' and the cover plate 14' respectively. The light emitting unit 41A is arranged on the surface of the side of the second circuit board 42A facing the base plate 15'. The second circuit board 42A is electrically connected to the light emitting unit 41A to enable individual control of the light emitting unit 41A. This allows for a better display of lighting effects and also enables better control over the light emitting unit 41A to present different lighting effects. The light emitting unit 41A is arranged on the second circuit board 42A, allowing the emitted light to directly pass through the base plate 15' for a better lighting effect. In this embodiment, the first circuit board 31' is arranged vertically, while the base plate 15' and the second circuit board 42A are arranged horizontally. The second circuit board 42A is perpendicular to the first circuit board 31'. Specifically, the second circuit board 42A is annular and is arranged at the outer periphery of the first circuit board 31'. The light emitting unit 41A consists of LED lamp beads. Multiple LED lamp beads are evenly distributed on the second circuit board 42A. Thus, when the light emitted by the LED lamp beads passes through the base plate 15', the displayed lighting effect is more uniform and the light effect is better.

In other embodiments, the light emitting unit 41A may also be arranged between the second circuit board 42A and the base plate 15', provided that such configuration enables the light emitted by the light emitting unit 41A to pass through the base plate 15'.

To facilitate the control of the activation and deactivation of the light emitting unit 41A, the light emitting assembly 4A further includes a switch button 45A penetrating through the base plate 15'. The switch button 45A is electrically connected to the first circuit board 31' to control the light emitting unit 41A. The switch button 45A is configured to control the activation and deactivation of the light emitting unit 41A, as well as adjust the color and blinking mode of the light source, thereby making the functions of the product more diverse and powerful.

Figure 24:
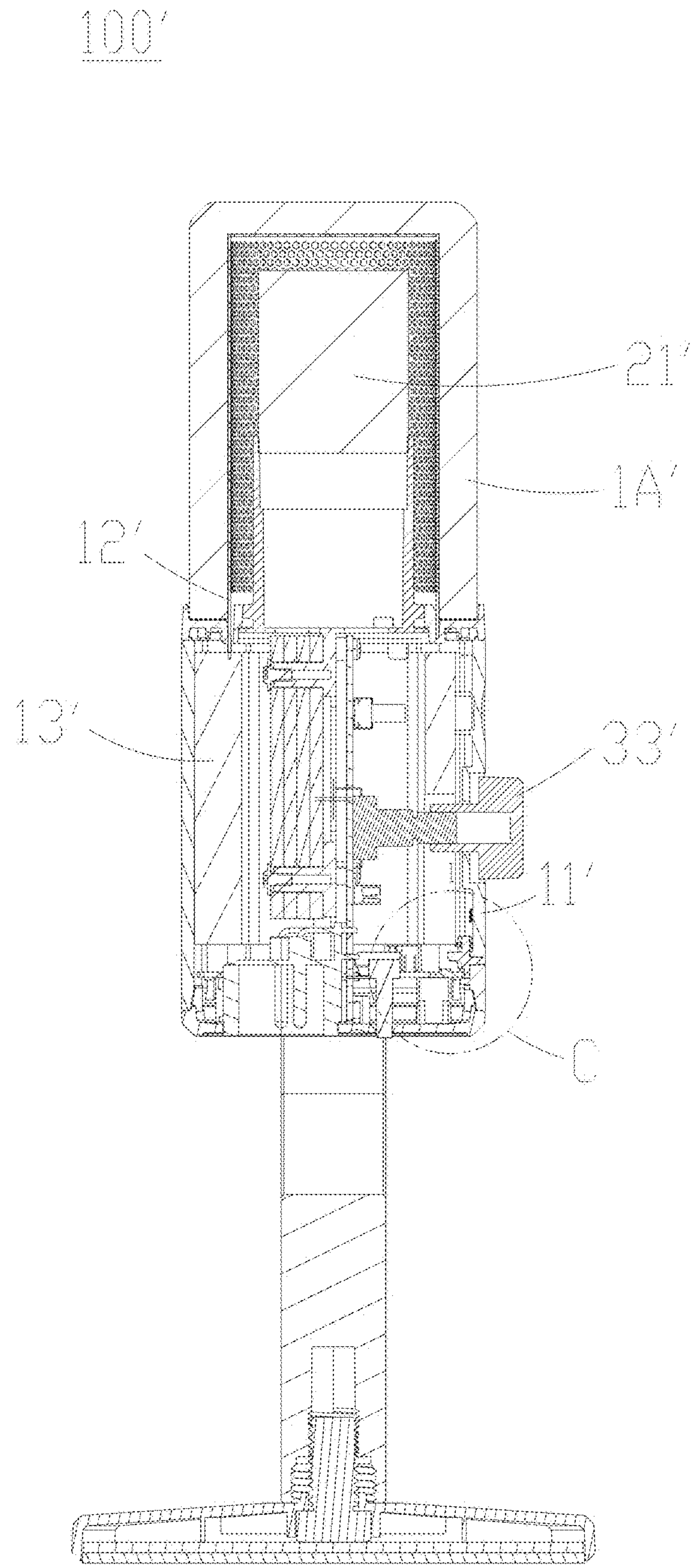
FIG. 24 is a cross-sectional diagram of the microphone shown in FIG. 18 along line XXIV-XXIV.
Figure 25:
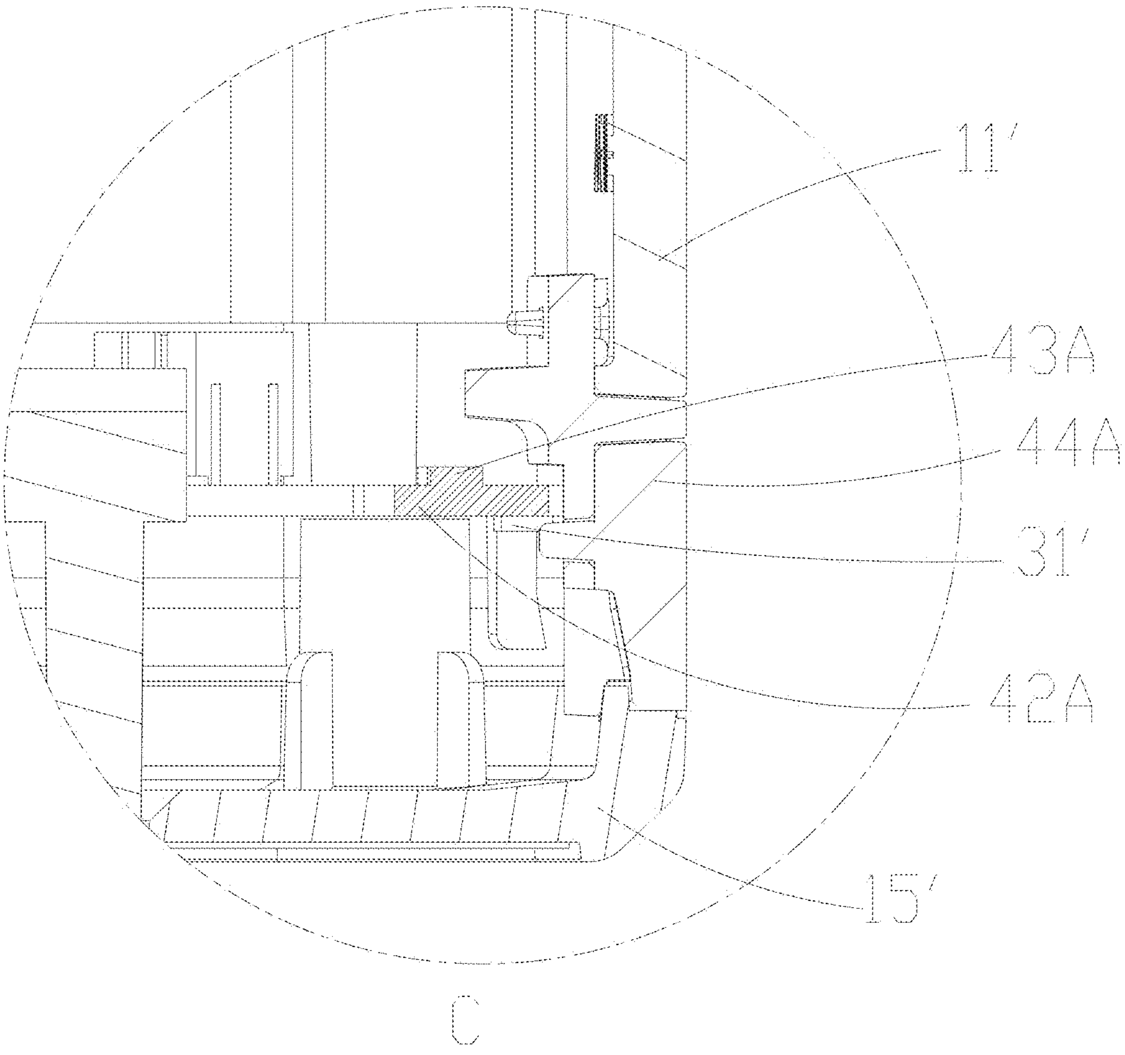
FIG. 25 is an enlarged view of part C of the microphone shown in FIG. 24.

In this embodiment, the light emitting assembly 4A further includes an indicator light 43A and a light guide member 44A. The indicator light 43A is electrically connected to the second circuit board 42A, the indicator light 43A is configured to emit light, the light guide member 44A is configured to transmit the light emitted by the indicator light 43A to the outside of the outer shell 11'. Specifically, the outer shell 11' is provided with a through hole 11*a'*, a portion of the light guide member 44A is arranged in the through hole 11*a'*, the surface of the exposed portion of the light guide member 44A passing through the through hole 11*a'* is flush with the outer surface of the outer shell 11'. As shown in FIG. 24 and FIG. 25, in this embodiment, the indicator light 43A is arranged on the surface of the second circuit board 42A that faces the microphone head 21', so that the indicator light 43A and the light-emitting unit 41A are arranged on two opposite surfaces of the second circuit board 42A, thus avoiding the mutual interference of the light emitted by the two. The indicator light 43A is controlled by the second circuit board 42A, which results in a better control effect. Moreover, the light of the indicator light 43A is transmitted through the outer shell 11', and its lighting effect does not interfere with that of the base plate 15'. They can cooperate with each other and are convenient to distinguish. Arranging the light guide member 44A to guide the light emitted by the indicator light 43A to the outside of the outer shell 11' can enhance the indicating light effect.

To reinforce the support strength of the outer shell 11', the shell assembly 1' further includes an inner shell 13' arranged in the first accommodating chamber 1*a*' and connected to the outer shell 11'. The inner shell 13', which is a hollow cylindrical structure, is configured to abut against the outer shell 11' so as to enhance the support strength of the outer shell 11'. The inner shell 13' has light shielding properties. The inner shell 13' is provided with a second accommodating chamber 13*a*', and the first circuit board 31' is arranged in the second accommodating chamber 13*a*'. The second circuit board 42A is arranged on one end of the inner shell 13' adjacent to the base plate 15', the cover plate 14' is arranged on the other end of the inner shell 13'. The arrangement of the inner shell 13' to enhance the strength of the outer shell 11' improves the overall strength of the product. Moreover, it facilitates production and assembly, thereby increasing production efficiency. Meanwhile, the arrangement of the inner shell 13' also provides an additional layer of protection for the internal components, preventing the internal components from being affected when the outer shell 11' is externally impacted.

Figure 26:
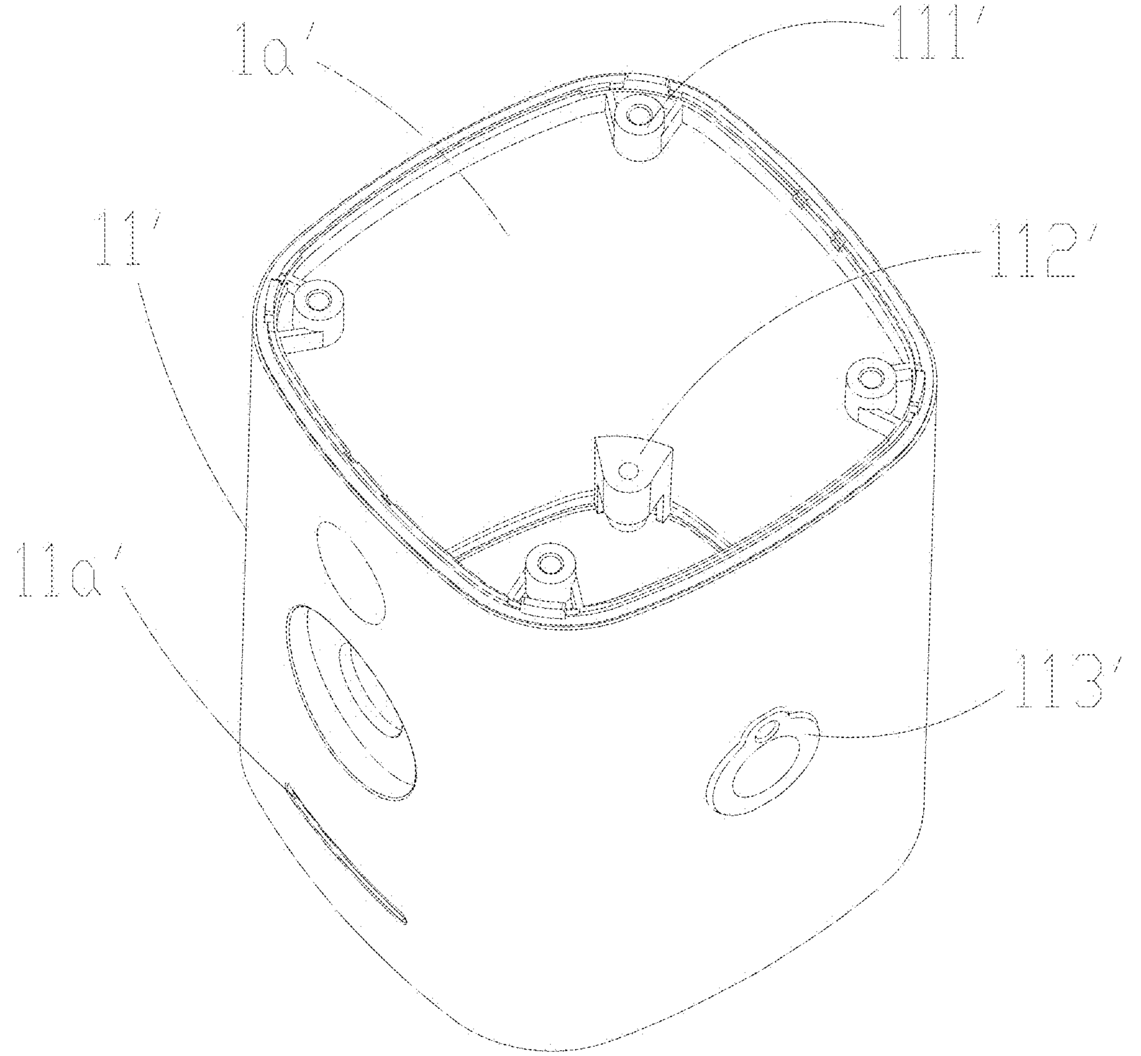
FIG. 26 is a three-dimensional diagram of the outer shell of the microphone shown in FIG. 18.

Referring to FIG. 21, FIG. 22 and FIG. 26, the outer shell 11' is provided with a first fixing portion **11*l*' and a second fixing portion 112'. The first fixing portion 111' and the second fixing portion 112' both extend into the first accommodating chamber 1***a*'. Specifically, the number of the first fixing portions 111' and the second fixing portions 112' is four respectively, and they are evenly distributed at both ends of the outer shell 11'. The first fixing portion 111' and the second fixing portion 112' are provided with internal threads. The cover plate 14' is provided with a third fixing portion 141', and the base plate 15' is provided with a fourth fixing portion 153'. Specifically, the third fixing portion 141' and the fourth fixing portion 153' are provided with through holes 11*a*', and the through holes 11*a*' are arranged corresponding to the first fixing portion 111' and the second fixing portion 112' respectively. The shell assembly 1' further includes a plurality of fixing members 1B'. Specifically, the fixing members 1B' are screws. The first fixing portion 111' is connected to the third fixing portion 141' by screws, and the second fixing portion 112' is connected to the fourth fixing portion 153' by screws, so as to respectively cover the cover plate 14' and the base plate 15' on both ends of the outer shell 11'. In this embodiment, the light shielding member 19' can also cover components such as screws, making the product more aesthetically pleasing in appearance.

In the embodiment of the present disclosure, in order to facilitate the production and assembly of the microphone 100', the shell assembly 1' further includes a mounting frame 16' and a weight-balancing block 18'. The longitudinal direction of the mounting frame 16' is consistent with the longitudinal direction of the microphone 100'. The mounting frame 16' is arranged in the first accommodating chamber 1*a*', specifically, the mounting frame 16' is arranged in the second accommodating chamber 13*a*'. The weight-balancing block 18' and the first circuit board 31' are arranged on opposite sides of the mounting frame 16' and connected to the mounting frame 16'. The weight-balancing block 18' is configured to balance the weight of the shell assembly 1' so as to make the center of gravity of the microphone 100' positioned on the axis of the outer shell 11'. Specifically, the first circuit board 31' is connected to the mounting frame 16' by means of screw fixation. The weight-balancing block 18' is fixedly connected to the mounting frame 16' by screws. In other embodiments, other connection methods can also be adopted to realize the connection between the first circuit board 31' and the mounting frame 16'. The weight-balancing block 18' can also be connected to the mounting frame 16' by means of adhesive, buckle, or other fastening methods. The arrangement of the mounting frame 16' facilitates the production and assembly of various components. And the weight of the shell assembly 1' is adjusted and balanced by the weight-balancing block 18' to ensure that the center of gravity of the microphone 100' is positioned on the axis of the outer shell 11'. Thus, the stability of the microphone 100' is ensured when the microphone 100' is adjusted or rotated.

Specifically, one end of the mounting frame 16' extending along its longitudinal direction is connected to the base plate 15' screws, and the other end is connected to a mounting seat 12'. The mounting seat 12' is configured to mount the microphone head 21'. The shell assembly 1' further includes a partition plate 17'. The partition plate 17' is connected to the mounting seat 12' and the mounting frame 16', and the mounting seat 12' and the mounting frame 16' are arranged on two opposite sides of the partition plate 17'. The partition plate 17' is provided with a hole for a wire to pass through, and the wire is configured to be electrically connected to the microphone head 21' and the first circuit board 31'. By the arrangement of the partition plate 17', the positions of the mounting seat 12' and the mounting frame 16' are more obvious and easier to distinguish, so that efficient assembling can be achieved during assembling, and the production efficiency can be improved, thereby reducing the production cost of the product.

In this embodiment, the sound pickup assembly 2' further includes a mesh enclosure 22', and the mesh enclosure 22' covers the microphone head 21'. In this embodiment, the mesh enclosure 22' further covers the mounting seat 12' and abuts against the cover plate 14'. The shell assembly 1' further includes a sponge cover 1A'. The sponge cover 1A' is covered at the mesh enclosure 22' and abuts against the outer shell 11'. On the one hand, the sponge cover 1A' can effectively prevent popping noise, protect the microphone head 21' of the microphone 100', and prevent saliva splashing. On the other hand, an air flow of plosive directly blown to the microphone head 21' can be reduced, thereby prolonging the service life of the microphone 100' and enhancing the user experience.

In this embodiment, the sound pickup assembly 2' further includes a mesh enclosure 22', and the mesh enclosure 22' covers the microphone head 21'. In this embodiment, the mesh enclosure 22' further covers the mounting seat 12' and abuts against the cover plate 14'. The shell assembly 1' further includes a sponge cover 1A'. The sponge cover 1A' covers the mesh enclosure 22' and abuts against the outer shell 11'. On the one hand, the sponge cover 1A' can also effectively prevent popping caused by plosive sounds and prevent saliva from splashing into the microphone head 21' of the microphone 100'. On the other hand, the direct impact of the airflow of plosive sounds on the microphone head 21' can be reduced, thereby prolonging the service life of the microphone 100' and enhancing the user experience.

To facilitate user operation, the control assembly 3' further includes a function key. The function key is arranged in the outer shell 11' in a penetrating manner and is electrically connected to the first circuit board 31'. The function key penetrates the outer shell 11' and is disposed on the same side of the outer shell 11' as the through hole 11*a*'. The function key is configured to adjust the signal amplification level input to the microphone 100' or the signal strength output by it, and to enable or disable its mute function. The arrangement of the function key facilitates users to adjust and control the microphone 100'. Specifically, the function key further includes a function knob 33' and a mute button 34' configured to control the microphone 100' to be muted. Both the outer shell 11' and the inner shell 13' are provided with holes through which the function knob 33' and the mute button 34' can pass, so that the function knob 33' and the mute button 34' can be connected to the first circuit board 31' for users to operate. The mute button 34' can be pressed to mute the microphone 100' during use, and can be pressed again to relieve the mute effect. The operation is convenient. The function knob 33' has at least two functions. In this embodiment, two functions are taken as an example for introduction. During use, the first function is to adjust the gain effect of the microphone 100' by rotation, and the second function is to adjust the volume of earphones by rotation. The two functions can be switched by pressing the function knob 33'. In other embodiments, the function knob 33' may alternatively have a third function or more functions. The functions can be switched by pressing. The function knob integrates multiple function adjustments, so that the overall operation buttons of the product are reduced, and the appearance is neater and more beautiful.

The control assembly 3' further includes a first audio jack 35' arranged in the shell assembly 1' in a penetrating manner and connected to an external audio device, an earphone jack 36' for being connected to external earphones, and a second audio interface 37' for being connected to an external device to transmit data. The first audio jack 35', the earphone jack 36', and the second audio interface 37' are all electrically connected to the first circuit board 31'. Specifically, the first audio jack 35', the earphone jack 36', and the second audio interface 37' are all arranged in the base plate 15' in a penetrating manner. The base plate 15' is provided with corresponding holes. The first audio jack 35' is configured to be connected to another external device such as a sound card or an audio device, to achieve seamless compatibility. The second audio interface 37' is configured to be connected to another device, such as a computer or a tablet, to achieve data transmission such as audio data transmission. The two audio jacks enhance the functionality of the microphone 100', which is convenient for a user to use multiple interfaces. The main function of the earphone jack 36' is to be connected to the earphones for transmission of audio signals, thus allowing a user to listen to sound through the earphones. Specifically, the second audio interface 37' can be a USB interface or a type-c interface.

With continued reference to FIGS. 18 to 22, the microphone 100' further includes a base 5'. The connecting frame 6' is a unilateral support 6A'. The unilateral support 6A' includes a support 61' and a rotating shaft 62'. The rotating shaft 62' is arranged at one end of the support 61' away from the base 5'. One end of the support 61' is configured to be rotatably connected to the shell assembly 1' via the rotating shaft 62', and the other end is connected to the base 5'. The base 5' is configured to be placed on an external object to support the microphone 100'. Specifically, the outer shell 11' is provided with a mounting hole communicating with the first accommodating chamber 1*a*'. The rotating shaft 62' passes through the mounting hole, and the outer shell 11' is configured to be rotatably connected to the rotating shaft 62'. The support 61' is only connected to one side surface of the outer shell 11'. By adopting the unilateral support 6A', the area of the shell assembly 1' blocked by the support 61' can be reduced, and most of the area of the outer shell 11' can be redesigned and laid out, so that the appearance of the product is neater and more beautiful.

Figure 27:
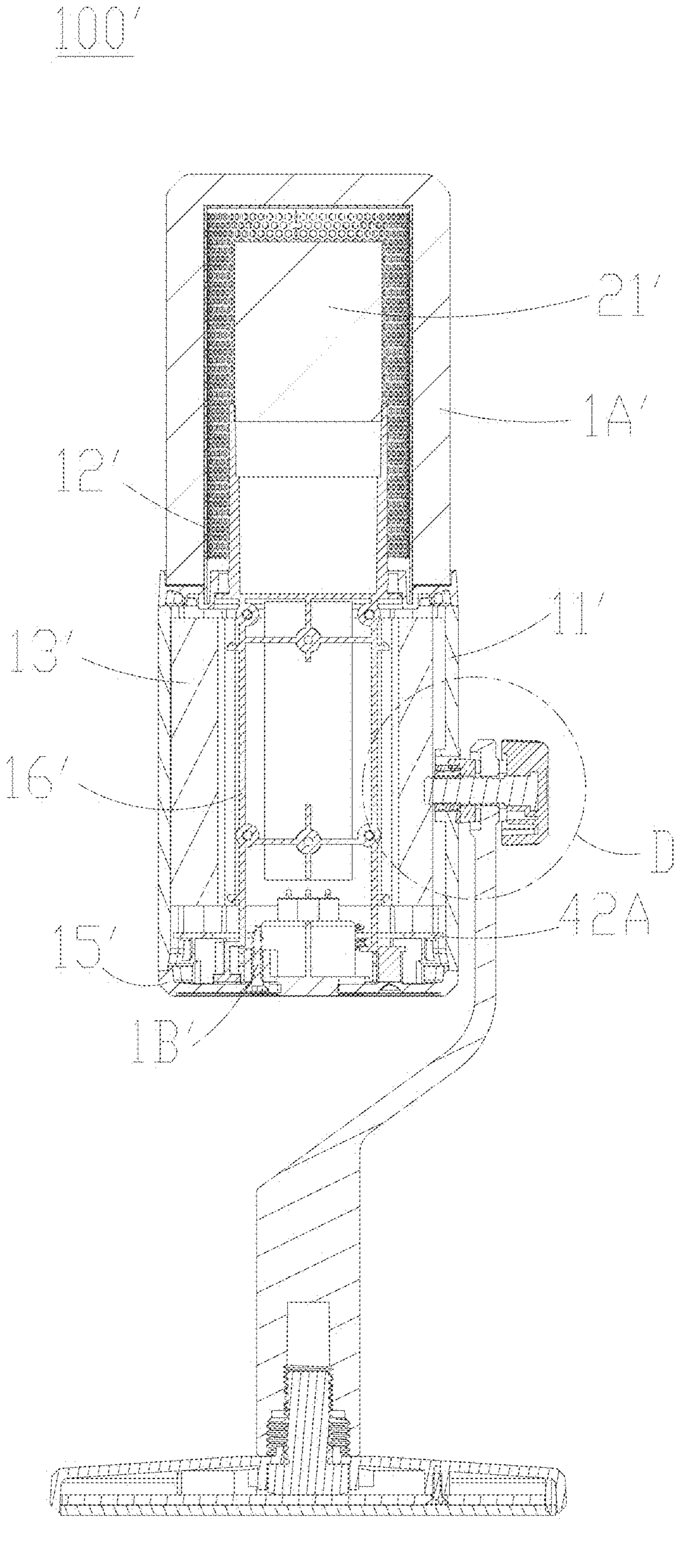
FIG. 27 is a cross-sectional diagram of the microphone shown in FIG. 18 along line XXVII-XXVII.
Figure 28:
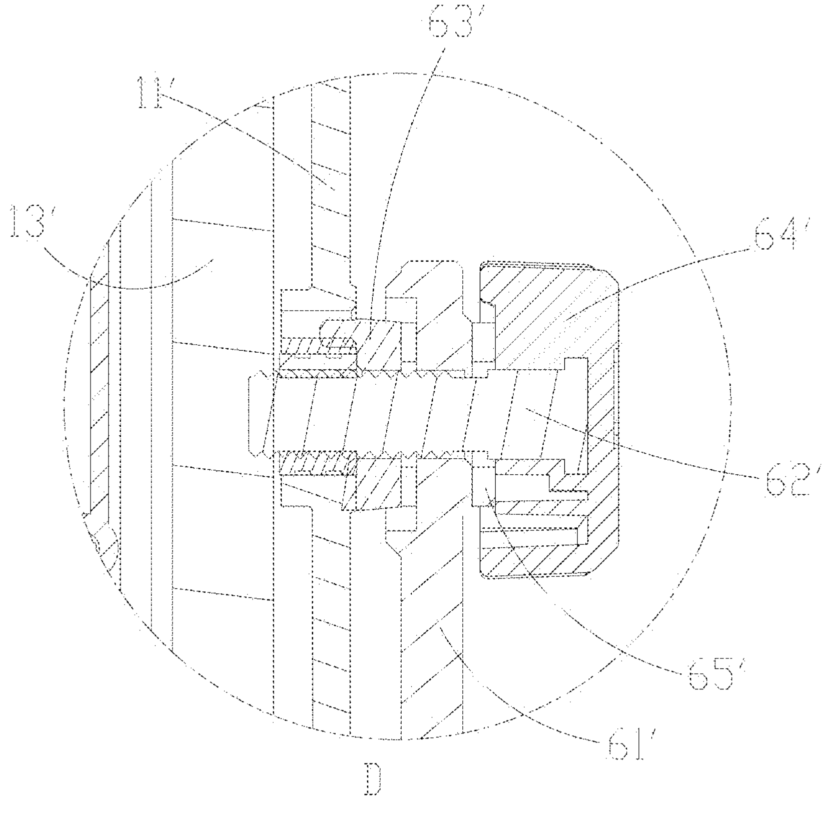
FIG. 28 is an enlarged view of part D of the microphone shown in FIG. 27.
Figure 29:
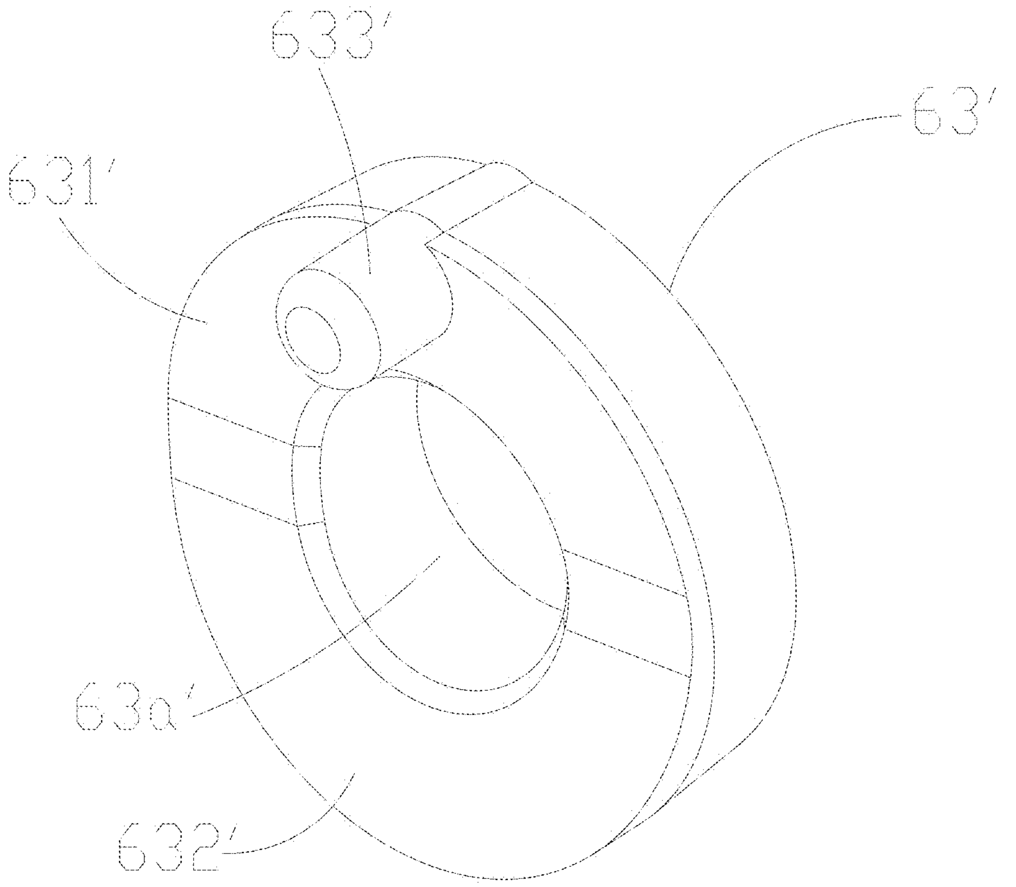
FIG. 29 is a three-dimensional diagram of the first gasket of the microphone shown in FIG. 17.

Specifically, referring to FIGS. 27 to 29, the unilateral support 6A' further includes a first gasket 63' with a through hole 63*a*'. The first gasket 63' is arranged between the outer shell 11' and the support 61', and the rotating shaft 62' passes through the through hole 63*a*'. The first gasket 63' includes a first portion 631' and a second portion 632'. The first portion 631' and the second portion 632' are arranged on opposite sides of the axis of the through hole 63*a*', and the thickness of the second portion 632' is greater than that of the first portion 631'. The second portion 632' is arranged at one end of the first gasket 63' adjacent to the base 5'. In this embodiment, the first gasket 63' is made of a soft material, such as silicone or rubber. The first gasket 63' can increase the contact area between the outer shell 11' and the support 61', so that the shell assembly 1' can maintain the desired angle after being rotationally adjusted for its tilt angle relative to the support 61'. The first gasket 63' is designed to be thinner at the top and thicker at the bottom, which plays a role in support compensation under the action of the gravity of the shell assembly 1' and the supporting force of the rotating shaft 62'. The thicker second portion 632' can better support the shell assembly 1'.

Since the shell assembly 1' is connected by the unilateral support 6A' and the microphone 100' has its own weight, it is likely to cause the shell to crack. In the embodiment of the present application, the microphone 100' further includes a shell compensation structure. The shell compensation structure is arranged on the shell assembly 1' and is configured to enhance the strength of the shell assembly 1'. The arrangement of the shell compensation structure ensures the strength of the connection between the shell assembly 1' and the support 61' and prevents the shell assembly 1' from cracking.

Specifically, the outer shell 11' is provided with a protrusion 113' configured to enhance the strength of the outer shell 11'. The protrusion 113' is annularly arranged around the mounting hole. The rotating shaft 62' passes through the mounting hole, and at least a portion of the first gasket 63' passes through the mounting hole. The inner shell 13' is also correspondingly provided with a hole for the rotating shaft 62' to pass through at a position corresponding to the mounting hole of the outer shell 11'. By arranging the protrusion 113' around the periphery of the mounting hole, it functions as a reinforcing rib to enhance the strength of the outer shell 11', thereby preventing cracking of the outer shell 11' and ensuring superior product quality. Meanwhile, the protrusion 113' protrudes out of the outer shell 11', so that a gap is reserved between the support 61' and the outer shell 11'. This enables the microphone 100' to have an avoidance space when it rotates or deflects due to an external force, thereby avoiding friction and collision between the outer shell 11' and the support 61', avoiding the damage to the outer shell 11', and ensuring the beautiful appearance of the microphone 100'.

The first gasket 63' is provided with a positioning column 633'. The positioning column 633' is located on the first portion 631' and faces the outer shell 11'. A positioning hole is provided at a corresponding position on the outer shell 11'. The positioning column 633' passes through the positioning hole. In this embodiment, the positioning column 633' is made of a soft material and abuts against the inner shell 13'. The positioning column 633' is arranged on the first gasket 63' and cooperates with the positioning hole on the outer shell 11'. This configuration can ensure that the relative positions of the first gasket 63' and the outer shell 11' are fixed, so that when the outer shell 11' rotates relative to the rotating shaft 62', the first gasket 63' rotates with the outer shell 11', thereby increasing the friction force during the rotation. This ensures that the shell assembly 1' can be maintained at an angle desired by the user without rotating, and improves the stability of the microphone 100'.

The unilateral support 6A' further includes a fastener 64'. The fastener 64' is connected to one end of the rotating shaft 62' away from the outer shell 11' and is located on one side of the support 61' away from the outer shell 11'. In this embodiment, the rotating shaft 62' is connected to the fastener 64' in a non-rotatable manner. The end of the rotating shaft 62' connected to the fastener 64' has a polygonal profile in axial view. A matching slot is provided in the fastener 64', so that the non-rotatable connection between the rotating shaft 62' and the fastener 64' is achieved. In other embodiments, the rotating shaft 62' can be fixedly connected to or integrally formed with the corresponding fastener 64'. The supporting assembly further includes a second gasket 65'. The second gasket 65' is arranged between the support 61' and the fastener 64'. By the arrangement of the fastener 64, the rotating shaft 62' passes through the support 61' to ensure the length of the rotating shaft 62' and also play a balancing role. The support 61' acts as a fulcrum, so that the shell assembly 1' and the fastener 64' are located at two ends of the rotating shaft 62', thereby balancing the weight of the shell assembly 1'. In addition, the fastener 64' can further ensure that the rotating shaft 62' will not fall off from the support 61'. The second gasket 65' can enlarge the contact area between the support 61' and the fastener 64', thereby achieving anti-slip and stabilizing effects.

Specifically, the support 61' includes a first connecting section 611', a second connecting section 612', and a third connecting section 613'. The first connecting section 611' and the third connecting section 613' may be substantially parallel but are not limited to being parallel. The second connecting section 612' connects the first connecting section 611' and the third connecting section 613', forming a certain angle with the first connecting section 611' and the third connecting section 613' respectively. The end of the first connecting section 611' away from the second connecting section 612' is connected to the base 5', while the end of the third connecting section 613' away from the second connecting section 612' is configured to be rotatably connected to the shell assembly 1'. The first connecting section 611' may be substantially perpendicular to the base 5', but it is not strictly limited to a perpendicular arrangement. With this configuration, the support 61' can more effectively support the microphone 100'.

In this embodiment, the support 61' is connected to the base 5' by a threaded connection. Specifically, an internal threaded hole is provided at one end of the support 61' connected to the base 5', and a bolt is in threaded connection with the internal threaded hole of the support 61' through the base 5'. In this embodiment, the base 5' can be detached from the support 61' by removing the bolt, enabling the microphone 100' to be connected to an external cantilever support through the internal threaded hole on the support 61'. Thus, the usage scenarios of the microphone 100' are expanded, allowing the microphone 100' to be used not only on the surface of an object, such as a desktop, but also suspended for use via the external cantilever support. The base 5' is provided so that the microphone 100' can be stably placed on the surface of an object. The shell assembly 1' can rotate relative to the support 61'. The rotatability of the shell assembly 1' makes it easier for users to adjust the inclination angle of the microphone 100', making it more convenient to use and enabling the microphone head 21' to pick up sounds more easily, thereby enhancing the user experience.

Figure 30:
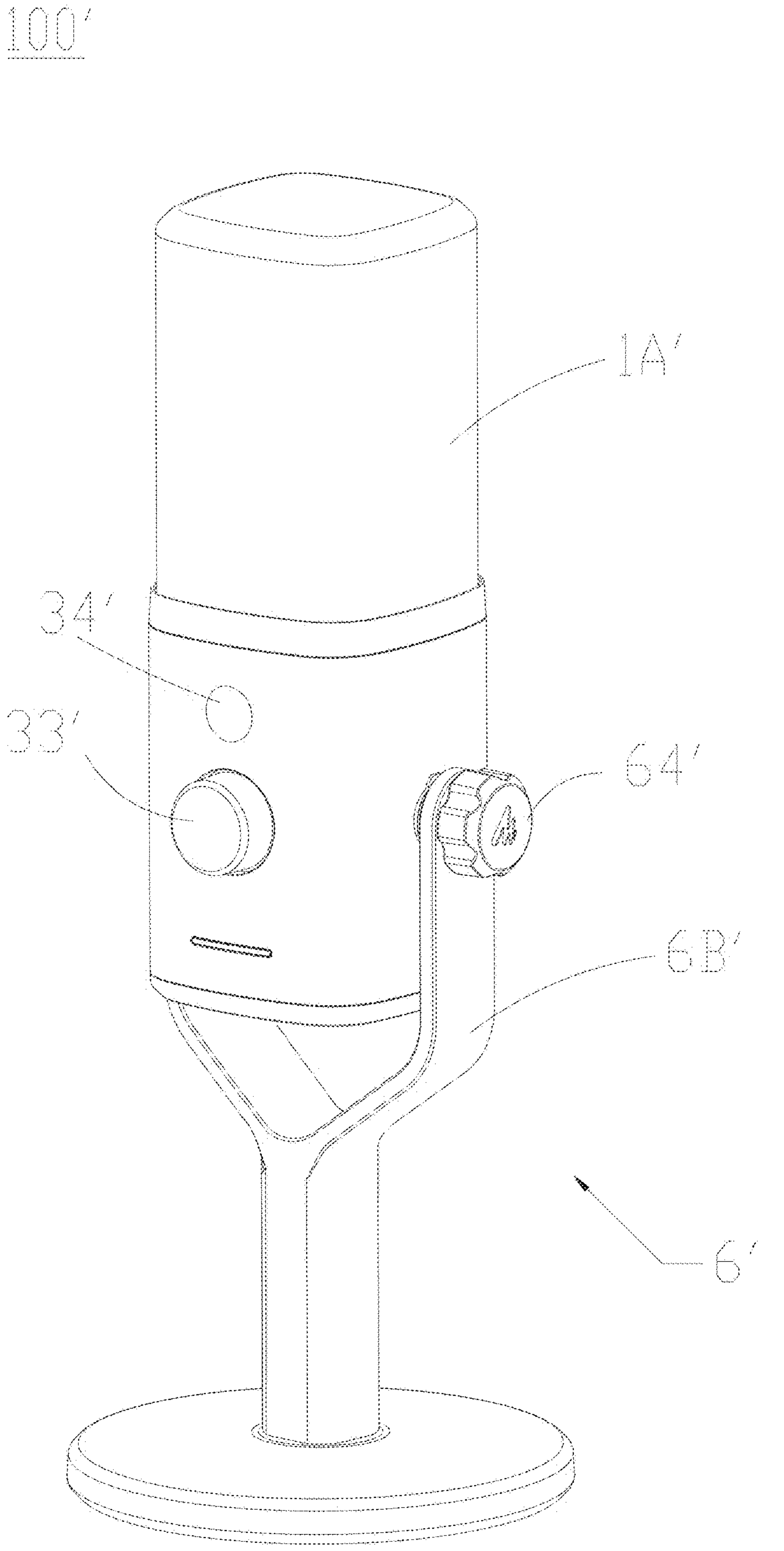
FIG. 30 is a three-dimensional diagram of a microphone according to another embodiment of this application.
Figure 31:
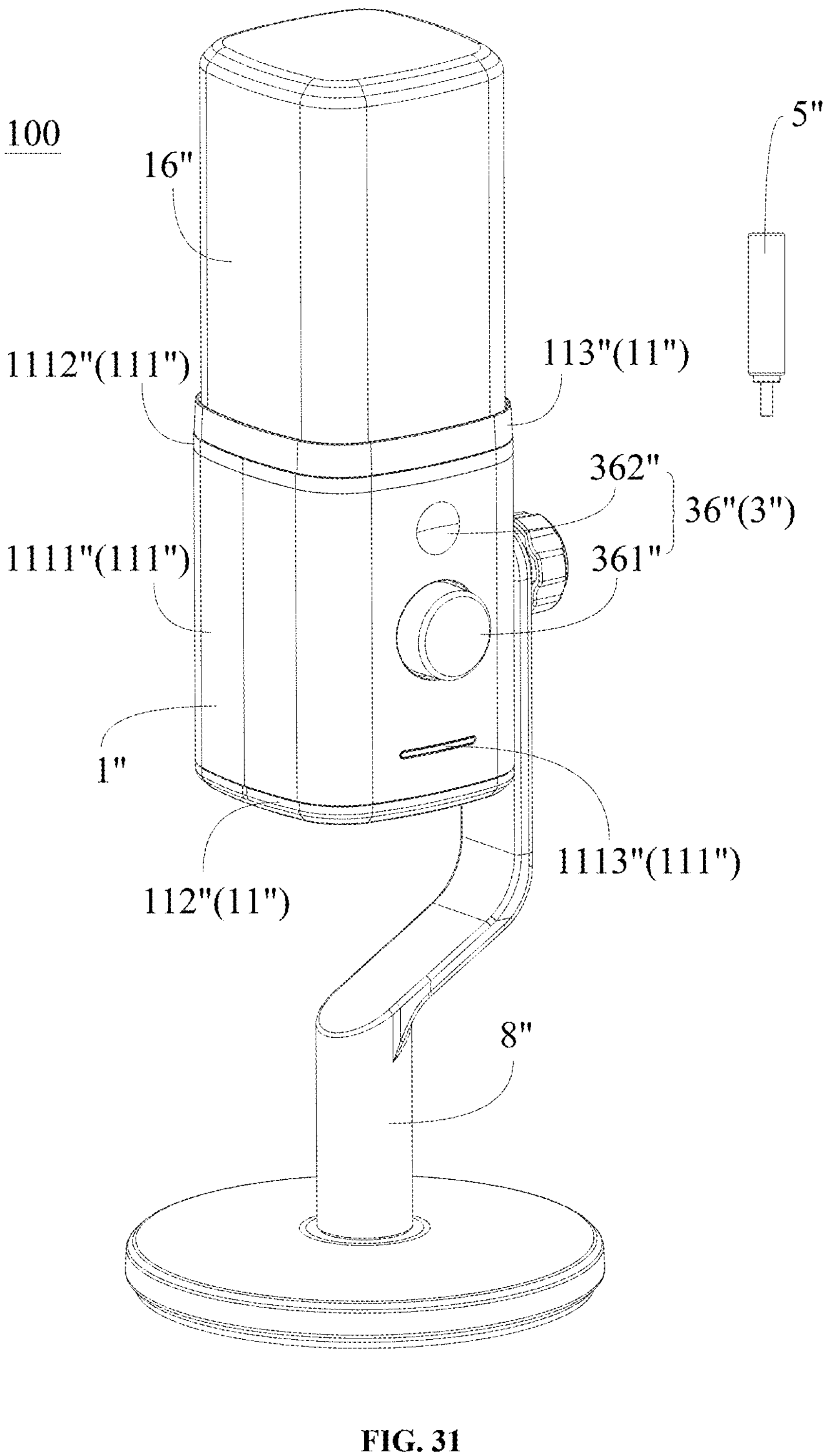
FIG. 31 is a first schematic view of the microphone according to a third embodiment of this application.
Figure 32:
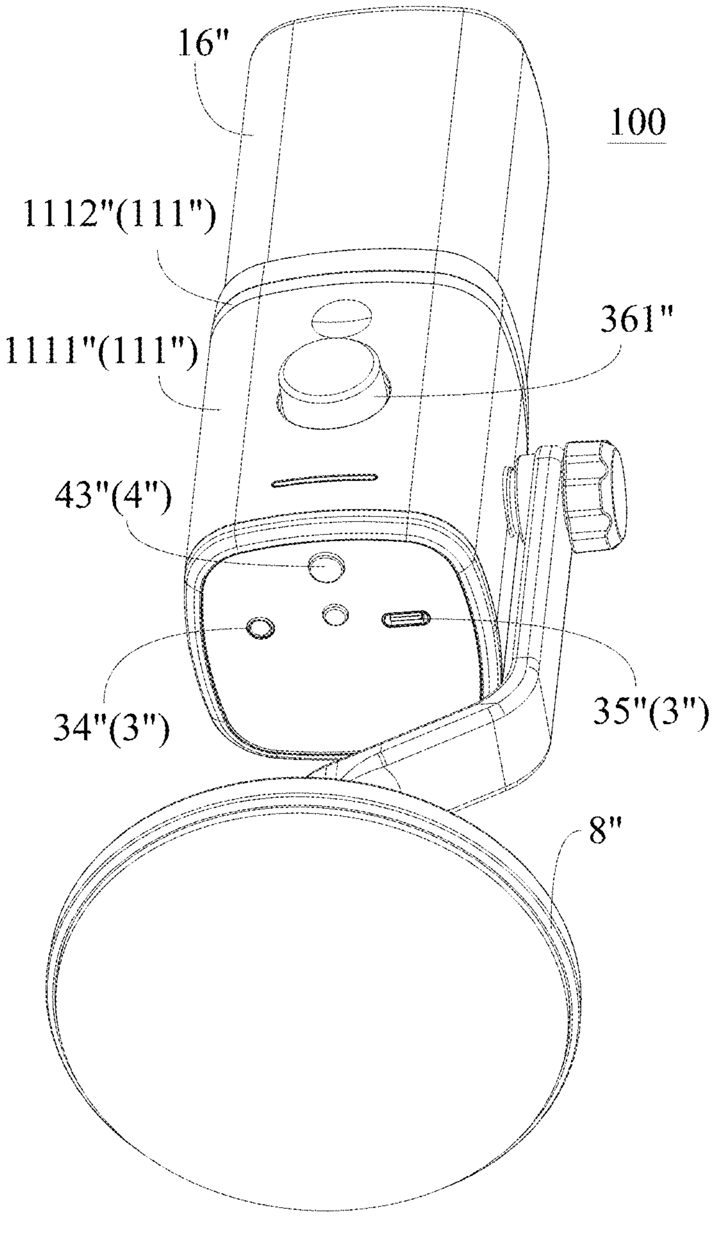
FIG. 32 is another schematic view of the microphone of FIG. 31.
Figure 33:
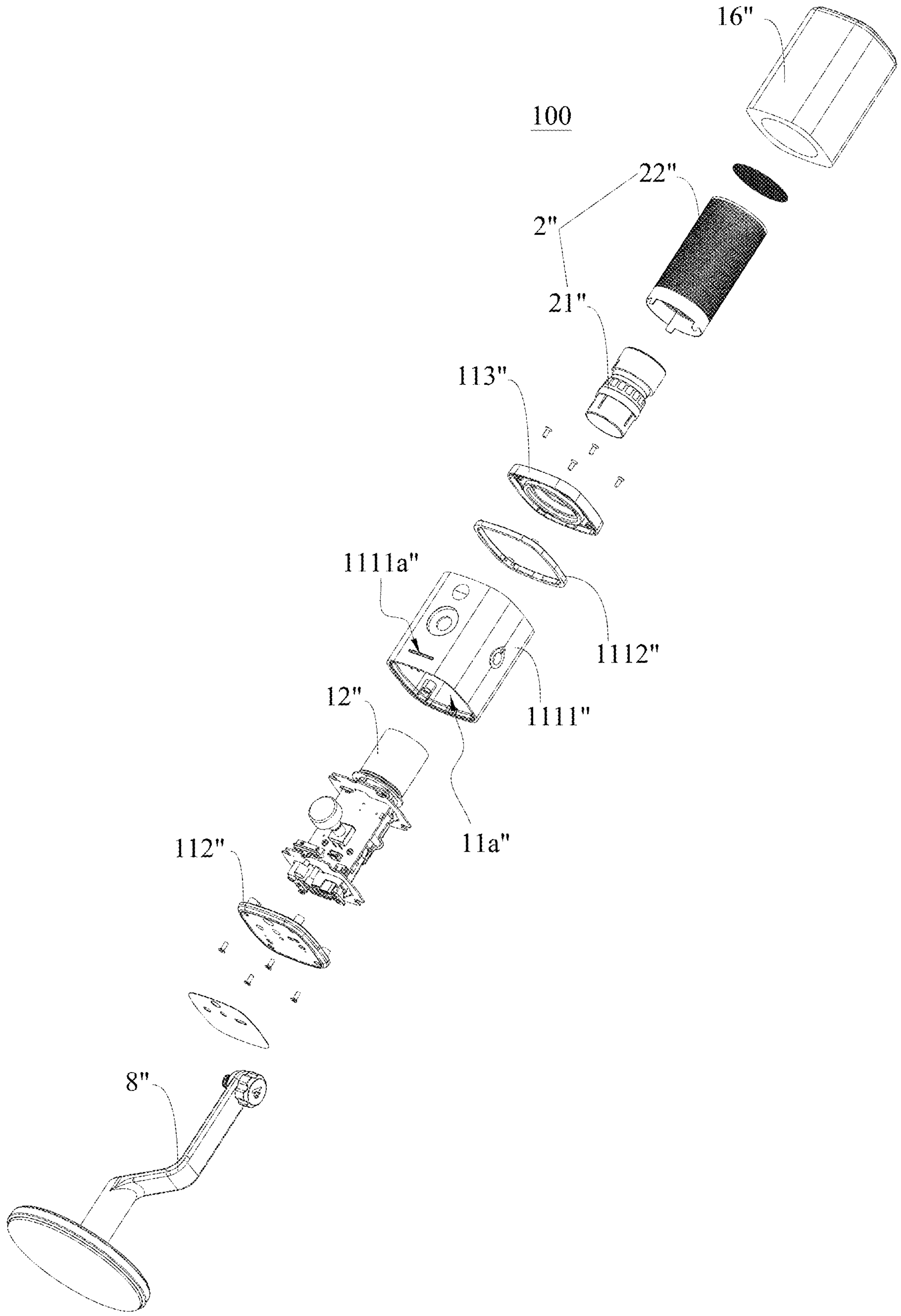
FIG. 33 is partially exploded view of the microphone of FIG. 31.
Figure 34:
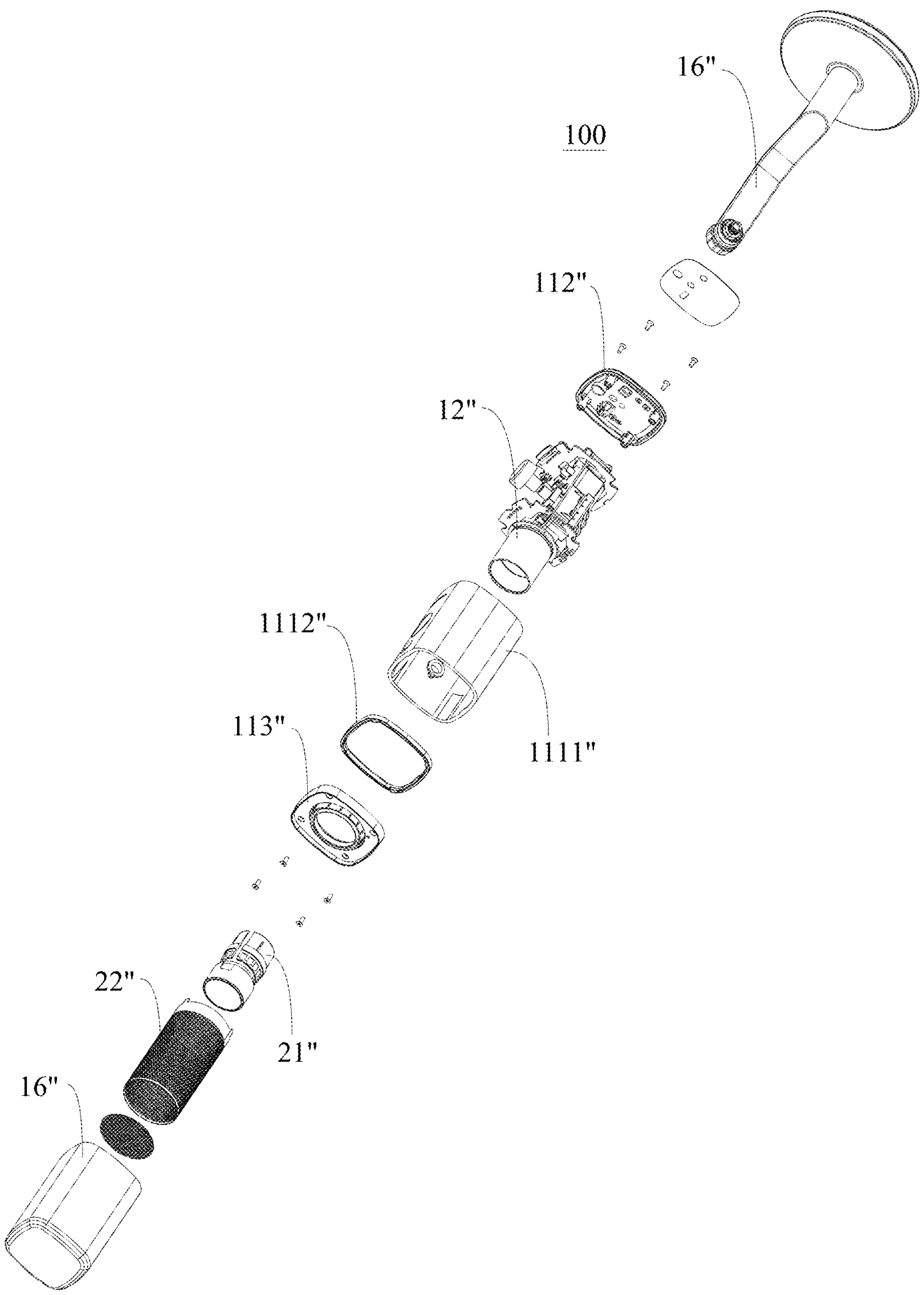
FIG. 34 is another partially exploded view of the microphone of FIG. 31.
Figure 35:
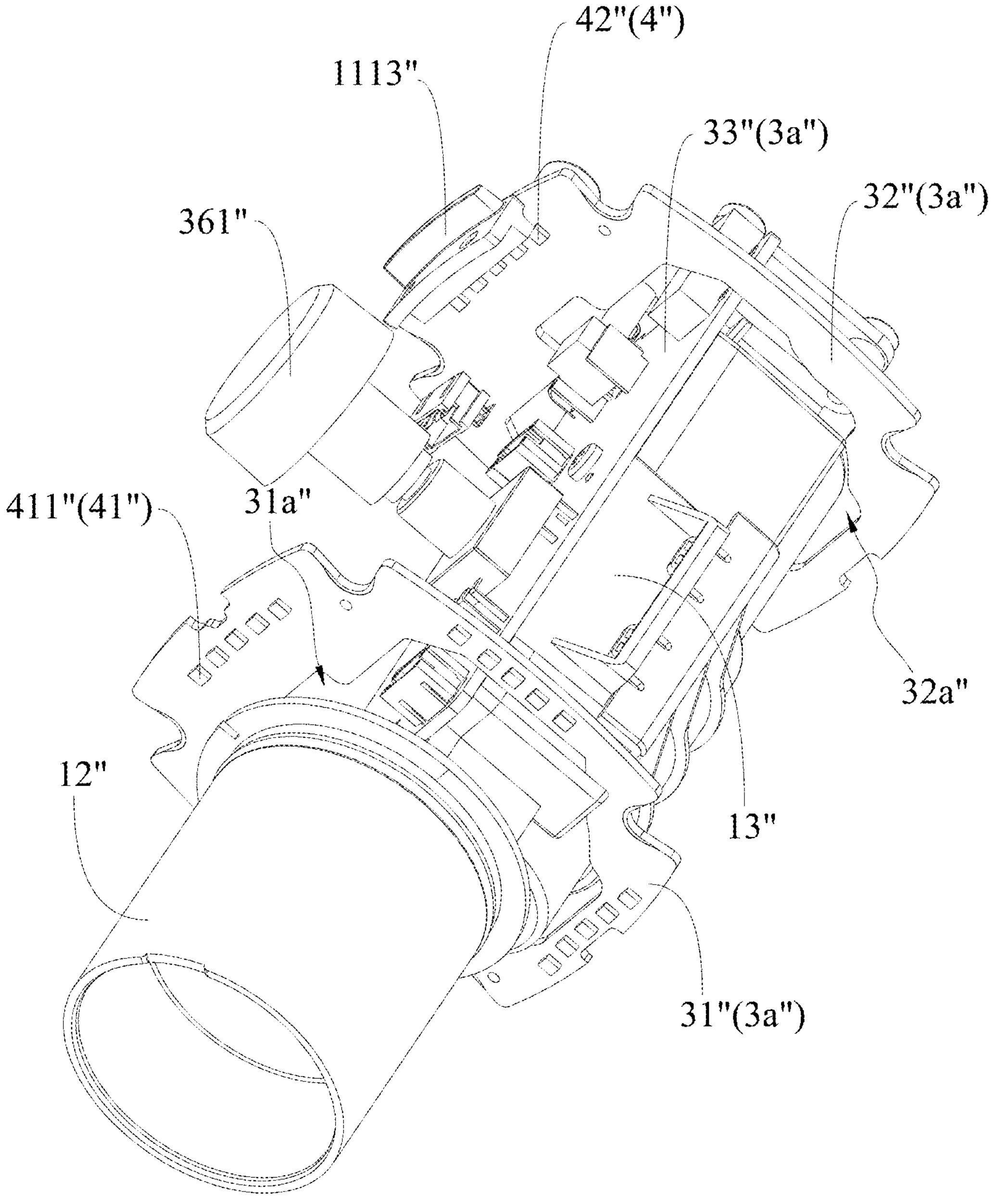
FIG. 35 is a partial view of the microphone of FIG. 31.
Figure 36:
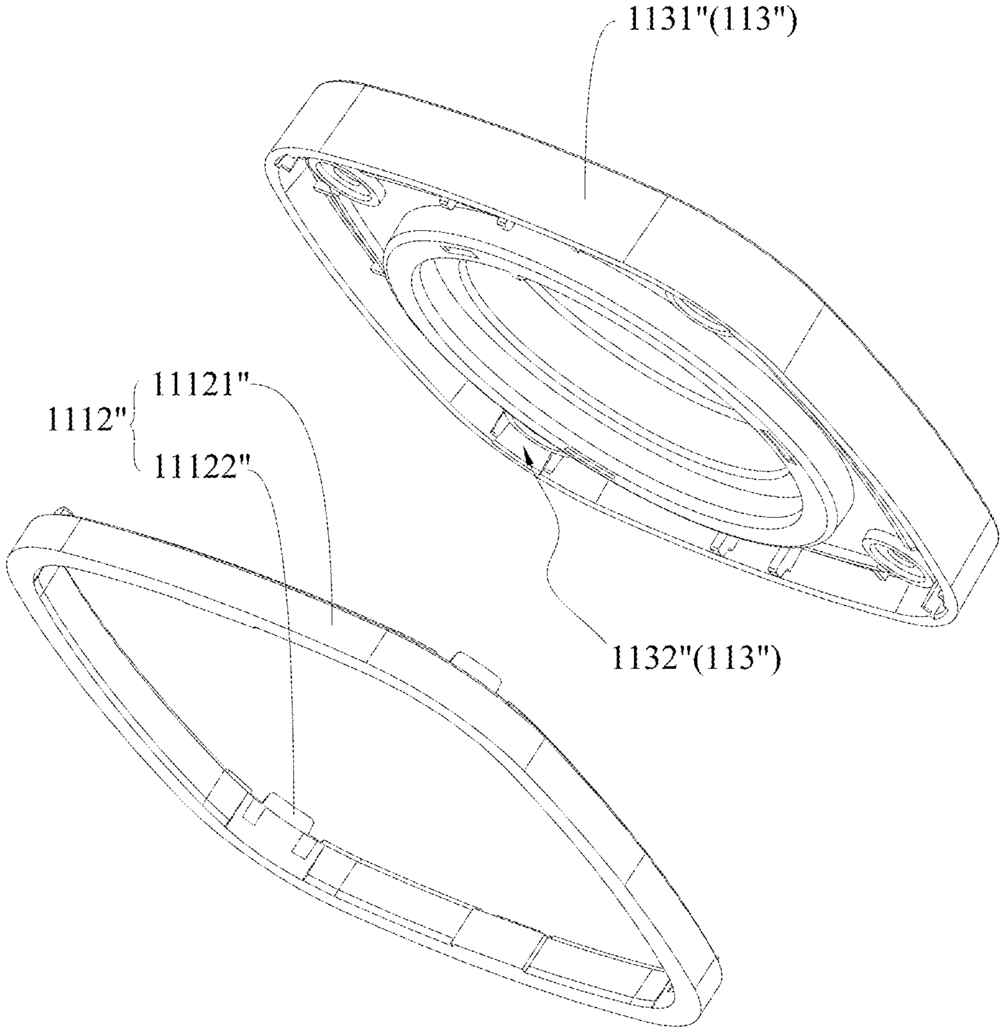
FIG. 36 is a schematic view of a light guiding structure and a cover plate.
Figure 37:
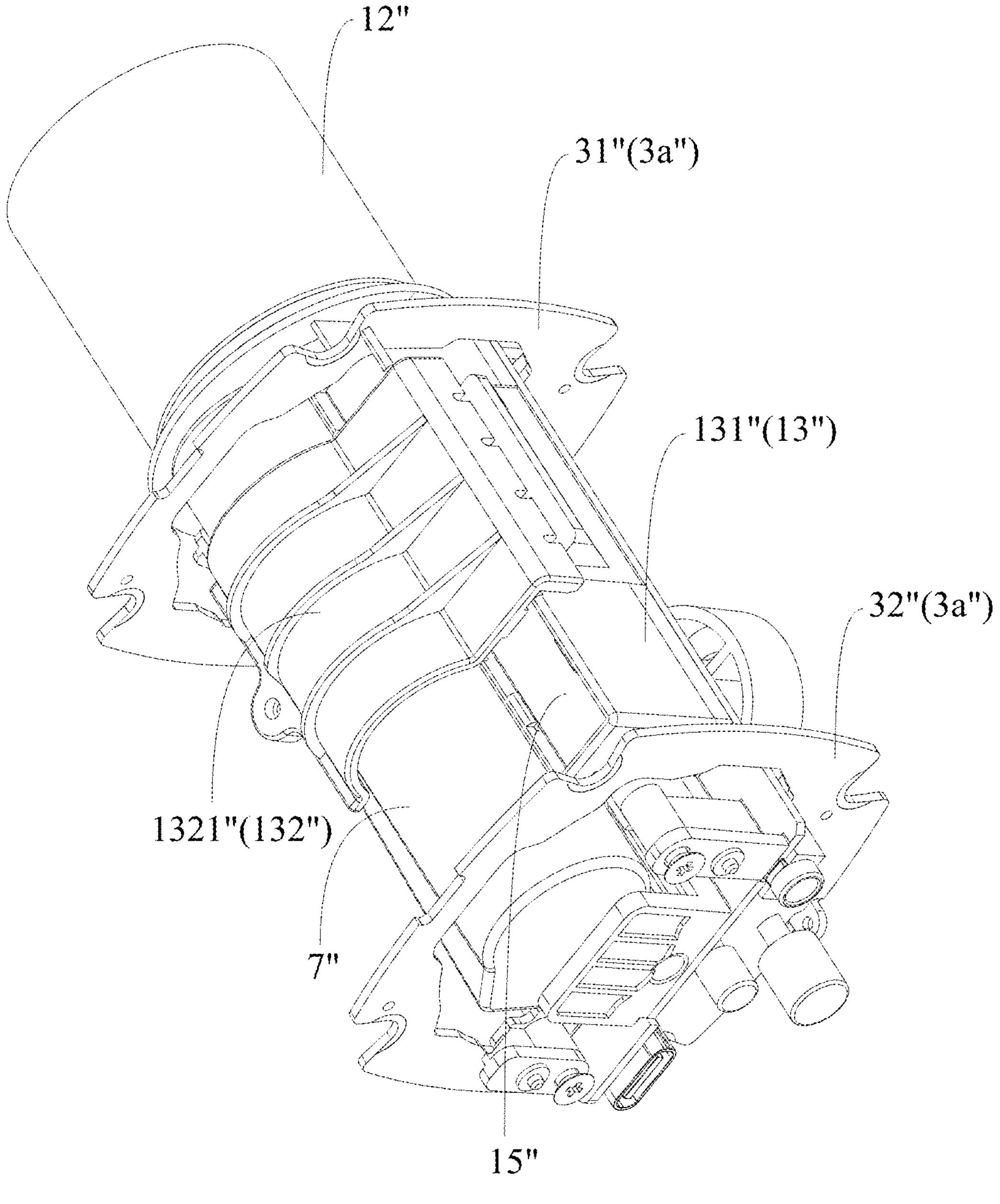
FIG. 37 is another partial view of the microphone of FIG. 31.
Figure 38:
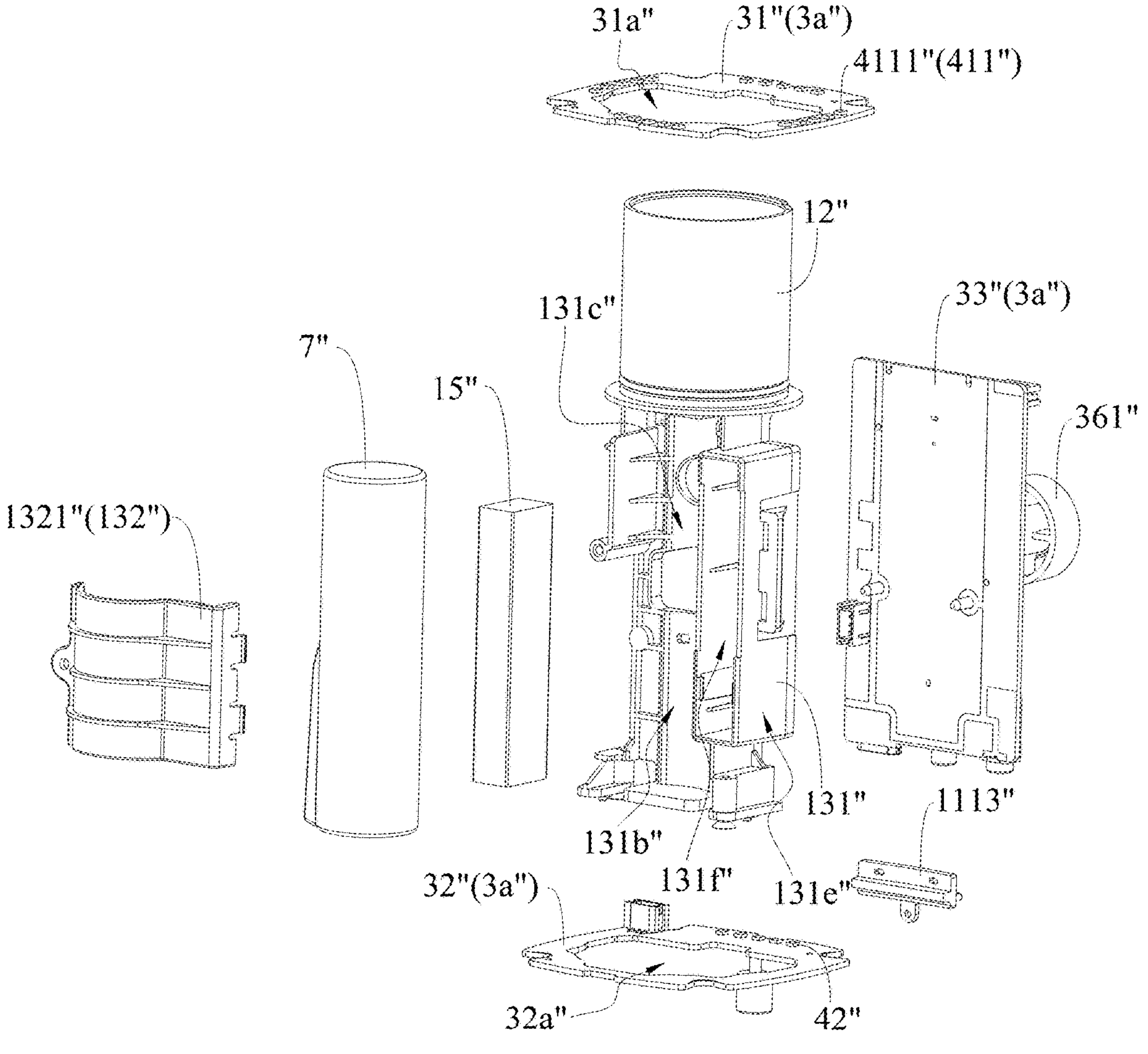
FIG. 38 is further another partially exploded view of the microphone of FIG. 31.
Figure 39:
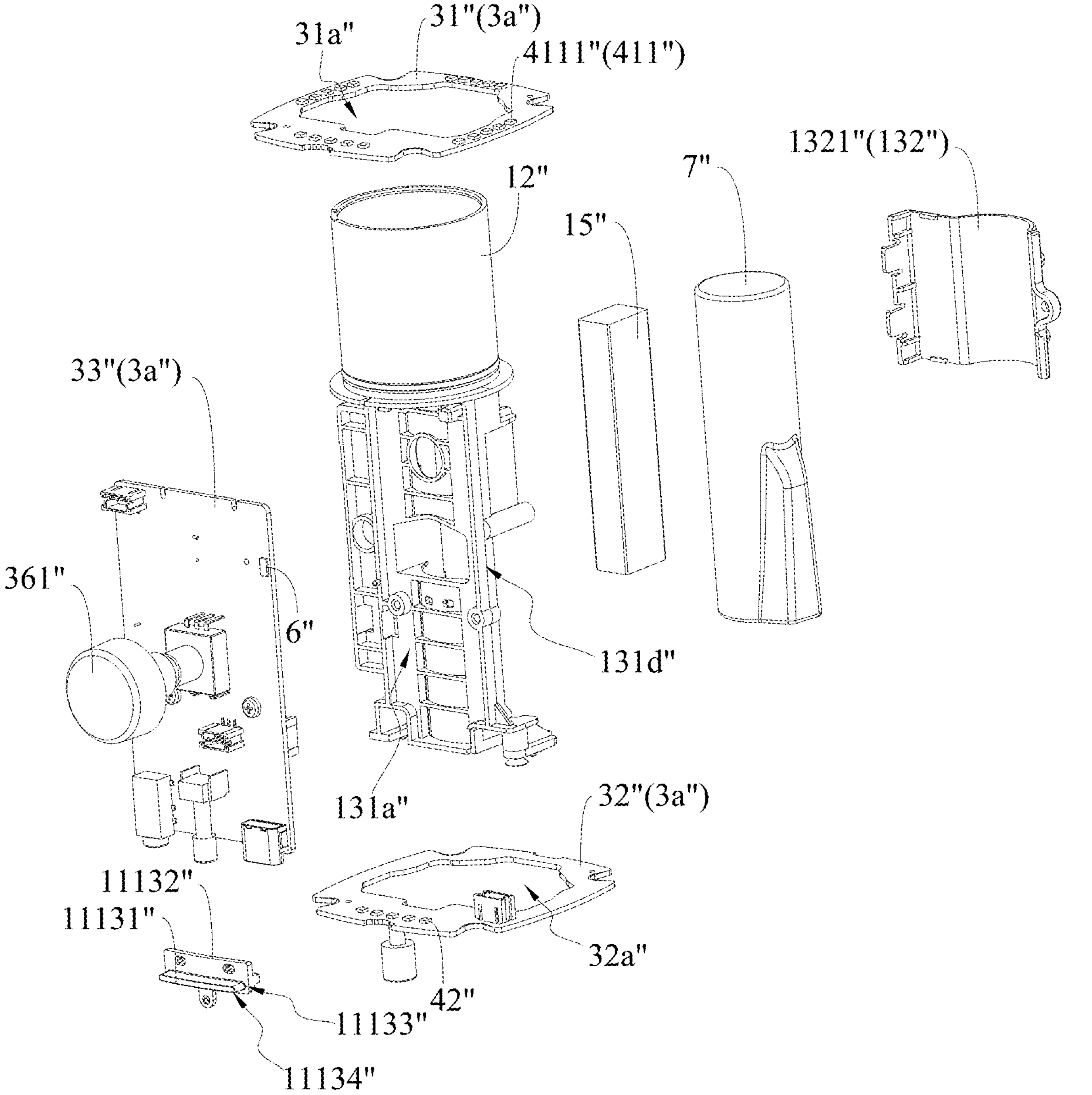
FIG. 39 is still further another partially exploded view of the microphone of FIG. 31.
Figure 40:
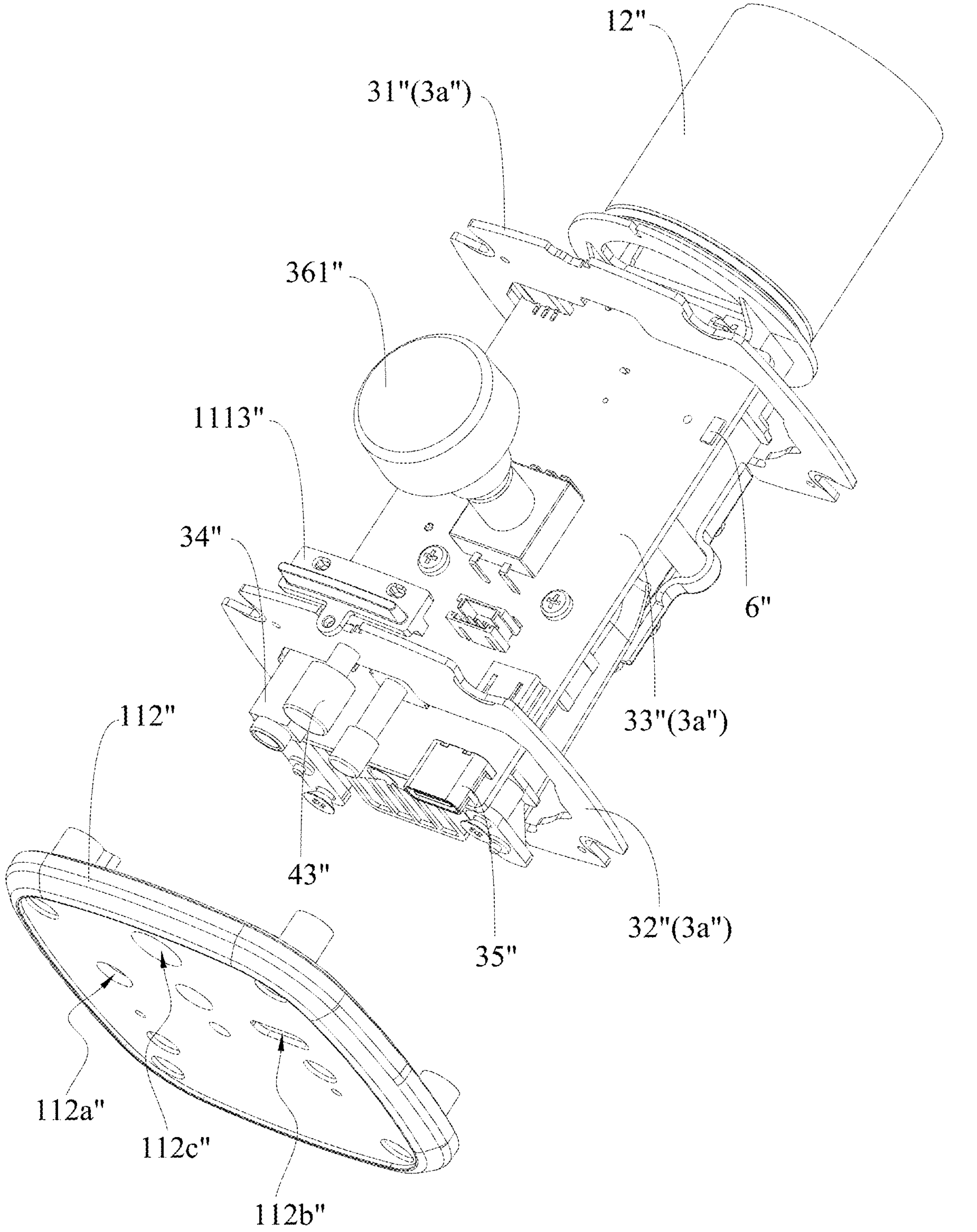
FIG. 40 is still further another partially exploded view of the microphone of FIG. 31.

Referring to FIG. 30, in another embodiment, the support 6' is a U-shaped support or a V-shaped support 6B'; both ends of the U-shaped support or the V-shaped support 6B' are configured to be rotatably connected to the shell assembly 1', and a bottom of the U-shaped support or the V-shaped support 6B' is configured to be connected to the base 5' to support the microphone 100' on an external object. The external object may be the base 5', or a cantilever. The bottom of the U-shaped support or the V-shaped support 6B' can be detachably connected to the base 5' or the cantilever, etc. by means of threaded connection.

Third Embodiment

Please refer to FIGS. 31-34, the present embodiment provides a microphone 100", which is placed on a flat surface such as a desktop and can be used, but is not limited to, in video conferencing, online courses, short video dubbing, podcast recording, music cover, home karaoke, live interaction and other scenarios.

The microphone 100" includes a shell assembly 1", a pickup assembly 2", a control assembly 3", and a light emitting assembly 4". The shell assembly 1" includes a shell 11" with a first accommodating chamber **11*a*"; the pickup assembly 2" includes a microphone head 21" for sound pickup, which is located inside the shell assembly 1"; the control assembly 3" includes a circuit board 3*a*", which is located in the first accommodating chamber 11*a*" of the shell 11", and is electrically connected to the microphone head 21"; the light emitting assembly 4" includes a light emitting unit 41", which is located in the first accommodating chamber 11*a*" of the shell 11". The light emitting assembly 4" is electrically connected to the circuit board 3*a*", and the light emitting unit 41" is configured to emit light that can pass through at least part of the shell 11"**.

The microphone head 21" is used to collect the user's voice, and the shell assembly 1" also includes a mounting seat 12" and a mounting bracket 13" (described below). The mounting seat 12" is used to mount the microphone head 21", and one end of the mounting bracket 13" extending along the length direction is connected to the shell 11" (specifically the base plate 112" described below) by screws. The other end of the mounting bracket 13" extending along the length direction is connected to the mounting seat 12". The specific connection method between the microphone head 21" and the mounting seat 12" is not limited here, and designers can make reasonable designs according to actual needs; for example, the microphone head 21" can be, but is not limited to, connected to the mounting base 12" in a detachable manner through at least one of screw connection, snap fit connection, or plug connection.

The circuit board **3*a*" can be a hard circuit board 3*a*", a soft circuit board 3*a*", or a combination of a hard circuit board 3*a*" and a soft circuit board 3*a*". It should be noted that when the circuit board 3*a*" is a soft circuit board 3*a*", the control assembly 3" also includes a reinforcement board, which is set on one side of the soft circuit board 3*a*" to provide support for the soft circuit board 3*a*". The specific connection method between the circuit board 3*a*" and the shell 11" is not limited here. Designers can make reasonable designs according to actual needs. For example, the circuit board 3*a*" can be detachably connected to the shell 11"** through at least one of screw connection, snap fit connection, or plug connection, but not limited to.

The light emitting unit 41" is used to emit light of a specified color, and the light emitted by the light emitting unit 41" can pass through at least part of the shell 11" to create a cool lighting atmosphere for the microphone 100". For example, when the entire shell 11" is made of light-transmitting material and is not covered or coated by shading plates or shading coatings, the entire shell 11" is light-transmitting, and the light emitted by the light emitting unit 41" can pass through the entire shell 11", creating a cool lighting atmosphere for the entire shell 11". For another example, when the entire shell 11" is made of light-transmitting material but some parts of the shell 11" are covered or coated by shading plates or shading coatings, only the parts of the shell 11" that are not covered or coated by shading plates or shading coatings are light-transmitting. The light emitted by the light emitting unit 41" can pass through the parts of the shell 11" that are not covered or coated by shading plates or shading coatings, creating a cool lighting atmosphere for the parts of the shell 11" that are not covered by shading plates or shading coatings. For further another example, when part of the shell 11" is made of opaque material and the remaining part of the shell 11" is made of light-transmitting material, only the remaining part of the shell 11" made of light-transmitting material has light transparency, the light emitted by the light emitting unit 41" can pass through the remaining part of the shell 11" made of light-transmitting material, making the remaining part of the shell 11" made of light-transmitting material present a cool lighting atmosphere.

It should be noted that the transparency intensity of the shell 11" provided in the embodiments of the present application is selectable, which can be fully light-transmitting, high-intensity light-transmitting or low-intensity light-transmitting; the shell 11" can be made of different materials according to the strength requirements of light transparency to achieve the preset light transparency. The shell 11" can also be coated or surface sandblasted on its outer or inner walls to achieve the preset light transparency. In addition, it can be understood that the light emitting unit 41" is used to emit light and/or flicker when the microphone head 21" picks up sound, such as emitting light and/or flickering according to the volume or tone of the collected audio signal, thereby increasing the atmosphere of using the microphone 100". The controller of control assembly 3 can obtain the audio signal collected by microphone head 21 and control the light emission of light emitting assembly 4 based on the audio signal collected by microphone head 21.

Based on the microphone 100" in the present embodiment, the light emitting unit 41" is placed in the first accommodating chamber **11*a*" of the shell 11", and the light emitted by the light emitting unit 41" can be transmitted through the outer shell 111", so that the microphone 100" not only has sound pickup transmission function, but also can be observed by users or others as the lighting effect created by the light emitting assembly 4"**, thereby creating a cool lighting atmosphere, enhancing the atmosphere and attracting people's attention, and improving the user's experience.

As shown in FIGS. 33-40, when the light emitted by the light emitting unit 41" can only pass through a part of the shell 11", the shell 11" includes an outer shell 111", a base plate 112", and a cover plate 113", and the outer shell 111", the base plate 112", and the cover plate 113" together enclose the first accommodating chamber **11*a*" mentioned above. The outer shell 111" includes a ring-shaped side wall structure 1111" and a light guiding structure 1112"; the side wall structure 1111" has light shielding properties or is opaque, and the base plate 112" has light shielding properties or is opaque, and the base plate 112" is connected to one end of the side wall structure 1111". The light guiding structure 1112" has light transparency so that the light emitted by the light emitting unit 41" can pass through the light guiding structure 1112", and the light guiding structure 1112" is connected to the other end of the side wall structure 1111" away from the base plate 112". The cover plate 113" has light shielding properties or is opaque, and is connected to the light guiding structure 1112". In particular, the sidewall structure 1111" is opaque, and the light emitted by the light emitting unit 41" cannot pass through the sidewall structure 1111", so the sidewall structure 1111" cannot present a cool lighting atmosphere; the base plate 112" is opaque, and the light emitted by the light emitting unit 41" cannot pass through the base plate 112", so the base plate 112" cannot present a cool lighting atmosphere; the cover plate 113" is opaque, and the light emitted by the light emitting unit 41" cannot pass through the cover plate 113", so the cover plate 113" cannot present a cool lighting atmosphere. The light guiding structure 1112" has light transparency, and the light emitted by the light emitting unit 41" can pass through the light guiding structure 1112", so the light guiding structure 1112" can present a cool lighting atmosphere. The specific connection method between the base plate 112" (or light guiding structure 1112") and the side wall structure 1111" is not limited here, designers can make reasonable designs according to actual needs, for example, the base plate 112" (or light guiding structure 1112") can be detachably connected to the side wall structure 1111" through at least one of the methods such as screw connection, snap fit connection, or plug connection; for another example, the base plate 112" (or light guiding structure 1112") can also be non detachably connected to the side wall structure 1111" through adhesive connection or riveting. By designing the light guiding structure 1112" to have light transparency, while the cover plate 113", side wall structure 1111", and base plate 112" do not have light transparency, the light guiding structure 1112" is substantially located at the middle waistline of the microphone 100", this creates a cool lighting atmosphere at the middle waistline of the microphone 100"**, which enhances the user experience by creating an atmosphere and attracting attention.

Furthermore, the circuit board **3*a*" includes a first circuit board 31", which is closer to the cover plate 113" than the base plate 112"; the light emitting unit 41" includes a first light emitting unit 411", which is electrically connected to the first circuit board 31", and is configured to emit light that can pass through the light guiding structure 1112". Among them, the first circuit board 31" is a hard circuit board 3*a*", which is annular in shape. The area enclosed by the inner annular surface of the first circuit board 31" is used to form a second avoidance hole 31*a*" for the mounting bracket 13" to pass through. The first circuit board 31" can be connected to the mounting bracket 13" through snap fit connection, but not limited to, for example, the mounting bracket 13" has a slot for the first circuit board 31" to be snap fit connected. The first light emitting unit 411"** can be used to emit light of a single color or multiple different colors of light.

The first circuit board 31" is farther away from the cover plate 113" relative to the light guiding structure 1112", that is, the first circuit board 31" and the light guiding structure 1112" are staggered in the length direction of the microphone 100", and the light guiding structure 1112" is closer to the cover plate 113". Compared to designing the first circuit board 31" and the light guiding structure 1112" at the same horizontal height along the length direction of the microphone 100", this ensures that the light guiding structure 1112" does not display the shadow of the first circuit board 31" when the first light emitting unit 411" emits light.

The light guiding structure 1112" is annular, and the first light emitting unit 411" includes multiple first light beads 4111", which are arranged at intervals around the axial direction of the light guiding structure 1112" on the first circuit board 31". Among them, the first light bead 4111" can be an RGB multi-color LED light. It can be all first light beads 4111" emitting the same color of light, or at least two first light beads 4111" emitting different colors of light. By designing the light guiding structure 1112" in a circular shape and arranging multiple first light beads 4111" around the axis of the light guiding structure 1112" at intervals on the first circuit board 31", the microphone 100" presents a 360 degree cool lighting atmosphere at the waistline position in the middle, further enhancing the atmosphere and attracting attention, and improving the user's experience.

The cover plate 113" includes a plate body 1131" and a first mating portion 1132" provided on the plate body 1131"; the light guiding structure 1112" includes a light guiding aperture 11121" and a second mating portion 11122" located at the light guiding aperture 11121"; the second mating part 11122" is connected to the first mating part 1132" to detachably connect the light guiding structure 1112" to the cover plate 113". Among them, when the light guiding structure 1112" is connected to the cover plate 113" by locking screws, the first fitting part 1132" is a perforated hole **1111*a*", and the second fitting part 11122" is a threaded hole, the screws are threaded through the perforated hole 1111*a*" and connected to the threaded hole to connect the light guiding structure 1112" to the cover plate 113". When the light guiding structure 1112" is connected to the cover plate 113" through a snap fit connection, the first fitting portion 1132" is at least one of the snap fit flange and the snap fit groove, and the second fitting portion 11122" is the other of the snap fit flange and the snap fit groove, which snap fit the light guiding structure 1112" to the cover plate 113", this facilitates the assembly between the light guiding structure 1112" and the cover plate 113"**.

As shown in FIGS. 41-44, when the light emitted by the light emitting unit 41" can only pass through a part of the shell 11", the shell 11" includes an outer shell 111", a base plate 112", and a cover plate 113", and the outer shell 111", the base plate 112", and the cover plate 113" together enclose the first accommodating chamber **11*a*" mentioned above. The outer shell 111" has light shielding properties or is opaque; the base plate 112" includes a main body 1121" and a connecting portion 1122", the connecting portion 1122" has light transparency to allow the light emitted by the light emitting unit 41" to pass through the connecting portion 1122", and is connected to the outside of the main body 1121" and to one end of the outer shell 111". The cover plate 113" has light shielding properties or is opaque, and is connected to the other end of the outer shell 111" away from the base plate 112". Among them, the outer shell 111" is opaque, and the light emitted by the light emitting unit 41" cannot pass through the outer shell 111", so the outer shell 111" cannot present a cool lighting atmosphere; the connecting portion 1122" has light transparency, and the light emitted by the light emitting unit 41" can pass through the connecting portion 1122", so can the connecting portion 1122" present a cool lighting atmosphere; the cover plate 113" is opaque, and the light emitted by the light emitting unit 41" cannot pass through the cover plate 113", so the cover plate 113" cannot present a cool lighting atmosphere. The specific connection relationship between the base plate 112" (or cover plate 113") and the outer shell 111" is not limited here, and designers can make reasonable designs according to actual needs; for example, the base plate 112" (or the cover plate 113") can be, but is not limited to, detachably connected to the outer shell 111" through at least one of screwing, clamping, or plugging methods; for another example, the base plate 112" (or the cover plate 113") can also be non removable connected to the outer shell 111" by means of adhesive bonding or riveting, but not limited to. By designing the connecting portion 1122" light-transmitting, the cover plate 113" and the outer shell 111" to have no light transparency, and the connecting portion 1122" to be located at the bottom of the microphone 100", the microphone 100"** presents a cool lighting atmosphere at the bottom position.

It should be noted that when the entire base plate 112" has light transparency, it can be made of light-transmitting materials such as glass, organic polymer light-transmitting materials (acrylic sheets), light-transmitting composite materials, light-transmitting plastics, etc., as long as it can achieve light transparency of the base plate 112". The base plate 112" can also be made of semi light-transmitting materials such as thermoplastic polymers, polymethyl methacrylate, polyethylene, polypropylene, polyester, polyvinyl chloride, polyamide, cellulose acetate, polyvinyl chloride, polystyrene, polytetrafluoroethylene, etc., as long as it can achieve semi transparency of the base plate 112". At this time, the shell assembly 1" also includes a light shielding member 14", which is provided on the main body 1121", the light shielding member 14" is configured to shield the light emitted by the light emitting unit 41" from passing through the main body 1121" and being transmitted to the outside. Specifically, the light shielding member 14" is located on the surface of the main body 1121" facing away from the cover plate 113", thereby shielding the light passing through the main body 1121". Using a light shielding member 14" to shield the main body 1121" and prevent the light from the light emitting unit 41" from passing through the main body 1121", facilitating assembly and production, and improving production efficiency. In addition, the light shielding member 14" can also serve a decorative purpose by shielding screws or bolts, making the product look more aesthetically pleasing. Of course, the light shielding member 14" can also be placed on the surface of the main body 1121" facing the cover plate 113". The light shielding member 14" can be a plate or cover with light shielding properties or a coating with light shielding properties.

When the base plate 112" has light transparency, the connecting portion 1122" mentioned above has light transparency, and the main body 1121" mentioned above has light shielding properties or is opaque. The main body 1121" and the connecting portion 1122" are made of different materials. The shading design of the main body 1121" prevents light effects from being displayed through the main body 1121", allowing the lighting effects to be displayed at the connecting portion 1122", resulting in better visual effects in nighttime environments.

Figure 45:
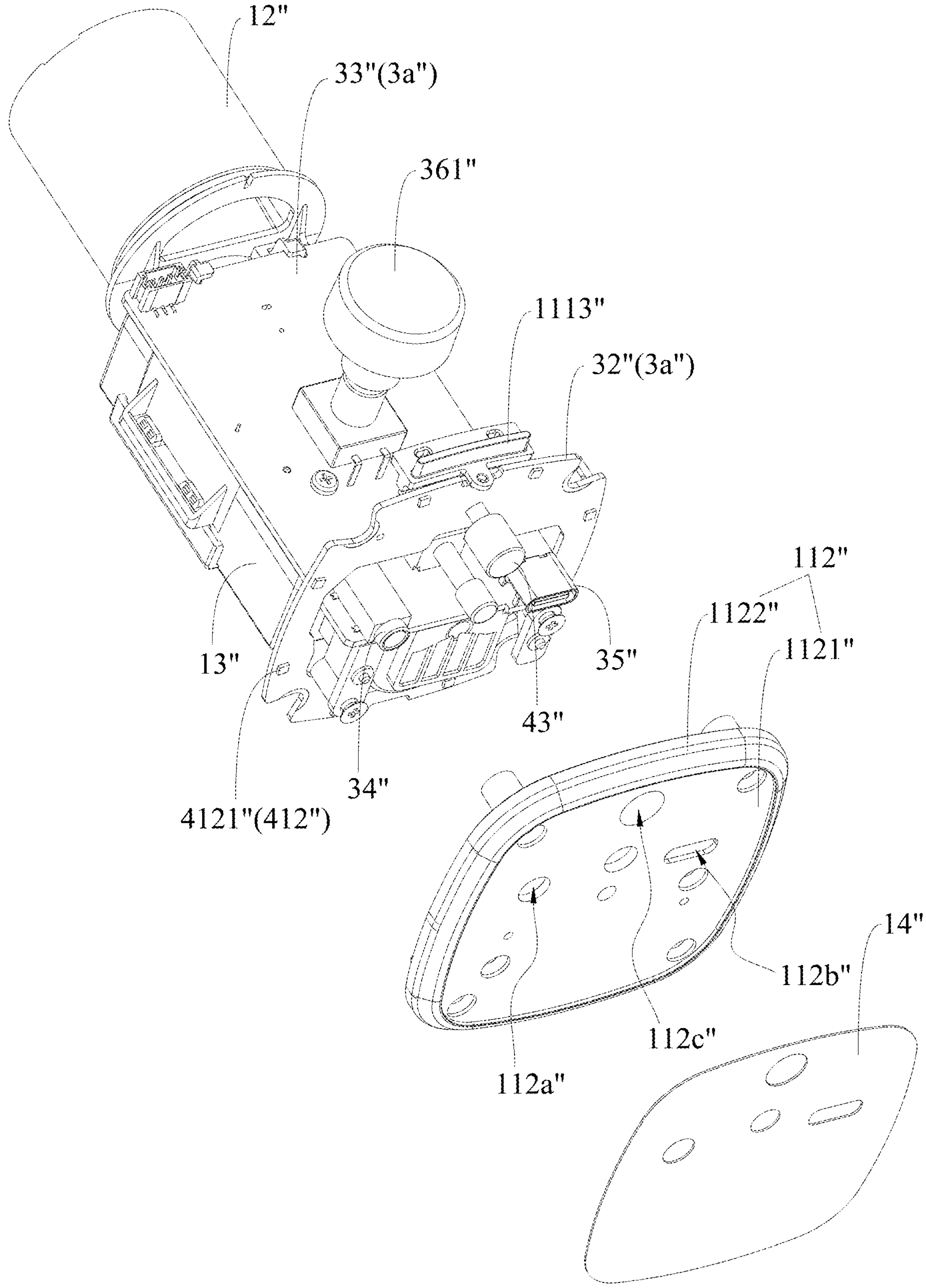
FIG. 45 is another partially exploded view of the microphone of FIG. 41.
Figure 46:
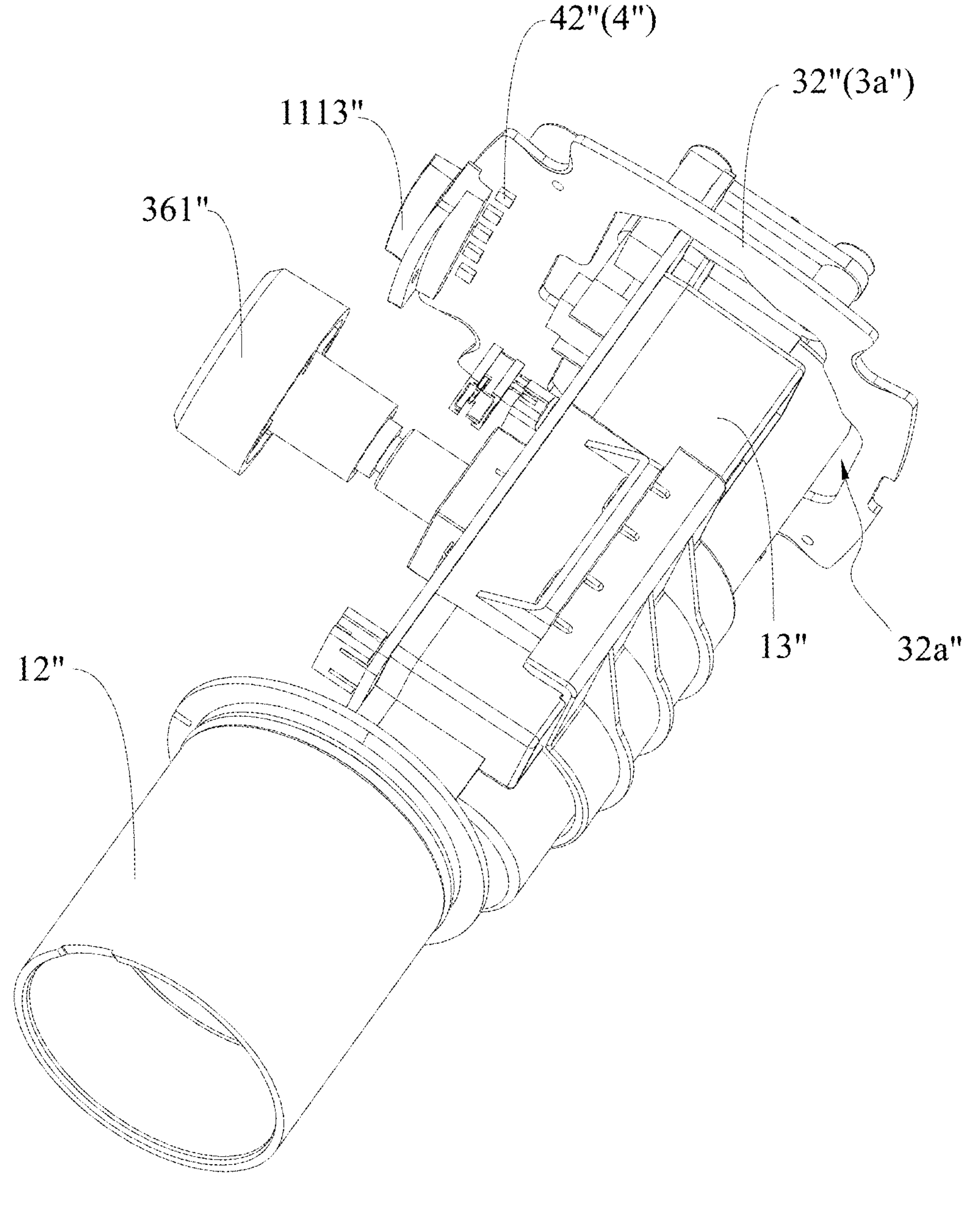
FIG. 46 is a first partial view of the microphone of FIG. 41.
Figure 47:
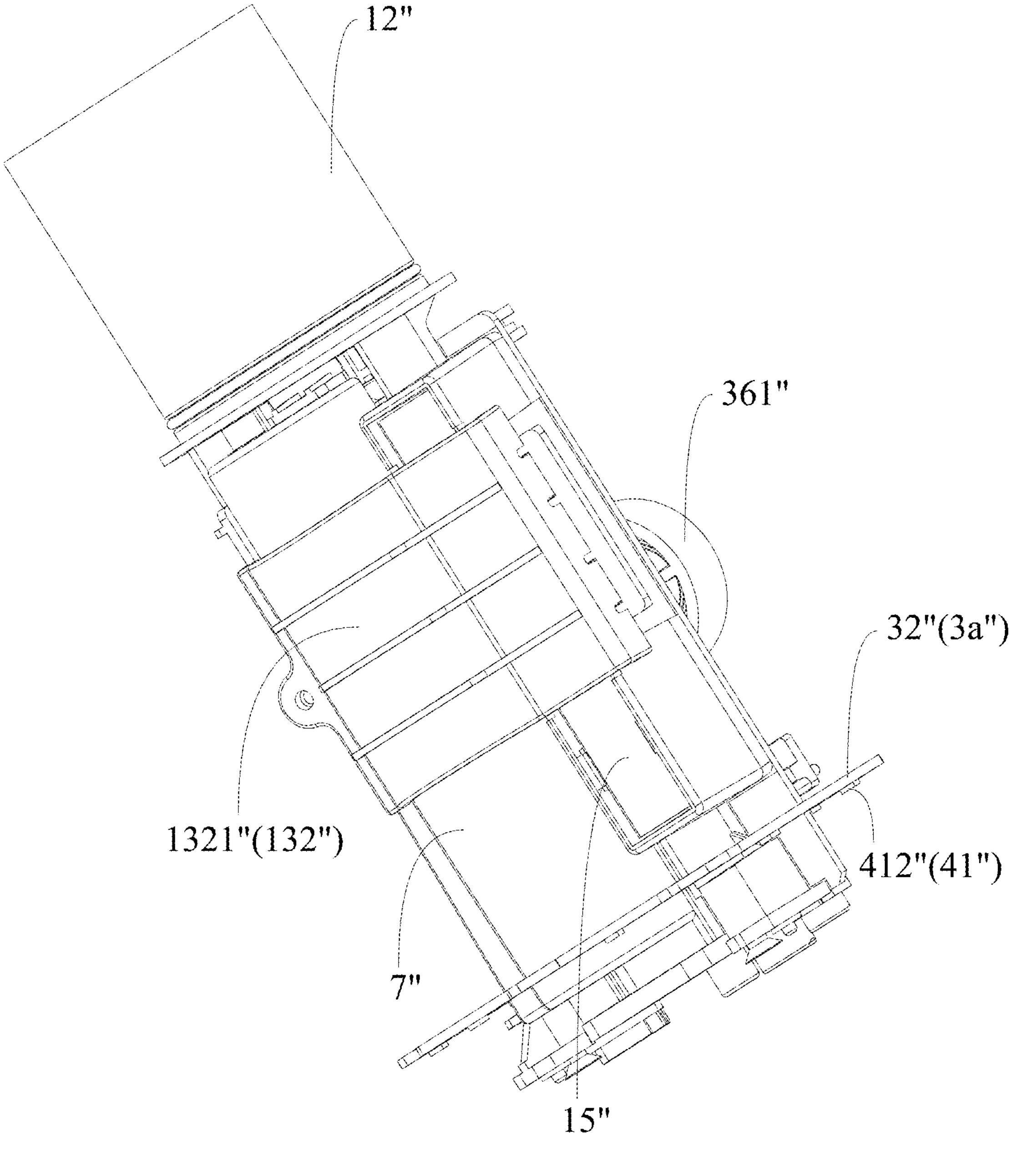
FIG. 47 is a second partial view of the microphone of FIG. 41.
Figure 48:
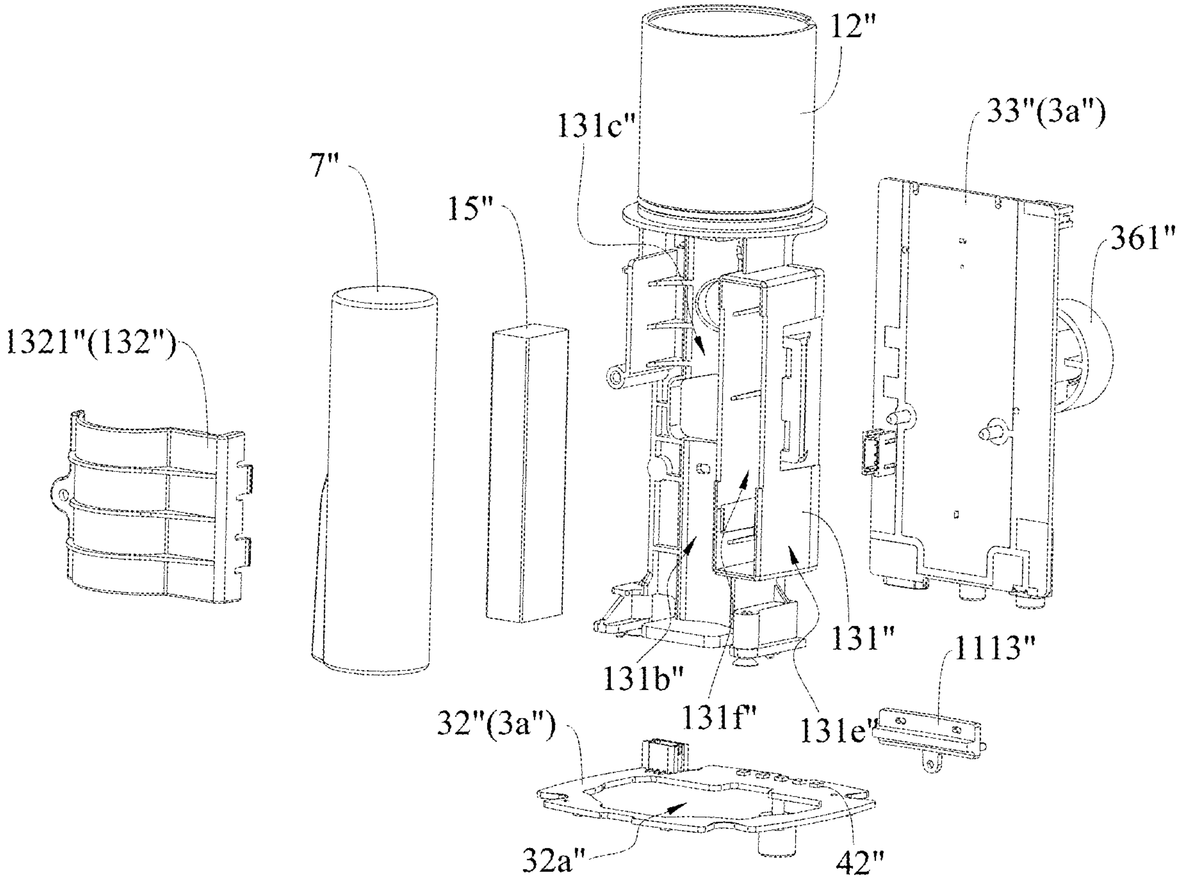
FIG. 48 is further another partially exploded view of the microphone of FIG. 41.
Figure 49:
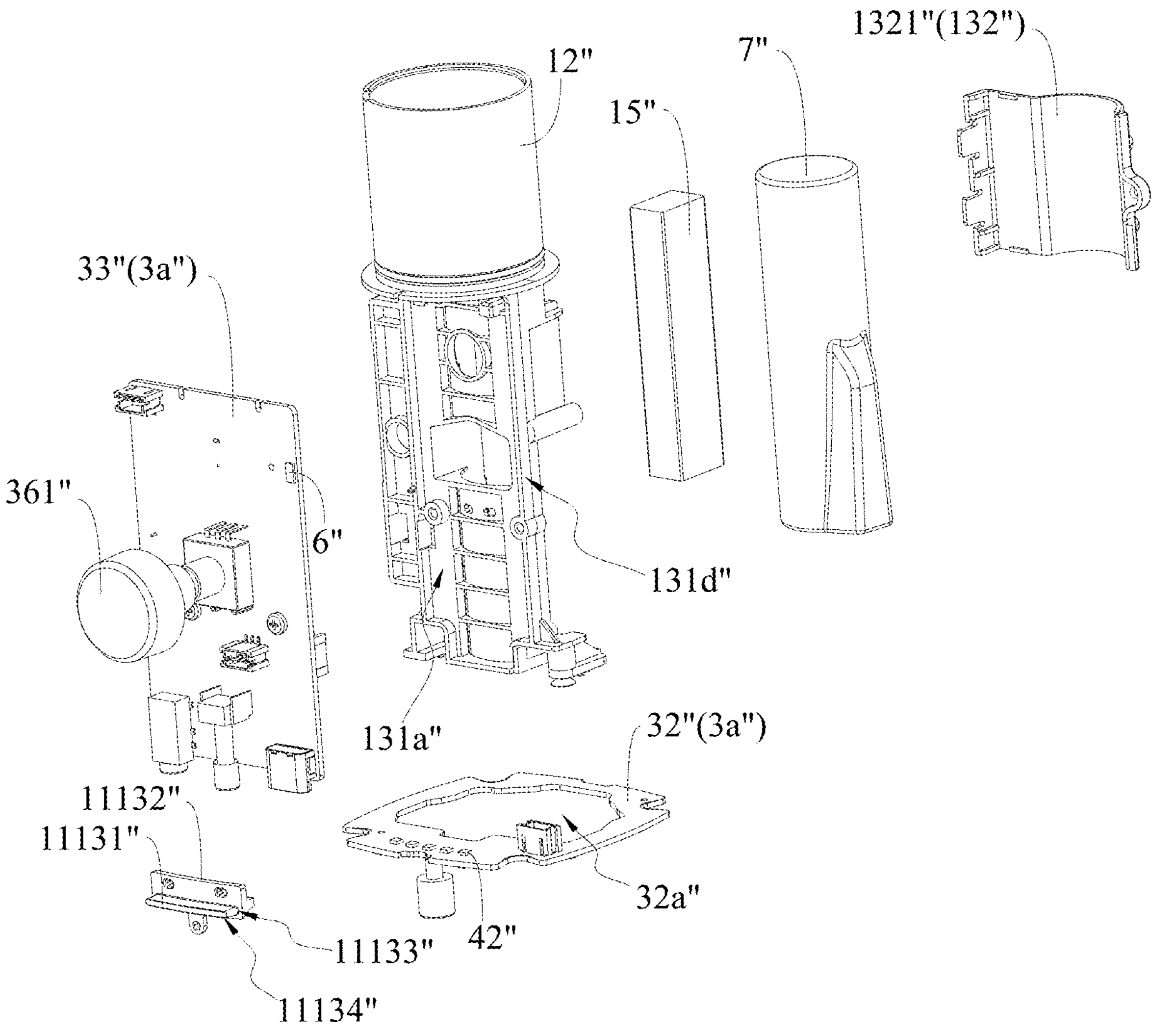
FIG. 49 is still further another partially exploded view of the microphone of FIG. 41.

Furthermore, as shown in FIG. 45, the connecting portion 1122" is circular, allowing the light emitted by the light emitting unit 41" to pass through the connecting portion 1122" and form a circular light emitting strip. This creates a 360 degree cool lighting atmosphere for the microphone 100" at the bottom position The circuit board **3*a*" also includes a second circuit board 32", which is annular in shape, the area enclosed by the inner annular surface of the second circuit board 32" is used to form a first avoidance hole 12*a*" for the mounting bracket 13" to pass through. The light emitting unit 41" includes a second light emitting unit 412", which is located on the surface of the second circuit board 32" facing the base plate 112" and is electrically connected to the second circuit board 32". The second light emitting unit 412" is configured to emit light that can pass through the connecting portion 1122", the second light emitting unit 412" includes multiple second light beads 4121", which are arranged at axial intervals around the connecting portion 1122" on the second circuit board 32". Among them, the second circuit board 32" is a hard circuit board 3*a*", and the second circuit board 32" can be connected to the base plate 112" by locking screws, but not limited to. The second light emitting unit 412" can be used to emit light of a single color, or emit light of multiple different colors. The second light bead 4121" can be an RGB multi-color LED light, where all the second light beads 4121" emit light of the same color, or at least two second light beads 4121" emit light of different colors. By designing the connecting portion 1122" in a circular shape and arranging multiple second light beads 4121" around the axial spacing of the connecting portion 1122" on the second circuit board 32", the microphone 100" presents a 360 degree cool lighting atmosphere at the bottom position. Set the second circuit board 32" to be electrically connected to the second light emitting unit 412", and control the second light emitting unit 412" separately to better display the lighting effect and better control the display of different lighting effects by the second light emitting unit 412". Placing the second light emitting unit 412" on the second circuit board 32", so that the light emitted by the second light emitting unit 412" can directly pass through the connecting portion 1122" of the base plate 112"**, resulting in better lighting effects.

As shown in FIGS. 41 and 45-49, the shell 11" is made of insulating non-metallic material, and the microphone 100" also includes a wireless communicator 5" for connecting with a terminal. The microphone 100" also includes a wireless module 6", which is located in the first accommodating chamber 11*a*" of the shell 11" and electrically connected to the circuit board 3*a*". The wireless module 6" is used for wireless communication with the wireless communicator 5". By designing wireless module 6", which is wirelessly connected to the terminal through wireless communicator 5", audio signal transmission is achieved through wireless transmission, reducing the use of cables.

Among them, the material of the shell 11" can be, but is not limited to, plastic, ceramic, wood, etc. The shell 11" made of insulating non-metallic material does not shield the transmission of audio signals, audio signals can smoothly pass through the shell 11" and be sent to the wireless communicator 5" in a wireless transmission manner from the end side where the wireless module 6" is located. It also enables audio signals (which can be processed by the terminal) to pass through the shell 11" and be sent to the wireless module 6" in a wireless transmission manner from the end side where the wireless communicator 5" is located, reducing or even avoiding interference, ensuring the sound quality of audio signals, improving the stability of audio signal transmission, and avoiding signal interruption.

Wireless communicator 5" is used to connect with terminals, which can include but are not limited to tablets, laptops, desktop computers, ultra mobile personal computers (UMPCs), netbooks, mobile phones, etc.

Wireless module 6" serves as the wireless communication end for microphone 100", and is wirelessly connected to the terminal through wireless communicator 5" to achieve audio signal transmission through wireless transmission. The wireless module 6" is electrically connected to the circuit board 3*a*", so that the audio signal is transmitted wirelessly through the wireless module 6" to the wireless communicator 5", and then sent to the terminal through the wireless communicator 5". Of course, audio signals (which can be processed by the terminal) can also be wirelessly transmitted through wireless communicator 5" to wireless module 6", and then sent to the controller of control assembly 3" (integrated on circuit board 3*a*", and specifically integrated on the third circuit board 33" described below) through wireless module 6".

The microphone head 21 of microphone 100" collects audio signals and sends them to the controller of control assembly 3", the controller of control assembly 3" sends the audio signals to wireless module 6", which then transmits them wirelessly to wireless communicator 5". Wireless communicator 5" then sends the audio signals to the terminal for real-time broadcasting based on the audio signals. It should be noted that if the microphone 100" (specifically the earphone jack 34" described below) is connected to an external earphone for communication, the user can use the external earphone to monitor the audio signal in real time. External earphones are only used to monitor audio signals and have obtained user permission, and do not involve any other personal privacy data.

The wireless module 6" includes a ceramic dielectric antenna or a metallic antenna electrically connected to the circuit board 3*a*". The raw materials for ceramic dielectric antennas are abundant and cost-effective, while the material for metallic antennas can be copper or aluminum. There is no limitation on the specific antenna structures of ceramic dielectric antennas and metallic antennas here, designers can make reasonable designs according to actual needs, as long as the ceramic dielectric antenna and metal antenna can achieve good transmission and reception of audio signals.

The shell assembly 1" also includes a mounting bracket 13", which is located in the first accommodating chamber 11*a*" of the outer shell 111", and is connected to the base plate 112". Among them, the specific connection method between the mounting bracket 13" and the base plate 112" is not limited here, and designers can make reasonable designs according to actual needs; for example, the mounting bracket 13" can be, but is not limited to, detachably connected to the base plate 112" through at least one of screwing, clamping, or plugging, and the mounting bracket 13" can also be, but is not limited to, non detachably connected to the base plate 112" through adhesive bonding or riveting.

The microphone 100" also includes a battery 7", which is installed on the mounting bracket 13" and electrically connected to the circuit board 3*a*". By designing battery 7", battery 7" is used to store electrical energy and provide the necessary electrical energy for components such as control module 3" to operate.

Circuit board 3*a*" also includes a third circuit board 33", battery 7" is electrically connected to the third circuit board 33", wireless module 6" is electrically connected to the third circuit board 33", and microphone head 21" is electrically connected to the third circuit board 33". The mounting bracket 13" includes a bracket body 131" and a positioning member 132", one end of the bracket body 131" extending along the length direction of the mounting bracket 13" is connected to the base plate 112", and the other end of the bracket body 131" extending along the length direction of the mounting bracket 13" is connected to the mounting seat 12". The third circuit board 33" is installed on the first side 131*a*" of the bracket body 131", and the second side 131*b*" of the bracket body 131" (the second side 131*b*" is opposite to the first side 131*a*") is provided with a battery installation slot 131*c*". The battery 7" is located in the battery installation slot 131*c*", and the positioning member 132" is connected to the bracket body 131" to position the battery 7" on the bracket body 131". Design the third circuit board 33" and the battery 7" respectively on the first side 131*a*" and the second side 131*b*" opposite to the bracket body 131", and electrically connect the battery 7" to the third circuit board 33", so that the arrangement of the battery 7" and the third circuit board 33" on the bracket body 131" is not too concentrated. By designing the positioning member 132", which is used to fix the battery 7" on the bracket body 131", it can effectively prevent the battery 7" from loosening and ensure the stability of the electrical connection between the battery 7" and the third circuit board 33".

The positioning member 132" includes a positioning buckle 1321", one end of the positioning buckle 1321" is connected to the third side 131*d*" of the bracket body 131" through a locking screw, and the other end of the positioning buckle 1321" is connected to the fourth side 131*e*" of the bracket body 131" (the fourth side 131*e*" is opposite to the third side 131*d*") through a snap fit. The positioning buckle 1321" has a semi enclosed hoop structure, when the positioning buckle 1321" is assembled on the bracket body 131", the inner surface of the positioning buckle 1321" is in contact with the outer surface of the battery 7". By designing locking screws and snap fasteners at both ends of the positioning buckle 1321" to connect with the third side 131*d*" and fourth side 131*e*" of the bracket body 131", it is easy to achieve installation and positioning between the battery 7" and the bracket body 131".

The bracket body 131" is substantially a rectangular structure with a certain thickness, with four vertically distributed side surfaces, namely the side surface of the first side 131*a*", the side surface of the second side 131*b*", the side surface of the third side 131*d*", and the side surface of the fourth side 131*e*". Among them, the side surface of the first side 131*a*" and the side surface of the second side 131*b*" are side surfaces with greater width, and the side surface of the third side 131*d*" and the side surface of the fourth side 131*e*" are side surfaces with less width. The side surface of the first side 131*a*" and the side surface of the second side 131*b*" are arranged opposite each other, and the side surface of the third side 131*d*" and the side surface of the fourth side 131*e*" are arranged opposite each other. The third circuit board 33" and the battery 7" are arranged opposite each other, and respectively located on the first side 131*a*" of the bracket body 131" where the side surface of the first side 131*a*" is located, and on the second side 131*b*" of the bracket body 131" where the side surface of the second side 131*b*" is located, one end of the positioning member 132" is connected to the third side 131*d*" of the bracket body 131" where the side surface of the third side 131*d*" is located by locking a screw, and the other end of the positioning member 132" is connected to the fourth side 131*e*" of the bracket body 131" where the side surface of the fourth side 131*e*" is located by a snap fit.

The second side 131*b*" of the bracket body 131" is also equipped with a counterweight installation groove 131*f*". The shell assembly 1" also includes a weight-balancing block 15", which is installed in the counterweight installation groove 131*f*". The weight-balancing block 15" is positioned on the bracket body 131" through a positioning buckle 1321". The third circuit board 33" is equipped with components and connected to other parts. The third circuit board 33" has a certain weight, when the third circuit board 33" is set on the first side 131*a*" of the bracket body 131", it will cause the center of gravity of the shell assembly 1" to be biased towards the side where the third circuit board 33" is located, therefore, a weight-balancing block 15" is designed to balance the weight of components such as the third circuit board 33", ensuring that the center of gravity of the shell assembly 1" is in the predetermined position, ensuring self balancing of the product, and making it easier to adjust during use, thereby improving the user experience.

The second circuit board 32" is connected to the base plate 112", and the second circuit board 32" is electrically connected to the third circuit board 33" through an electrical connector. The second circuit board 32" has a first avoidance hole 32" for the third circuit board 33", the bracket body 131", and the battery 7" to pass through. The light emitting assembly 4" also includes an indicator light 42", which is electrically connected to the second circuit board 32", and the indicator light 42" is configured to display relevant information by emitting light. Among them, the relevant information can include but is not limited to at least one of the current volume of battery 7" and the current volume of microphone 100".

For example, taking the current battery level of battery 7" as the relevant information, indicator light 42" can emit a single color light, at this time, the current battery level of battery 7" can be represented by the number of indicator lights 42" that are lit. Taking the number of indicator lights 42 "as four for example, when all four indicator lights 42" are lit, it means that the current battery level of battery 7" is greater than or equal to 75% of the total battery level; when three indicator lights 42" are lit, it means that the current battery level of battery 7" is greater than or equal to 50% of the total battery level and less than 75% of the total battery level; when two indicator lights 42" are lit, it means that the current battery level of battery 7" is greater than or equal to 75% of the total battery level; when the battery level is greater than or equal to 25% of the total battery level but less than 50% of the total battery level, and one of the indicator lights 42" is lit, it means that the current charge of battery 7" is less than 25% of the total charge. For another example, indicator light 42" can emit light of different colors, and the current battery level of battery 7" can be represented by the color displayed on indicator light 42", taking indicator light 42" emitting green, yellow, orange, and red light as an example, when indicator light 42" emits green light, it indicates that the current battery level of battery 7" is greater than or equal to 75% of the total battery level; when indicator light 42" emits yellow light, it indicates that the current battery level of battery 7" is greater than or equal to 50% of the total battery level and less than 715% of the total battery level; when indicator light 42" emits orange light, it indicates that the current battery level of battery 7" is greater than or equal to 75% of the total battery level; when the indicator light 42" emits a red light at 25% and less than 50% of the total power, it means that the current charge of battery 7" is less than 25% of the total charge.

As shown in FIG. 43, FIG. 46, FIG. 48, and FIG. 49, the outer shell 111" includes a ring-shaped side wall structure 1111" and a light guide 1113". The side wall structure 1111" has light shielding properties, and the side wall structure 1111" is provided with a perforated hole 1111*a*". A part of the light guide 1113" penetrates the perforated hole 1111*a*" to expose on the side wall structure 1111". The light guide 1113" has transparency so that the light emitted by the indicator light 42" can pass through the light guide 1113". By designing the light guide 1113", which has transparency, the light emitted by the indicator light 42" can pass through the light guide 1113" and be recognized by the user. Users can intuitively observe the lighting effect presented by the light guide 1113" to determine relevant information such as the current battery level of battery 7" and the current volume of microphone 100".

The light guide 1113" includes an insertion part 11131" and an installation part 11132" connected to the insertion part 11131". The insertion part 11131" penetrate the perforated hole 1111*a*" to expose on the side wall structure 1111", and the installation part 11132" is located in the first accommodating chamber 11*a*" and connected to the side wall structure 1111". The indicator light 42" is closer to the base plate 112" relative to the insertion part 11131", at this time, because the indicator light 42" is not directly facing the insertion part 11131", it will not be seen directly through the light guide 1113". Moreover, the light emitted by the indicator light 42" illuminates the insertion part 11131" and disperses the light through the refraction of the insertion part 11131", making the light more uniform and further improving the lighting effect. The installation part 11132" can be connected to the side wall structure 1111" through snap fit or plug connection, but not limited to. The insertion part 11131" includes a first end 11133" and a second end 11134", the first end 11133" is connected to the installation part 11132", and the second end 11134" extends in the direction close to the side wall structure 1111" until extending out of the perforated hole 1111*a*" of the side wall structure 1111". The end faces of the first end 11133" and the second end 11134" are both set as long strips, and the insertion part 11131" gradually extends from the first end 11133" to the second end 11134" until a cylindrical structure is formed, and the transverse cross-section of the insertion part 11131" is set as a trapezoidal surface.

The indicator light 42" is located on the surface of the second circuit board 32" facing away from the base plate 112", so that the indicator light 42" and the second light emitting unit 412" are respectively located on the two opposite surfaces of the second circuit board 32", thereby avoiding mutual interference of the light emitted by the two. The indicator light 42" is controlled by the second circuit board 32" for better control effect, and the light of the indicator light 42" is transmitted through the light guide 1113", forming a light effect that does not interfere with the connecting portion 1122" of the base plate 112", and can also cooperate with each other and be easily distinguished.

The number of indicator lights 42" is multiple, and multiple indicator lights 42" are arranged along the side of the second circuit board 32" near the light guide 1113" at intervals on the second circuit board 32". The multiple indicator lights 42" are configured to display relevant information by the different numbers of lights on or off.

For example, taking the current battery level of battery 7" and the number of indicator lights 42" as four relevant information as an example; when all four indicator lights 42" are illuminated, it indicates that the current charge of battery 7" is greater than or equal to 75% of the total charge, at this time, the light emitted by the four indicator lights 42" passes through the light guide 1113", and the user can intuitively observe that the insertion part 11131" of the light guide 1113" emits light uniformly throughout the entire body; when three of the indicator lights 42" are illuminated, it indicates that the current battery level of battery 7" is greater than or equal to 50% of the total battery level and less than 75% of the total battery level, at this time, the light emitted by the three indicator lights 42" passes through the light guide 1113", and the user can intuitively observe that only three-quarters of the area corresponding to the illuminated three indicator lights 42" of the inserted part 11131" of the light guide 1113" emits light uniformly, while the remaining quarter corresponding to the extinguished indicator light 42" is dull and lifeless; when two of the indicator lights 42" are lit, it indicates that the current battery level of battery 7" is greater than or equal to 25% of the total battery level and less than 50% of the total battery level, at this time, the light emitted by the two indicator lights 42" passes through the light guide 1113", and the user can intuitively observe that only half of the area corresponding to the lit two indicator lights 42" of the inserted part 11131" of the light guide 1113" emits light uniformly, while the remaining half of the area corresponding to the extinguished two indicator lights 42" is dull and lifeless; when one of the indicator lights 42" is lit up, it indicates that the current battery level of battery 7" is less than 25% of the total battery level, at this time, the light emitted by one indicator light 42" passes through the light guide 1113", and the user can intuitively observe that the insertion part 11131" of the light guide 1113" only emits light evenly in the quarter area corresponding to the lit indicator light 42", while the remaining quarter area corresponding to the extinguished three indicator lights 42" is dull and lifeless.

Figure 42:
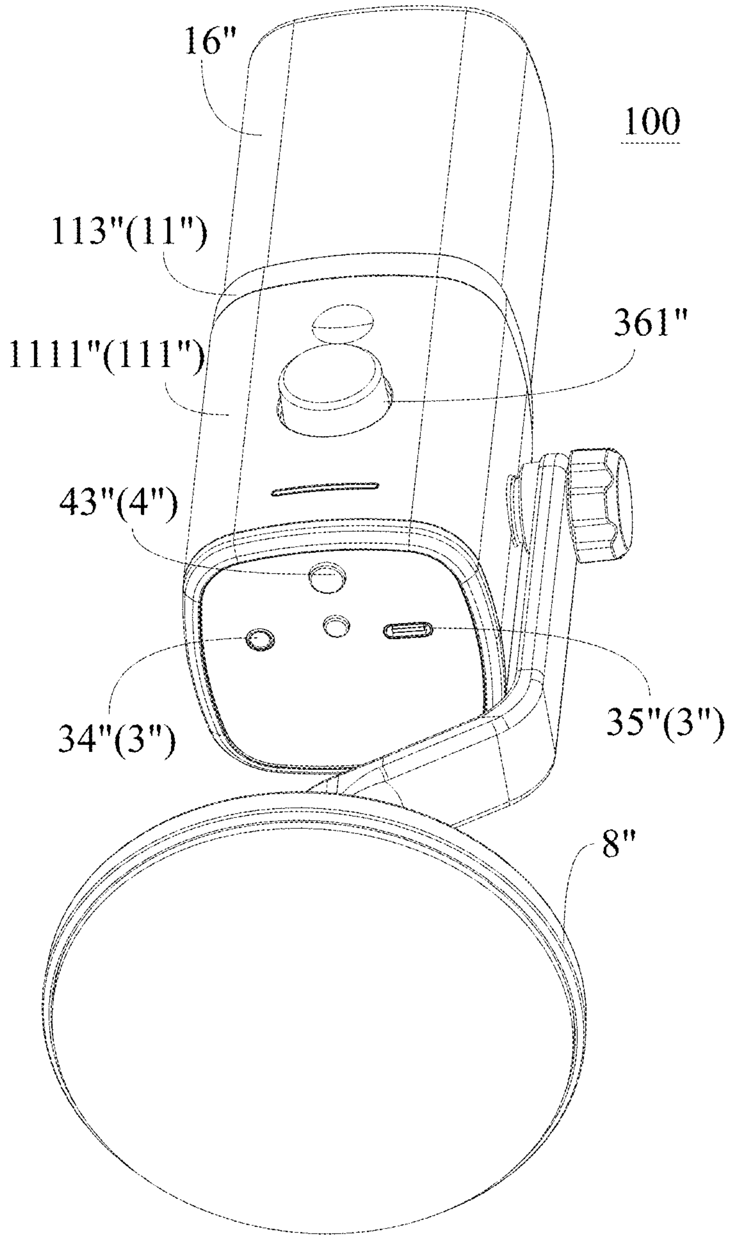
FIG. 42 is another schematic view of the microphone of FIG. 41.
Figure 43:
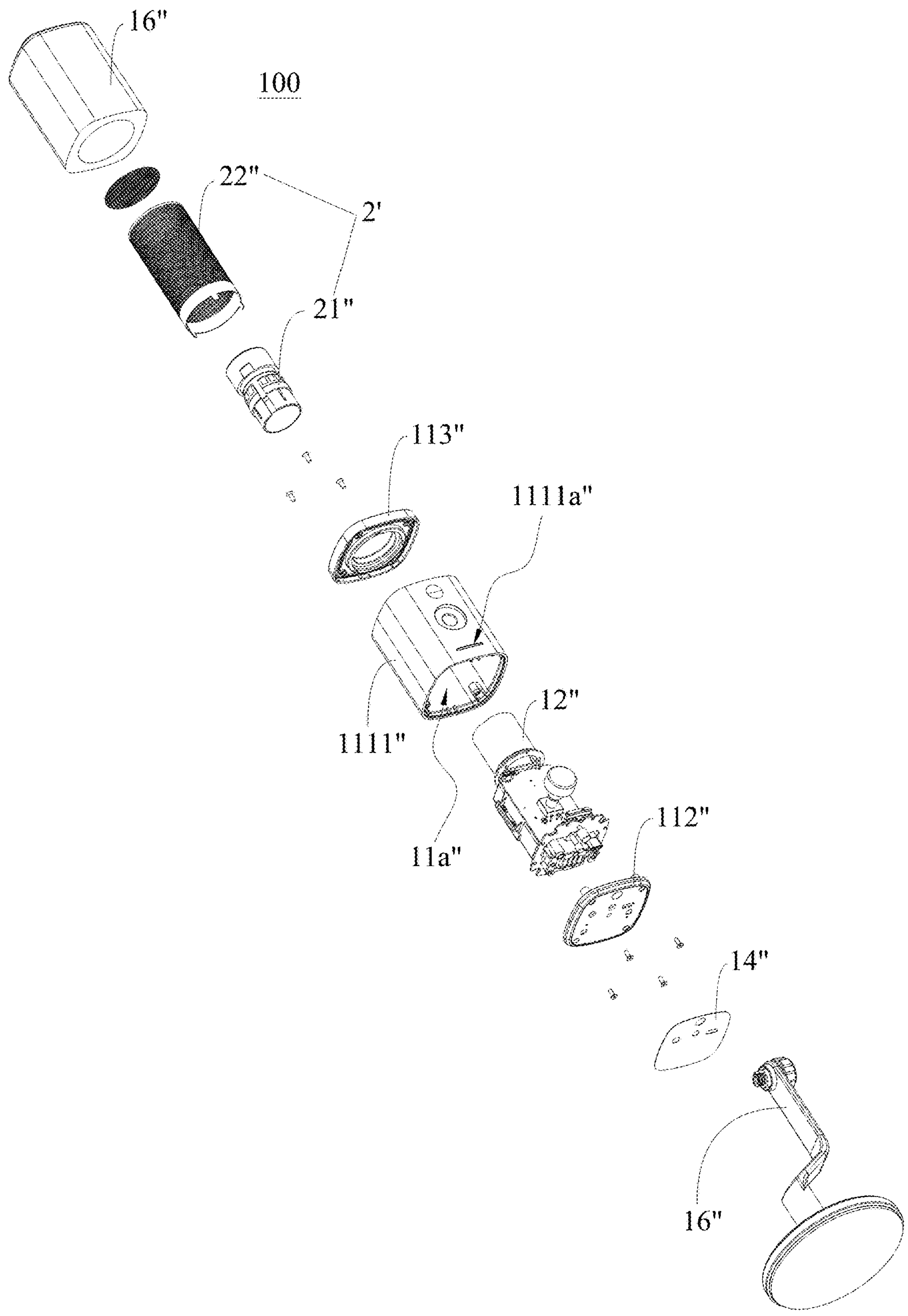
FIG. 43 is partially exploded view of the microphone of FIG. 41.
Figure 44:
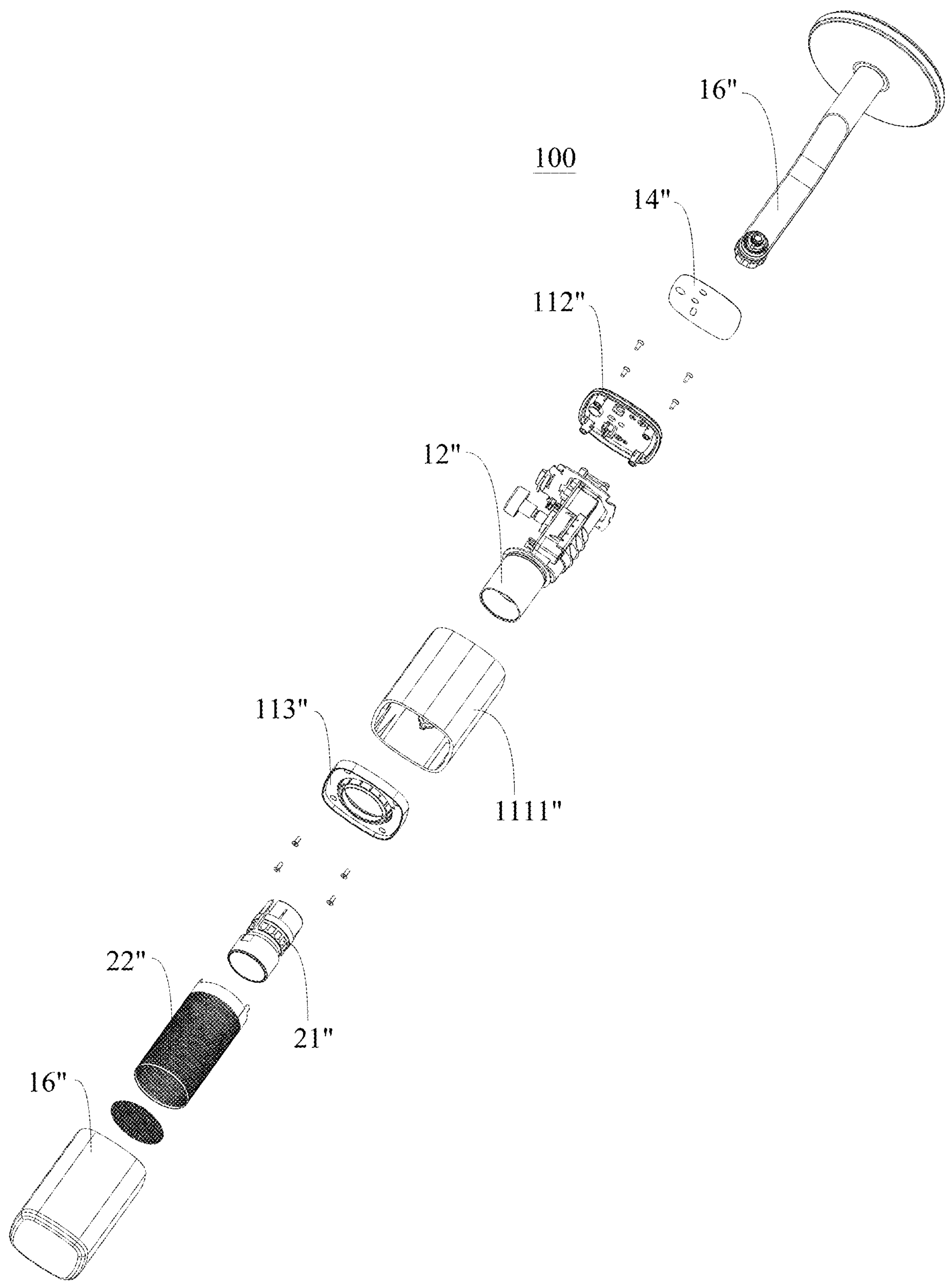
FIG. 44 is another partially exploded view of the microphone of FIG. 41.

As shown in FIGS. 42 and 45, the base plate 112" has a first through hole 112*a*" and a second through hole 112*b*" that are connected to the first receiving chamber 11*a*". Control assembly 3" includes an earphone jack 34" for connecting external earphones, and a second audio interface 35" for connecting external devices to transmit data. The earphone jack 34" passes through the first through hole 112*a*" and is electrically connected to the third circuit board 33". The second audio interface 35" passes through the second through hole 112*b*" and is electrically connected to the third circuit board 33".

The main function of the earphone jack 34 is to connect external earphones for the transmission of audio signals, allowing users to listen to sound through external earphones; the second audio interface 35" is configured to connect to other devices, such as computers, tablets, etc., to achieve data transmission such as audio data transmission. The second audio interface 35" can be a USB interface or a type-c interface By designing a first through hole 112*a*" on the base plate 112" for the earphone jack 34" to pass through, and a second through hole 112*b*" for the second audio interface 35" to pass through, the data cables connected to the earphone jack 34" and the second audio interface 35" can be pulled out from the bottom end of the shell 11" for easy wiring.

Figure 41:
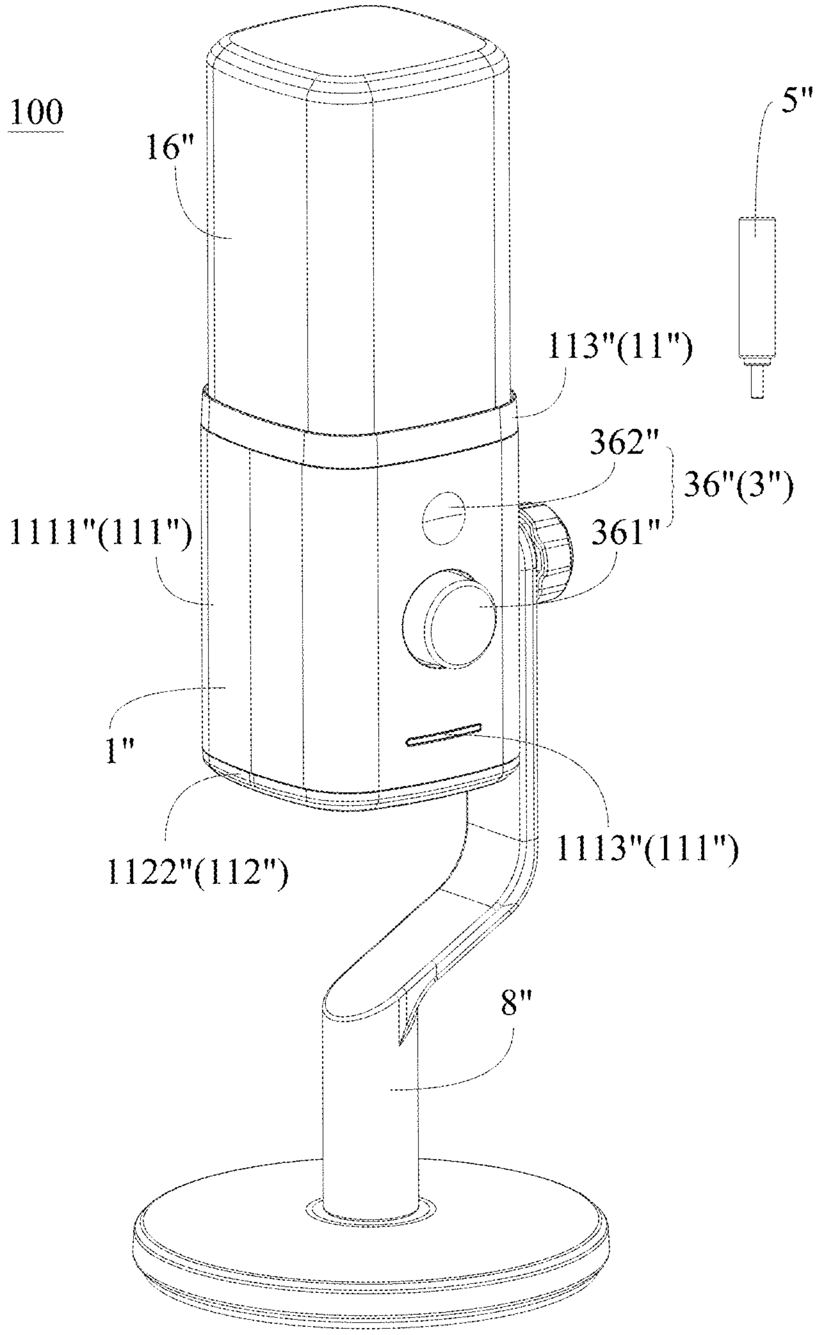
FIG. 41 is a second schematic view of the microphone according to a third embodiment of this application.

As shown in FIG. 41 and FIG. 45, in order to facilitate user operation, control assembly 3" also includes function key 36", which is threaded through the outer shell 111" and electrically connected to the third circuit board 33", and the function key 36" is configured to adjust the signal amplification level of input microphone 100" and/or the signal strength output by microphone 100", and/or to enable or disable the mute function of microphone 100". The setting of the function key 36" makes it convenient for users to adjust and control the microphone 100". Specifically, the function key 36" includes a function knob 361" and a mute button 362" for controlling the mute of the microphone 100". The outer shell 111" is equipped with holes for the function knob 361" and mute button 362" to be connected to the third circuit board 33" for user operation. The mute button 362" can be pressed to mute the microphone 100" when in use, and pressed again to unmute, making it easy to operate.

The function knob 361" has at least two functions, in this embodiment, two functions are introduced as examples, when in use, the first function is to adjust the gain effect of the microphone 100" by rotating it, and the second function is to adjust the volume of the earphones by rotating it. These two functions can be switched by pressing the function knob 361". Of course, the function knob 361" can also have a third or more functional functions, which can be switched by pressing. It integrates multiple function adjustments, reducing the number of operation buttons and making the overall appearance of the product more neat and beautiful. It is worth mentioning that by designing the function key 36" to be electrically connected to the third circuit board 33", the function key 36" and the battery 7" are arranged on the first side 131*a*" and the second side 131*b*" of the bracket body 131", respectively. By reasonably designing the spatial layout of the function key 36" and the battery 7", the overall weight distribution of the microphone 100" is relatively uniform, making it less likely for the microphone 100" placed on the desktop to tilt.

As shown in FIGS. 41 and 45, in order to facilitate the control of the opening and closing of the second light emitting unit 412", the light emitting assembly 4" also includes a switch button 43", and the base plate 112" also has a third through hole 112*c*" connected to the first accommodating chamber 11*a*". The switch button 43" passes through the third through hole 112*c*" and is electrically connected to the second circuit board 32" to control the second light emitting unit 412". The switch button 43" is configured to control the opening and closing of the second light emitting unit 412", as well as adjust the color and flashing mode of the light source, making the product's functions more diverse and powerful.

The switch button 43" is also configured to control the on and off of indicator light 42", as well as adjust the display mode of indicator light 42". For example, the user triggers the switch button 43" and places it in the first display mode, in the first display mode, the indicator light 42" is used to display the current battery level of battery 7"; for another example, the user triggers the switch button 43" and places it in the second display mode, where the indicator light 42" is used to display the current volume of microphone 100".

As shown in FIGS. 31, 32, 41, and 42, the microphone 100" also includes a connecting frame 8". The design of the connecting frame 8" can refer to the first embodiment or the second embodiment mentioned above, and will not be repeated here As shown in FIGS. 33, 34, 43, and 44, the sound pickup assembly 2" also includes a mesh cover 22", and the shell assembly 1" also includes a sponge cover 16". The specific design of the mesh cover 22" and sponge cover 16" can refer to the first embodiment or the second embodiment mentioned above, and will not be elaborated here.

It should be noted that when the outer shell 111" includes the above-mentioned side wall structure 1111", the above-mentioned light guiding structure 1112", and the above-mentioned light guide 1113", as shown in FIGS. 37-40, the circuit board 3*a*" includes the above-mentioned first circuit board 31", the above-mentioned second circuit board 32", and the above-mentioned third circuit board 33", and the light emitting unit 41" only includes the above-mentioned first light emitting unit 411", and the second circuit board 32" is electrically connected to the above-mentioned indicator light 42". When the outer shell 111" includes the above-mentioned side wall structure 1111" and the above-mentioned light guide 1113" but does not include the above-mentioned light guiding structure 1112", as shown in FIGS. 46-49, the circuit board 3*a*" includes the above-mentioned second circuit board 32" and the above-mentioned third circuit board 33", the light emitting unit 41" only includes the above-mentioned second light emitting unit 412", and the second circuit board 32" is electrically connected to the above-mentioned second light emitting unit 412" and the above-mentioned indicator light 42".

The various technical features in the foregoing embodiments may be randomly combined. For concise description, not all possible combinations of the various technical features in the above embodiments are described. However, provided that combinations of these technical features do not conflict with each other, the combinations of the various technical features are considered as falling within the scope of this specification. The foregoing embodiments merely express several implementations of the present disclosure. The descriptions thereof are relatively specific and detailed, but are not understood as limitations on the scope of the present disclosure. A person of ordinary skill in the art can also make several transformations and improvements without departing from the idea of this application. These transformations and improvements fall within the protection scope of this application. Therefore, the protection scope of the patent of this application shall be subject to the appended claims.

What is claimed is:

1. A microphone, comprising:

a shell assembly, comprising a shell body with a first accommodating chamber;

a sound pickup assembly, comprising a microphone head for sound pickup, wherein the microphone head is arranged on the shell assembly;

a control assembly, comprising a circuit board, wherein the circuit board is arranged in the first accommodating chamber, and is electrically connected to the microphone head; and a light emitting assembly, comprising a light emitting unit, wherein the light emitting unit is arranged in the first accommodating chamber and is electrically connected to the circuit board; and the light emitting unit is configured to allow emitted light to pass through a portion of the shell body;

wherein the shell body includes an outer shell, the outer shell comprises a ring-shaped side wall structure and a light guiding structure, the side wall structure has light shielding properties, the light guiding structure is light-transmitting, allowing the light emitted by the light emitting unit to pass through; and wherein viewed from a lengthwise direction of the microphone, the light guiding structure is substantially located at a middle waistline of the microphone.

2. The microphone according to claim 1, wherein the microphone further includes a wireless communicator for connecting to a terminal;

The microphone further includes a wireless module, which is located within the first accommodating chamber and electrically connected to the circuit board, the wireless module is used for wireless communication with the wireless communicator.

3. The microphone according to claim 2, wherein the circuit board comprises a third circuit board;

the microphone further comprises a battery electrically connected to the third circuit board, the wireless module is electrically connected to the third circuit board, and the microphone head is electrically connected to the third circuit board;

the shell assembly further comprises a mounting bracket located in the first accommodating chamber, the mounting bracket comprises a bracket body and a positioning member, the bracket body is connected to the shell body, and the third circuit board is installed on a first side of the bracket body, a second side of the bracket body is provided with a battery installation slot, and the battery is set in the battery installation slot, the positioning member is connected to the bracket body to position the battery on the bracket body, the first side is opposite to the second side.

4. The microphone according to claim 1, wherein the shell body further includes a base plate, and a cover plate, the base plate also has light shielding properties, and the base plate is connected to one end of the side wall structure, the light guiding structure is connected to the other end of the side wall structure opposite to the base plate, the cover plate has light shielding properties and is connected to the light guiding structure.

5. The microphone according to claim 4, wherein the circuit board comprises a first circuit board, which is closer to the cover plate than the base plate, the light emitting unit comprises a first light emitting unit electrically connected to the first circuit board, the first light emitting unit is configured to emit light that can pass through the light guiding structure.

6. The microphone according to claim 5, wherein the first circuit board is farther away from the cover plate relative to the light guiding structure;

the light guiding structure is annular, and the first light emitting unit comprises a plurality of first light beads arranged on the first circuit board at intervals around an axial direction of the light guiding structure.

7. The microphone according to claim 4, wherein the cover plate comprises a plate body and a first mating portion provided on the plate body;

the light guiding structure comprises a light guiding aperture and a second mating portion provided on the light guiding aperture, wherein the second mating portion is detachably connected to the first mating portion to detachably connect the light guiding structure to the cover plate.

8. A microphone, comprising:

a shell assembly, comprising a shell body with a first accommodating chamber;

a sound pickup assembly, comprising a microphone head for sound pickup, wherein the microphone head is arranged on the shell assembly;

a control assembly, comprising a circuit board, wherein the circuit board is arranged in the first accommodating chamber, and is electrically connected to the microphone head; and a light emitting assembly, comprising a light emitting unit, wherein the light emitting unit is arranged in the first accommodating chamber and is electrically connected to the circuit board; and the light emitting unit is configured to allow emitted light to pass through a portion of the shell body;

wherein the shell body comprises an outer shell, a base plate, and a cover plate, the outer shell has light shielding properties, and the base plate comprises a main body and a connecting portion, the connecting portion has transparency to allow the light emitted by the light emitting assembly to pass through the connecting portion, and the connecting portion is connected to an outside of the main body and to one end of the outer shell, the cover plate has light shielding properties and is connected to the other end of the outer shell away from the base plate.

9. The microphone according to claim 8, wherein connecting portion is circular, allowing the light emitted by the light emitting unit to pass through the connecting portion and form a circular light emitting strip.

10. The microphone according to claim 9, wherein the circuit board further comprises a second circuit board, and the light emitting unit comprises a second light emitting unit, the second light emitting unit is located on a surface of the second circuit board facing the base plate and is electrically connected to the second circuit board, the second light emitting unit is configured to emit light that can pass through the connecting portion;

the second light emitting unit comprises a plurality of second light beads arranged at intervals around an axial direction of the connecting portion on the second circuit board.

11. The microphone according to claim 8, wherein the microphone also includes a wireless communicator for connecting with a terminal;

the microphone further comprises a wireless module, which is located in the first accommodating chamber and electrically connected to the circuit board, the wireless module is used for wireless communication with the wireless communicator.

12. The microphone according to claim 11, wherein the wireless module comprises a ceramic dielectric antenna or a metallic antenna electrically connected to the circuit board.

13. The microphone according to claim 11, wherein the shell is made of insulating non-metallic material.

14. The microphone according to claim 11, wherein the shell assembly further comprises a mounting bracket located in the first accommodating chamber and connected to the base plate;

the microphone further comprises a battery installed on the mounting bracket and electrically connected to the circuit board.

15. The microphone according to claim 14, wherein the circuit board further comprises a third circuit board, the battery is electrically connected to the third circuit board, the wireless module is electrically connected to the third circuit board, and the microphone head is electrically connected to the third circuit board;

the mounting bracket comprises a bracket body and a positioning member, the bracket body is connected to at least one of the base plate and the cover plate, the third circuit board is installed on a first side of the bracket body, and a second side of the bracket body is provided with a battery installation slot, the battery is installed in the battery installation slot, and the positioning member is connected to the bracket body to position the battery on the bracket body, the first side is opposite to the second side.

16. The microphone according to claim 15, wherein the positioning member comprises a positioning buckle, one end of the positioning buckle is connected to a third side of the bracket body through a locking screw, and the other end of the positioning buckle is connected to a fourth side of the bracket body through a snap fit, the third side is opposite to the fourth side.

17. The microphone according to claim 15, wherein the circuit board further comprises a second circuit board connected to the base plate, and the second circuit board is electrically connected to the third circuit board, the second circuit board has a first avoidance hole for the third circuit board, the bracket body, and the battery to pass through;

the light emitting assembly further comprises an indicator light electrically connected to the second circuit board, the indicator light is configured to display relevant information through light emission;

the outer shell comprises a ring-shaped side wall structure and a light guide, wherein the side wall structure has light shielding properties, the side wall structure is provided with a perforated hole, and a part of the light guide penetrates the perforated hole to expose on the side wall structure, the light guide is light-transmitting to allow the light emitted by the indicator light to pass through thereof.

18. The microphone according to claim 17, wherein the light guide comprises an insertion part and an installation part connected to the insertion part, the insertion part penetrates the perforated hole to expose on the side wall structure, and the installation part is located in the first accommodating chamber and connected to the side wall structure.

19. The microphone according to claim 17, wherein the indicator light comprises a plurality of indicator lights, and the plurality of indicator lights are arranged along a side of the second circuit board near the light guide at intervals on the second circuit board, the plurality of indicator lights are configured to display relevant information by varying the number of lights on or off.

20. A microphone, comprising:

a shell assembly, comprising a shell body with a first accommodating chamber;

a sound pickup assembly, comprising a microphone head for sound pickup, wherein the microphone head is arranged on the shell body; and a control assembly, comprising a circuit board, wherein the circuit board is arranged in the first accommodating chamber, and is electrically connected to the microphone head;

wherein the shell body comprises an outer shell, a base plate connected to the bottom end of the outer shell, and a cover plate connected to the top end of the outer shell, the base plate has a first through hole and a second through hole connected to the first accommodating chamber;

the circuit board comprises a third circuit board, and the microphone head is electrically connected to the third circuit board, the control assembly further comprises an earphone jack for connecting external earphones and a second audio interface for connecting external devices to transmit data, the earphone jack passes through the first through hole and electrically connected to the third circuit board, the second audio interface passes through the second through hole and electrically connected to the third circuit board.

* * * * *